United States Patent
Tateishi et al.

(10) Patent No.: US 8,399,545 B2
(45) Date of Patent: Mar. 19, 2013

(54) AZO PIGMENT-CONTAINING AQUEOUS INK FOR INKJET RECORDING

(75) Inventors: Keiichi Tateishi, Kanagawa (JP); Kaoru Tojo, Kanagawa (JP); Kiyoshi Morimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 82 days.

(21) Appl. No.: 13/061,253

(22) PCT Filed: Aug. 27, 2009

(86) PCT No.: PCT/JP2009/064928
§ 371 (c)(1),
(2), (4) Date: Feb. 28, 2011

(87) PCT Pub. No.: WO2010/024317

PCT Pub. Date: Mar. 4, 2010

(65) Prior Publication Data

US 2011/0166267 A1  Jul. 7, 2011

(30) Foreign Application Priority Data

Aug. 29, 2008  (JP) .................. 2008-222808
Aug. 5, 2009   (JP) .................. 2009-182748

(51) Int. Cl.
*C09D 11/10* (2006.01)
*C08K 5/3445* (2006.01)

(52) U.S. Cl. .............. 524/106; 524/556; 523/160

(58) Field of Classification Search .......... 524/106, 524/556; 523/160
See application file for complete search history.

(56) References Cited

U.S. PATENT DOCUMENTS

2008/0274283 A1  11/2008  Tateishi et al.
2010/0160504 A1*  6/2010  Morimoto et al. ............ 524/105

FOREIGN PATENT DOCUMENTS

| EP | 0 796 876 A1 | 9/1997 |
|----|---|---|
| JP | 9-151342 A | 6/1997 |
| JP | 11-172180 A | 6/1999 |
| JP | 2000-239594 A | 9/2000 |
| JP | 2003 026950 A | 1/2003 |
| JP | 2007-063520 A | 3/2007 |

OTHER PUBLICATIONS

STN Structure Search Results (Jul. 10, 2012).*
Extended European Search Report dated Jan. 3, 2012 in European Patent Application No. 09809967.4.
Byrron G Hays: "A Model for Organic Pigment in Oil or Water-Based Printing Inks", American Inkmaker, Macnair-Dorland, New York, NY, Oct. 1, 1986, pp. 13-14, 16 ,18 and 20-21, XP009129392.
Morishima Yotaro: "Self-Assembling Amphiphilic Polyelectrolytes and their Nanostructures", Chinese Journal of Polymer Science, Jan. 1, 2000, pp. 323-336, vol. 18, No. 40, XP009107054.
International Search Report, dated Dec. 8, 2009, issued in Application No. PCT/JP2009/064928.

* cited by examiner

Primary Examiner — Vu A Nguyen
(74) Attorney, Agent, or Firm — Sughrue Mion, PLLC

(57) ABSTRACT

An aqueous ink for inkjet recording is provided. The aqueous ink ensures that the ejection accuracy in inkjet recording is excellent and helps suppress generation of density unevenness and streak unevenness, even after storage for a long period of time or exposure to high temperatures. The aqueous ink for inkjet recording contains vinyl polymer particles containing components A and B and a water-soluble solvent. Component A is an azo pigment having a specific structure, its tautomer, or a salt or hydrate thereof; and Component B is a vinyl polymer containing (a) a hydrophobic structural unit having an aromatic ring bonded to the polymer main chain through a linking group and (b) a hydrophilic structural unit.

13 Claims, No Drawings

AZO PIGMENT-CONTAINING AQUEOUS INK FOR INKJET RECORDING

TECHNICAL FIELD

Figure 6:
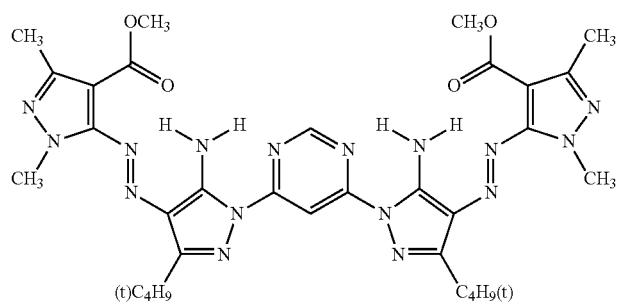
Figure 7:
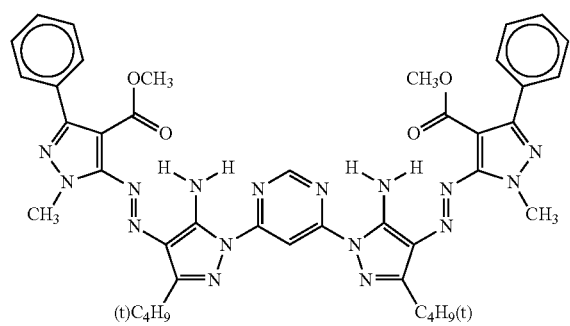
Figure 8:
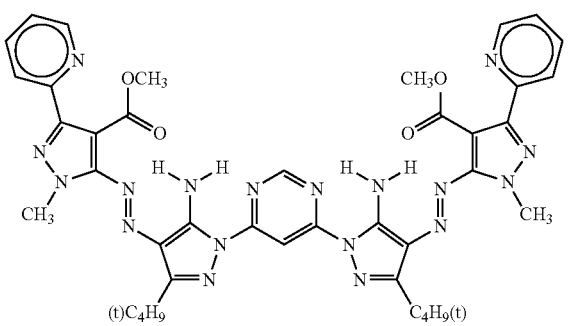
Figure 9:
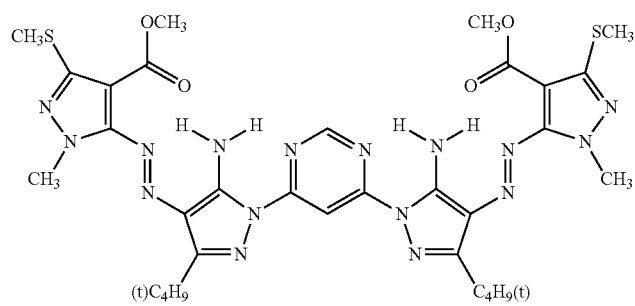
Figure 10:
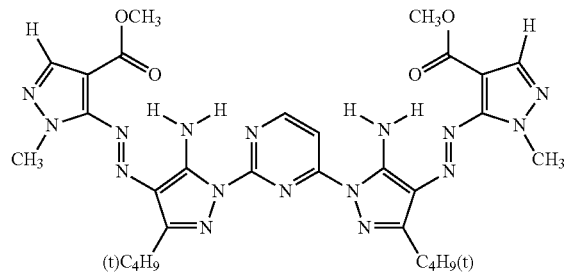
Figure 11:
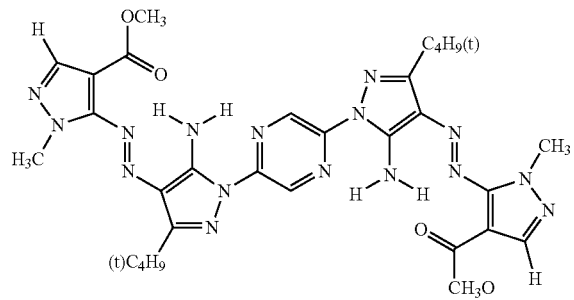
Figure 12:
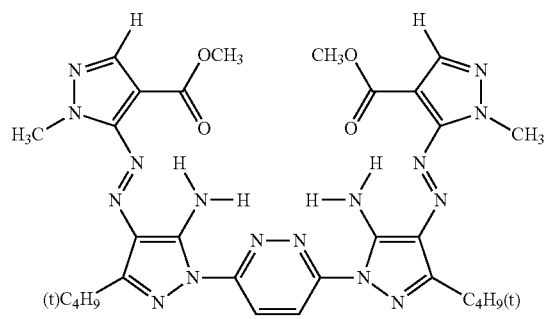
Figure 13:
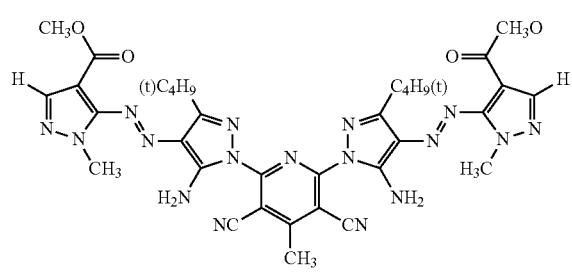
Figure 14:
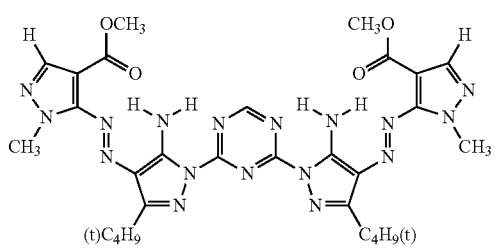
Figure 15:
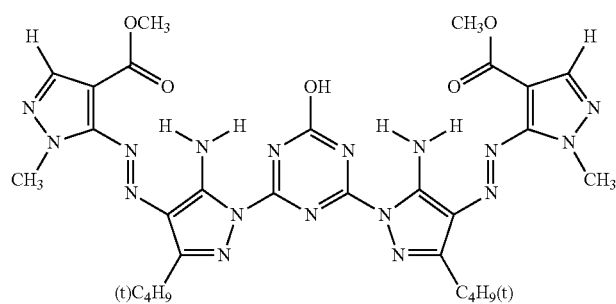
Figure 16:
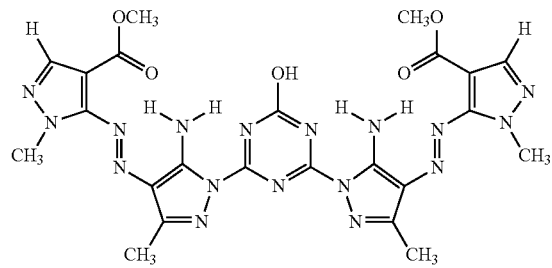
Figure 17:
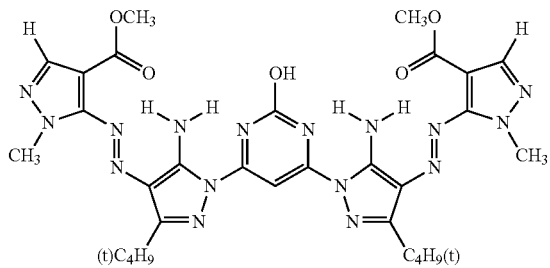
Figure 18:
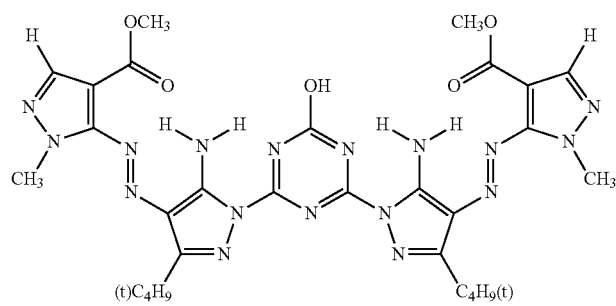
Figure 19:
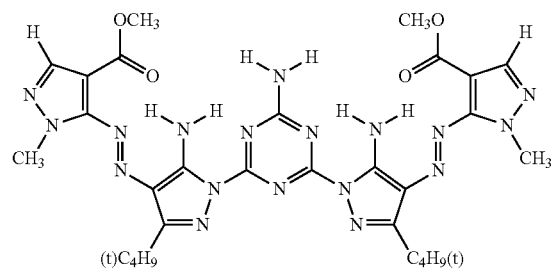
Figure 20:
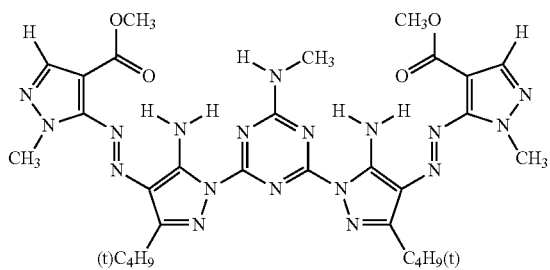
Figure 21:
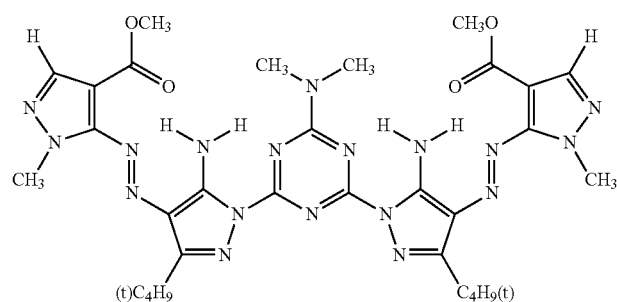
Figure 22:
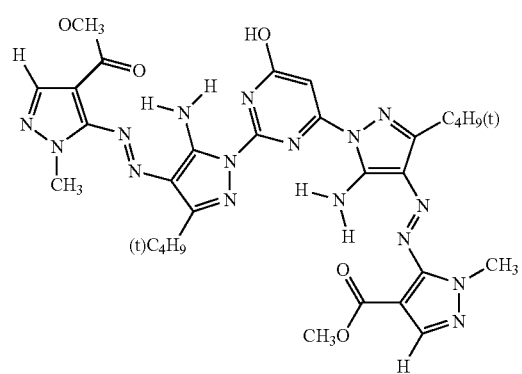
Figure 23:
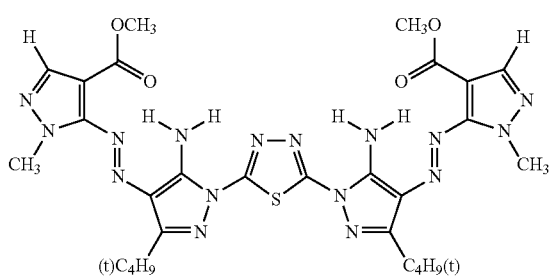
Figure 24:
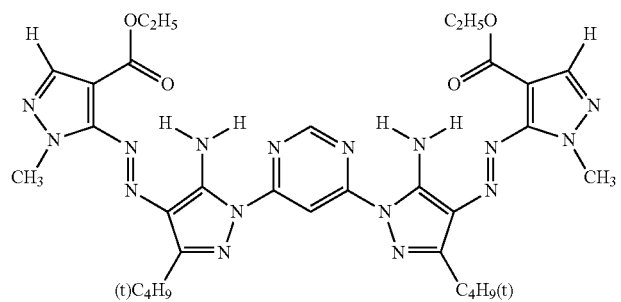
Figure 25:
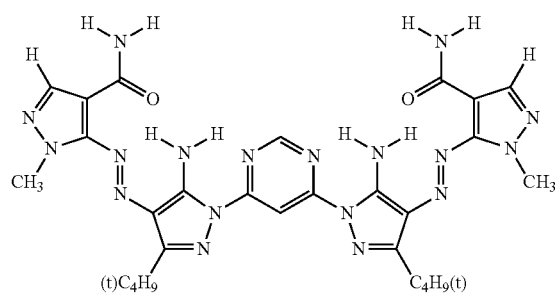
Figure 26:
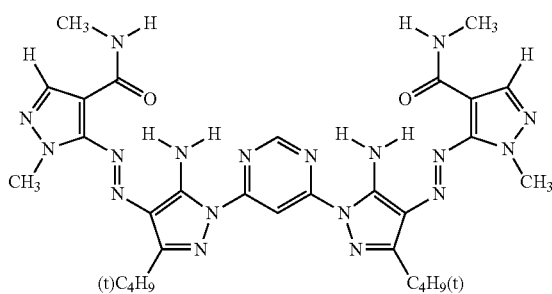
Figure 27:
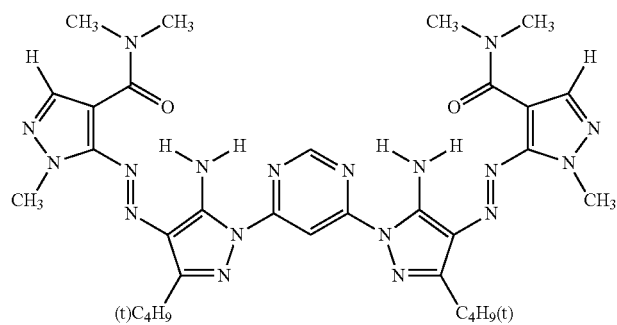
Figure 28:
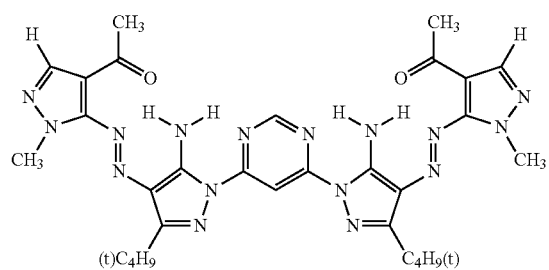
Figure 29:
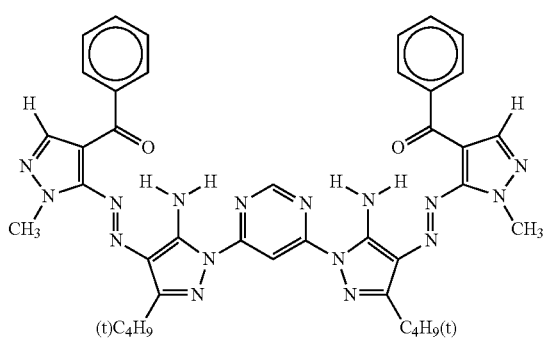
Figure 43:
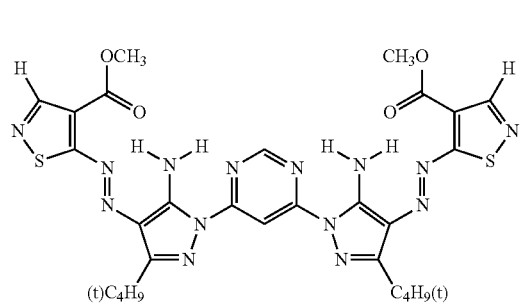
Figure 44:
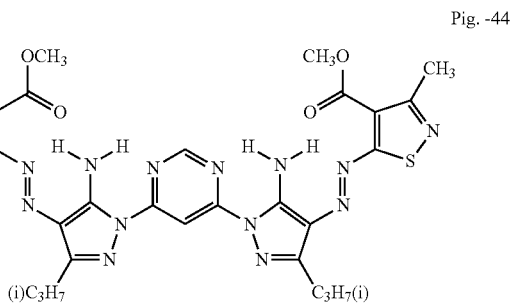
Figure 45:
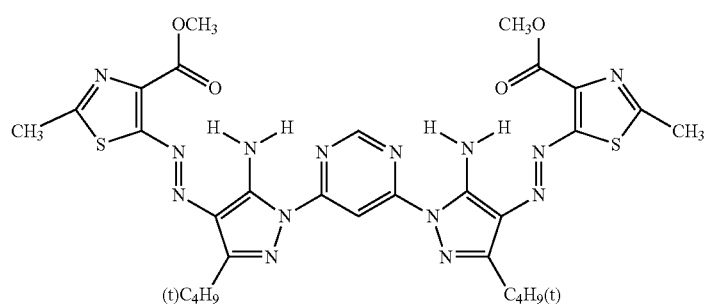
Figure 46:
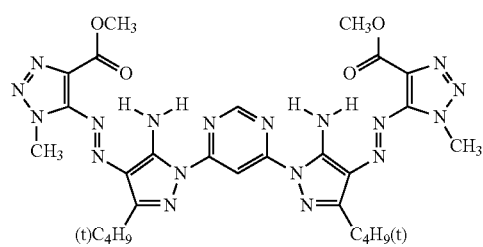
Figure 47:
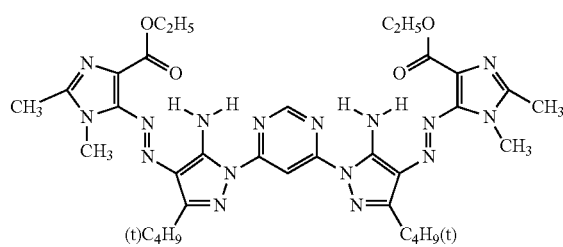
Figure 48:
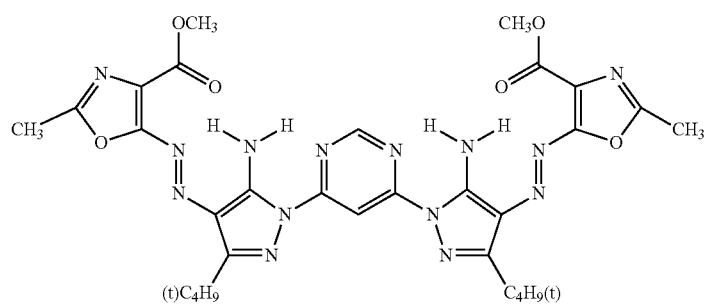
Figure 49:
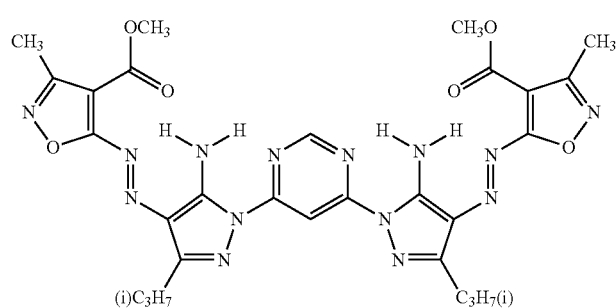
Figure 61:
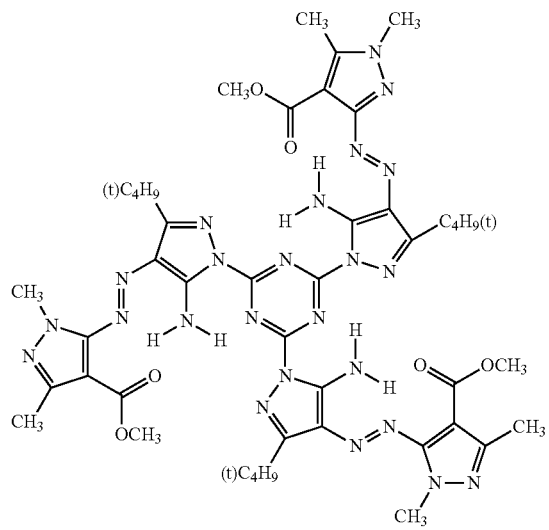
Figure 62:
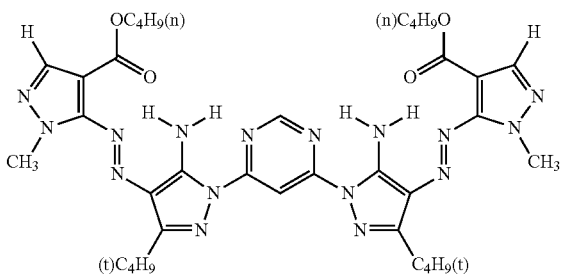
Figure 63:
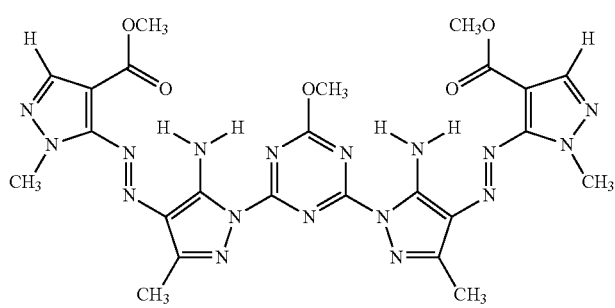
Figure 64:
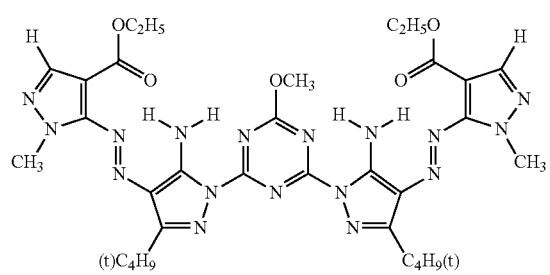
Figure 65:
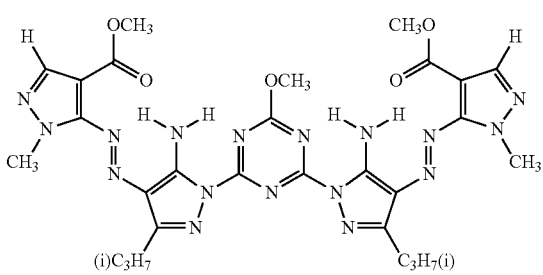
Figure 66:
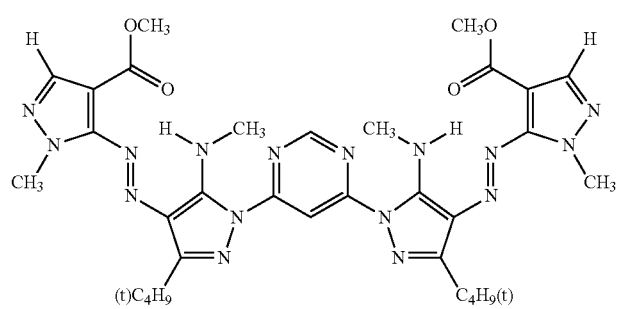

The present invention relates to a novel azo pigment-containing aqueous ink for inkjet recording, ensuring excellent dispersion stability and ejection stability and realizing an image quality free from density unevenness and streak unevenness.

BACKGROUND ART

Various mediums are being used as a recording medium for inkjet recording, and a high-definition image quality is required not only for inkjet exclusive paper but also for commercially available plain paper and printing mediums such as fine paper, coat paper and art paper. A pigment is preferred as an ink color material capable of giving fastness such as water resistance and light resistance on plain paper or a printing medium, and studies on an aqueous pigment ink are being variously made, including the aspect of cost. Among these, an azo pigment is preferably used as a yellow pigment for inkjet recording.

However, it is revealed that density unevenness and streak unevenness are produced when the ink is aged for a long period of time or at a high temperature.

As an aqueous ink for inkjet recording, a water dispersion for inkjet recording having an aqueous pigment dispersion containing C.I. Pigment Yellow 74 and an anionic group-containing organic polymer compound is disclosed (see, for example, Patent document 1). Specifically, it is indicated that when C.I. Pigment Yellow 74 is used as a pigment and a copolymer of n-butyl methacrylate, n-butyl acrylate, 2-hydroxyethyl methacrylate, methacrylic acid and styrene is used as a dispersant, dispersibility and dispersion stability can be ensured and a sharp image can be formed.

RELATED ART

Patent Document

Patent Document 1: JP-A-2000-239594 (the term "JP-A" as used herein means an "unexamined published Japanese patent application")

SUMMARY OF THE INVENTION

Problems that the Invention is to Solve

However, the aqueous ink for inkjet recording described in Patent Document 1, which is composed using a water dispersion of pigment, is found to deteriorate in the ejection accuracy and fail in reaching a satisfactory level in terms of density unevenness and streak unevenness when used after storage for a long period of time or aging at a high temperature.

An object of the present invention is to provide an aqueous ink for inkjet recording, ensuring that even after storage for a long period of time or exposure to a high temperature, the ejection accuracy is excellent and generation of density unevenness and streak unevenness can be suppressed.

Means for Solving the Problems

The present inventors have found that when a colored particle is formed using a vinyl polymer having a specific structure for an azo pigment having a heterocyclic ring in which a carbon atom adjacent to the carbon atom bonded to an azo group is substituted with a carbonyl group capable of forming an intramolecular hydrogen bond, an aqueous ink for inkjet recording, ensuring that even after storage for a long period of time or exposure to a high temperature, the ejection accuracy is excellent and generation of density unevenness and streak unevenness can be suppressed, is obtained.

That is, the object of the present invention is attained by the following techniques.

[1] An aqueous ink for inkjet recording, comprising a vinyl polymer particle containing A and B and a water-soluble solvent:

A: an azo pigment represented by the following formula (1), its tautomer, or a salt or hydrate thereof;

B: a vinyl polymer containing (a) a hydrophobic structural unit having an aromatic ring bonded to the polymer main chain through a linking group and (b) a hydrophilic structural unit:

[Chem. 1]

(1):

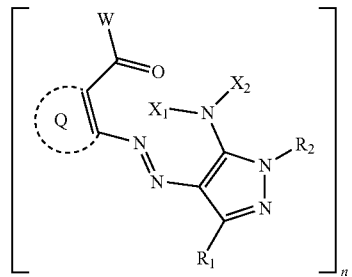

(wherein Q represents a 5- to 7-membered heterocyclic ring together with the carbon atoms, W represents an alkoxy group, an amino group, an alkyl group or an aryl group, $X_1$ and $X_2$ each independently represents a hydrogen atom, an alkyl group, an acyl group, an alkylsulfonyl group or an arylsulfonyl group, $R_1$ represents a hydrogen atom or a substituent, $R_2$ represents a heterocyclic group, n represents an integer of 1 to 4, and the formula represents a dimer through Q, W, $X_1$, $X_2$, $R_1$ or $R_2$ when n=2, and the formula represents a trimer through Q, W, $X_1$, $X_2$, $R_1$ or $R_2$ when n=3, and the formula represents a tetramer through Q, W, $X_1$, $X_2$, $R_1$ or $R_2$ when n=4).

[2] The aqueous ink for inkjet recording as claimed in [1], wherein the hydrophobic structural unit (a) contains (a1) a hydrophobic structural unit represented by the following formula (I):

[Chem. 2]

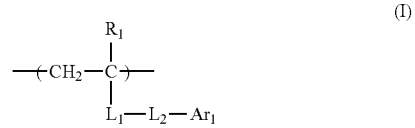

(wherein $R_1$ represents a hydrogen atom, a methyl group or a halogen atom, $L_1$ represents —COO—, —COO—, —CONR$_2$—, —O— or a substituted or unsubstituted phenylene group, $R_2$ represents a hydrogen atom or an alkyl group, $L_2$ represents a single bond or a divalent linking group, and $Ar_1$ represents a monovalent group derived from an aromatic ring).

[3] The aqueous ink for inkjet recording as claimed in [1] or [2], wherein the hydrophobic structural unit (a) further contains (a2) a hydrophobic structural unit derived from an alkyl ester of acrylic or methacrylic acid.

[4] The aqueous ink for inkjet recording as claimed in any one of [1] to [3], wherein the hydrophobic structural unit (a) contains at least one structural unit selected from a structural unit derived from a phenoxyethyl(meth)acrylate and a structural unit derived from a benzyl(meth)acrylate in a ratio of, in terms of the total amount, 20 mass % or more based on the entire mass of the vinyl polymer, and the hydrophilic structural unit (b) contains at least one structural unit selected from structural units derived from an acrylic acid or a methacrylic acid in a ratio of, in terms of the total amount, 30 mass % or less based on the entire mass of the vinyl polymer.

[5] The aqueous ink for inkjet recording as claimed in any one of [1] to [4], wherein the hydrophobic structural unit (a) contains a structural unit derived from a phenoxyethyl(meth)acrylate in a ratio of, in terms of the total amount, 20 mass % or more based on the entire mass of the vinyl polymer.

[6] The aqueous ink for inkjet recording as claimed in any one of [1] to [5], wherein the azo pigment represented by formula (1) is represented by the following formula (2):

[Chem. 3]

(2):

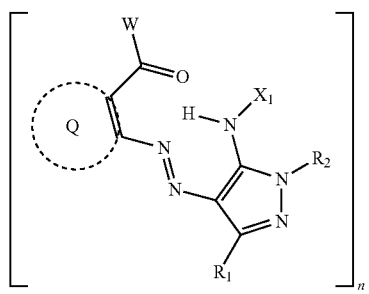

(wherein Q, W, $X_1$, $R_1$, $R_2$ and n have the same meanings as Q, W, $X_1$, $R_1$, $R_2$ and n in the formula (1) above).

[7] The aqueous ink for inkjet recording as claimed in any one of [1] to [6], wherein in formula (1), Q forms a 5-membered nitrogen-containing heterocyclic ring together with the carbon atoms.

[8] The aqueous ink for inkjet recording as claimed in any one of [1] to [7], wherein in formula (1), n is 2.

[9] The aqueous ink for inkjet recording as claimed in any one of claims [6] to [8], wherein in formula (2), $X_1$ is a hydrogen atom.

[10] The aqueous ink for inkjet recording as claimed in any one of [1] to [6], wherein the azo pigment represented by formula (1) is represented by the following formula (3):

[Chem. 4]

(3):

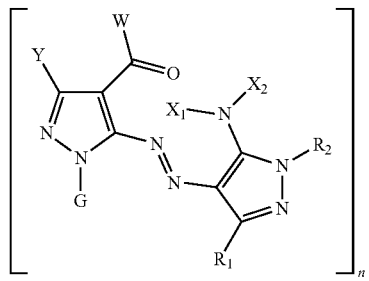

(wherein Y represents a hydrogen atom or a substituent, G represents a hydrogen atom, an alkyl group, a cycloalkyl group, an aralkyl group, an alkenyl group, an alkynyl group, an aryl group or a heterocyclic group, and W, $X_1$, $X_2$, $R_1$, $R_2$ and n have the same meanings as W, $X_1$, $X_2$, $R_1$, $R_2$ and n in formula (1)).

[11] The aqueous ink for inkjet recording as claimed in [10], wherein the azo pigment represented by formula (3) is represented by the following formula (4):

[Chem. 5]

(4):

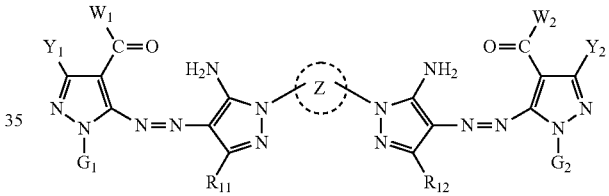

(wherein Z represents a 5- to 8-membered nitrogen-containing heterocyclic ring, $Y_1$, $Y_2$, $R_{11}$ and $R_{12}$ each independently represents a hydrogen atom or a substituent, $G_1$ and $G_2$ each independently represents a hydrogen atom, an alkyl group, a cycloalkyl group, an aralkyl group, an alkenyl group, an alkynyl group, an aryl group or a heterocyclic group, and $W_1$ and $W_2$ each independently represents an alkoxy group, an amino group, an alkyl group or an aryl group).

[12] The aqueous ink for inkjet recording as claimed in any one of [1] to [11], wherein W, $W_1$ and $W_2$ each is independently an alkoxy group having a total carbon number of 3 or less, an amino group, or an alkylamino group having a total carbon number of 3 or less.

[13] The aqueous ink for inkjet recording as claimed in [10] or [11], wherein G, $G_1$ and $G_2$ each is independently an alkyl group having a total carbon number of 3 or less.

[14] The aqueous ink for inkjet recording as claimed in any one of [11] to [13], wherein Z is a 6-membered nitrogen-containing heterocyclic ring.

Advantage of the Invention

According to the present invention, an aqueous ink for inkjet recording, ensuring that even after storage for a long period of time or exposure to a high temperature, the ejection accuracy is excellent and generation of density unevenness and streak unevenness can be suppressed, can be provided.

MODE FOR CARRYING OUT THE INVENTION

The present invention is described in detail below.

The aqueous ink for inkjet recording of the present invention comprises a vinyl polymer particle containing A and B and a water-soluble solvent:

A: an azo pigment represented by the following formula (1), its tautomer, or a salt or hydrate thereof;

B: a vinyl polymer containing (a) a hydrophobic structural unit having an aromatic ring bonded to the polymer main chain through a linking group and (b) a hydrophilic structural unit:

[Chem. 6]

(1):

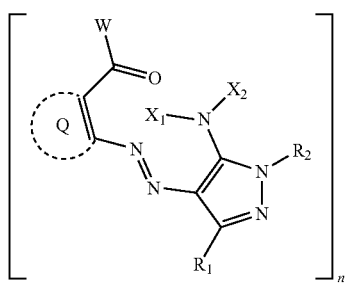

(in the formula (1), Q represents a 5- to 7-membered heterocyclic ring together with the carbon atoms, W represents an alkoxy group, an amino group, an alkyl group or an aryl group, $X_1$ and $X_2$ each independently represents a hydrogen atom, an alkyl group, an acyl group, an alkylsulfonyl group or an arylsulfonyl group, $R_1$ represents a hydrogen atom or a substituent, $R_2$ represents a heterocyclic group, n represents an integer of 1 to 4, and the formula represents a dimer through Q, W, $X_1$, $X_2$, $R_1$ or $R_2$ when n=2, and the formula represents a trimer through Q, W, $X_1$, $X_2$, $R_1$ or $R_2$ when n=3, and the formula represents a tetramer through Q, W, $X_1$, $X_2$, $R_1$ or $R_2$ when n=4).

<(a) Hydrophobic Structural Unit Having an Aromatic Ring Bonded to the Polymer Main Chain Through a Linking Group>

The aromatic ring in the (a) hydrophobic structural unit having an aromatic ring bonded to the polymer main chain through a linking group (hereinafter, sometimes simply referred to as a "hydrophobic structural unit (a)") is not particularly limited but includes a benzene ring, a condensed aromatic ring having a carbon number of 8 or more, an aromatic ring-condensed heterocyclic ring, and a ring formed by linking two or more benzene rings.

The condensed aromatic ring having a carbon number of 8 or more is an aromatic compound having a carbon number of 8 or more where the ring is composed of an aromatic ring formed by fusing at least two or more benzene rings, and/or at least one or more kinds of aromatic rings and an alicyclic hydrocarbon fused to the aromatic ring. Specific examples thereof include naphthalene, anthracene, fluorene, phenanthrene and acenaphthene.

The aromatic ring-condensed heterocyclic ring is a compound where a heteroatom-free aromatic compound (preferably a benzene ring) and a heteroatom-containing cyclic compound are at least fused. Here, the heteroatom-containing cyclic compound is preferably a 5-membered ring or a 6-membered ring. The heteroatom is preferably a nitrogen atom, an oxygen atom or a sulfur atom. The heteroatom-containing cyclic compound may have a plurality of heteroatoms and in this case, each heteroatom may be the same as or different from every other heteroatoms. Specific examples of the aromatic ring-condensed heterocyclic ring include phthalimide, acridone, carbazole, benzoxazole and benzothiazole.

Specific examples of the ring formed by linking two or more benzene rings include a 4-phenyl-phenyl ring and a 4"-cyano-phenyl-4-phenyl ring.

The linking group in the hydrophobic structural unit (a) includes —COO—, —OCO—, —CONR$_2$—, —O—, an alkylene group, a substituted or unsubstituted phenylene group and a combination thereof The main chain in the hydrophobic structural unit (a) includes a vinyl bond, an ester bond and a urethane bond, with a vinyl bond being preferred.

The (a) hydrophobic structural unit having an aromatic ring bonded to the main chain of the high-molecular polymer through a linking group preferably contains (a1) a hydrophobic structural unit represented by formula (I). The hydrophobic structural unit (a) may further contain (a2) a hydrophobic structural unit derived from an alkyl ester of acrylic or methacrylic acid.

((a1) Hydrophobic Structural Unit Represented by Formula (I))

The content of the hydrophobic structural unit (a1) represented by formula (I) (hereinafter, sometimes simply referred to as a "hydrophobic structural unit (a1)") is, in view of dispersion stability, ejection accuracy and cleanability of the pigment, preferably from 10 mass % to less than 75 mass %, more preferably from 20 mass % to less than 70 mass %, still more preferably from 30 mass % to less than 60 mass %, based on the entire mass of the vinyl polymer.

[Chem. 7]

(I):

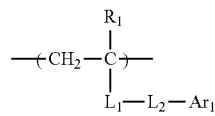

In formula (I), $R_1$ represents a hydrogen atom, a methyl group or a halogen atom, $L_1$ represents —COO—, —COO—, —CONR$_2$—, —O— or a substituted or unsubstituted phenylene group, $R_2$ represents a hydrogen atom or an alkyl group, $L_2$ represents a single bond or a divalent linking group, and $Ar_1$ represents a monovalent group derived from an aromatic ring.

$R_1$ represents a hydrogen atom, a methyl group or a halogen atom and is preferably a hydrogen atom or a methyl group, more preferably a methyl group.

The alkyl group represented by $R_2$ is preferably an alkyl group having a carbon number of 1 to 10, and examples thereof include a methyl group, an ethyl group, an n-propyl group, an isopropyl group and a tert-butyl group.

Here, the substituent above includes a halogen atom, an alkyl group, an alkoxy group, a hydroxy group and the like but is not particularly limited.

$L_1$ represents —COO—, —COO—, —CONR$_2$—, —O— or a substituted or unsubstituted phenylene group and is preferably —COO—.

$L_2$ is, when it is a divalent linking group, preferably a linking group having a carbon number of 1 to 30, more preferably a linking group having a carbon number of 1 to 25, still more preferably a linking group having a carbon number of 1 to 20. Above all, a divalent linking group having a carbon number of 1 to 25 and containing at least one member selected from an alkyleneoxy group and an alkylene group is preferred, and —($CH_2$—$CH_2$)$_n$—, —($CH_2O$)$_n$— or —($CH_2$—$CH_2$—O)$_n$— (n represents an average number of repeating units and n=1 to 6; n is preferably 1 or 2, more preferably 1) is preferred.

The aromatic ring in $Ar_1$ is not particularly limited but includes a benzene ring, a condensed aromatic ring having a carbon number of 8 to 18, an aromatic ring-condensed heterocyclic ring, and a ring formed by linking two or more benzene rings.

The condensed aromatic ring having a carbon number of 8 or more is an aromatic compound having a carbon number of 8 or more where the ring is composed of an aromatic ring formed by fusing at least two or more benzene rings, and/or at least one or more kinds of aromatic rings and an alicyclic hydrocarbon fused to the aromatic ring. Specific examples thereof include a naphthalene ring, an anthracene ring, a fluorene ring, a phenanthrene ring and an acenaphthene ring.

The aromatic ring-condensed heterocyclic ring is a compound where a heteroatom-free aromatic compound (preferably a benzene ring) and a heteroatom-containing cyclic compound are at least fused. Here, the heteroatom-containing cyclic compound is preferably a 5-membered ring or a 6-membered ring. The heteroatom is preferably a nitrogen atom, an oxygen atom or a sulfur atom. The heteroatom-containing cyclic compound may have a plurality of heteroatoms and in this case, each heteroatom may be the same as or different from every other heteroatoms. Specific examples of the aromatic ring-condensed heterocyclic ring include a phthalimide ring, an acridone ring, a carbazole ring, a benzoxazole ring and a benzothiazole ring.

The hydrophobic structural unit (a1) represented by formula (I) is preferably at least one structural unit selected from structural units derived from an acrylate or a methacrylate. When the structural unit is at least one structural unit selected from structural units derived from an acrylate or a methacrylate, an aromatic ring can be bonded to the main chain through an ester bond, and a steric structure where an aromatic ring expected to undergo interaction such as adsorption with pigment has freedom with respect to the main chain, can be configured.

Also, the hydrophobic structural unit (a1) represented by formula (I) preferably contains a monovalent group derived from a benzene ring, a condensed aromatic ring having a carbon number of 8 or more, an aromatic ring-condensed heterocyclic ring, or a ring formed by linking two or more benzene rings. Because, by employing the aromatic ring above, interaction such as adsorption with pigment can be exerted.

$Ar_1$ is preferably a benzene ring, a naphthalene ring, an anthracene ring, a fluorene ring, a phenanthrene ring, an acenaphthene ring, a phthalimide ring, an acridone ring, a carbazole ring, a benzoxazole ring or a benzothiazole ring, more preferably a benzene ring, a naphthalene ring or an acridone ring, still more preferably a benzene ring.

Among the structures of formula (I), a combination of structural unites where $R_1$ is a hydrogen atom or a methyl group, $L_1$ is (main chain side)-COO—, $L_2$ is a divalent linking group having a carbon number of 1 to 25 and containing at least one member selected from an alkyleneoxy group and an alkylene group, and $Ar_1$ is an aryl ring, is preferred, and a combination of structural units where $R_1$ is a hydrogen atom or a methyl group, $L_1$ is (main chain side)-COO—, $L_2$ is (main chain side)-$CH_2$—$CH_2$—O)$_n$— (n represents an average number of repeating units and n=1 to 6; n is preferably 1 or 2, more preferably 1) and $Ar_1$ is a benzene ring, is more preferred.

Specific examples of the monomer capable of forming the hydrophobic structural unit (a1) represented by formula (I) are illustrated below, but the present invention is not limited to the following specific examples.

[Chem. 8]

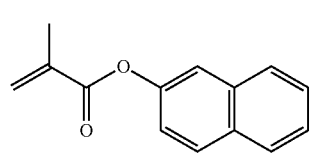

M-1

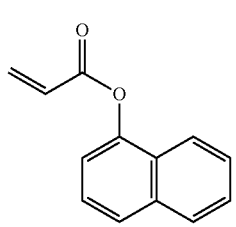

M-2

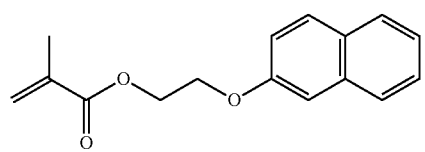

M-3

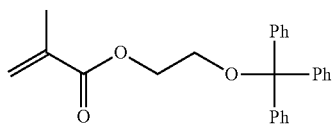

M-4

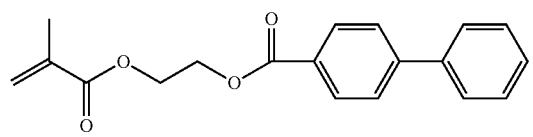

M-5

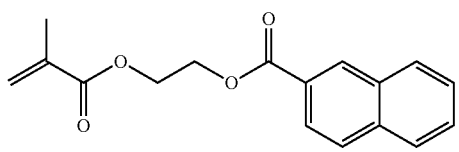

M-6

-continued
M-7
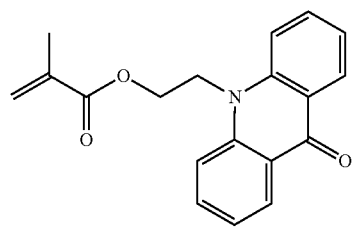
M-8
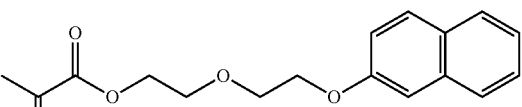
M-9
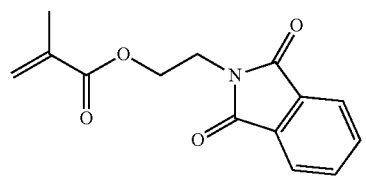
M-10
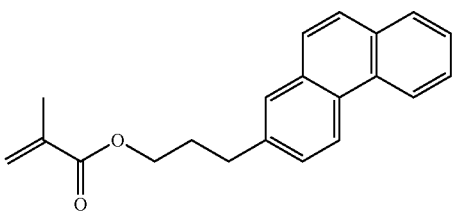
M-11
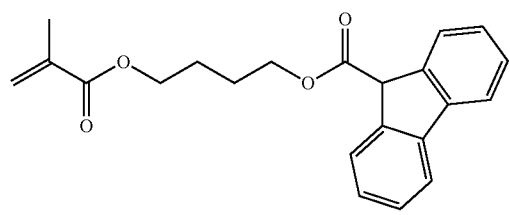
M-12
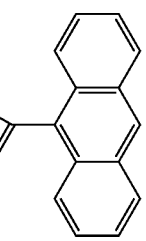
M-13
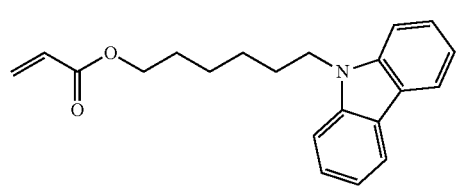
M-14
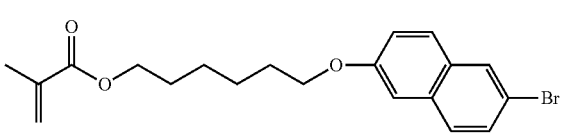
M-15
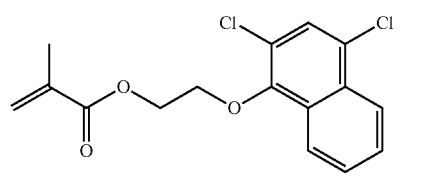
M-16
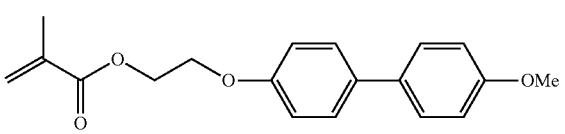
M-17
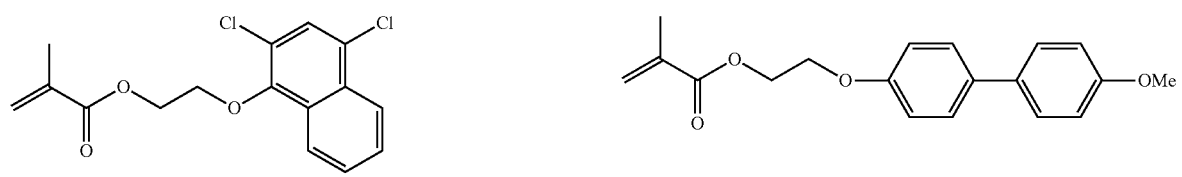
M-18
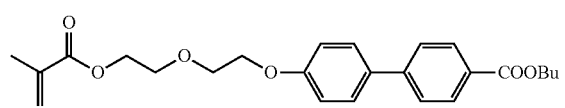
M-19
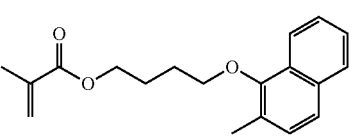

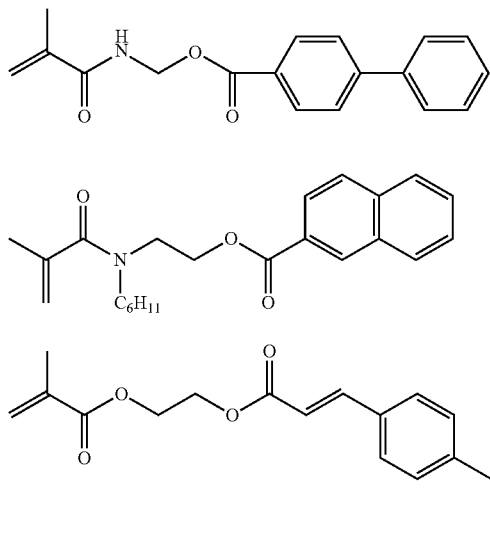

M-20, M-21, M-22, M-23, M-24

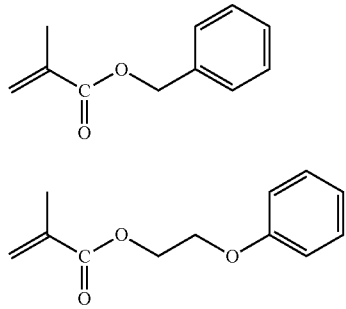

[Chem.9]

M-25, M-26, M-27, M-28

In the present invention, among the hydrophobic structural units (a1) represented by formula (I), in view of dispersion stability, the polymer preferably contains a structural unit derived from at least one member selected from benzyl acrylate, benzyl methacrylate, phenoxyethyl acrylate and phenoxyethyl methacrylate, more preferably at least one member selected from phenoxyethyl methacrylate, benzyl acrylate and benzyl methacrylate.

In the present invention, the hydrophobic structural unit (a) more preferably contains a structural unit derived from a phenoxyethyl(meth)acrylate in a ratio of, in terms of the total amount, 20 mass % or more based on the entire mass of the vinyl polymer ((a2) Hydrophobic Structural Unit Derived from an Alkyl Ester of Acrylic or Methacrylic Acid)

The hydrophobic structural unit (a) may contain (a2) a hydrophobic structural unit derived from an alkyl ester of acrylic or methacrylic acid.

The carbon number of the alkyl ester is preferably from 1 to 18, more preferably from 1 to 8, still more preferably from 1 to 4, yet still more preferably from 1 to 2.

The content of the hydrophobic structural unit (a2) is preferably from 5 to 70 mass %, more preferably from 20 to 60 mass %, based on the high molecular vinyl polymer.

Specific examples of the hydrophobic structural unit (a2) include (meth)acrylates such as methyl(meth)acrylate, ethyl (meth)acrylate, (iso)propyl (meth)acrylate, (iso or tertiary)-butyl(meth)acrylate, cyclohexyl(meth)acrylate, dodecyl (meth)acrylate and stearyl(meth)acrylate.

Among these, methyl(meth)acrylate, ethyl(meth)acrylate and cyclohexyl (meth)acrylate are preferred.

<Hydrophilic Structural Unit (b)>

The hydrophilic structural unit (b) contained in the vinyl polymer for use in the present invention is described below.

Examples of the hydrophilic structural unit (b) include an acrylic acid and a methacrylic acid, each having a carboxylic acid. A hydrophilic structural unit containing a nonionic hydrophilic group may also be used.

Examples of the hydrophilic structural unit (b) include (meth)acrylates, (meth)acrylamides and vinyl esters, each having a hydrophilic functional group.

The hydrophilic functional group includes a hydroxyl group, an amino group, an amide group (with the nitrogen atom being unsubstituted), and the later described alkylene oxide polymer such as polyethylene oxide and polypropylene oxide.

Among these, hydroxyethyl(meth)acrylate, hydroxybutyl (meth)acrylate, (meth)acrylamide, aminoethyl acrylate, aminopropyl acrylate, and an alkylene oxide polymer-containing (meth)acrylate are preferred.

The hydrophilic structural unit (b) includes, as an example, a hydrophilic structural unit having an alkylene oxide polymer structure.

The carbon number of the alkylene in the alkylene oxide polymer is, in view of hydrophilicity, preferably from 1 to 6, more preferably from 2 to 6, still more preferably from 2 to 4.

The polymerization degree of the alkylene oxide polymer is preferably from 1 to 120, more preferably from 1 to 60, still more preferably from 1 to 30.

The hydrophilic structural unit (b) includes, as an example, a hydrophilic structural unit containing a hydroxyl group. The number of hydroxyl groups is not particularly limited and in view of hydrophilicity of the vinyl polymer and compatibility with the solvent or other monomers at the polymerization, is preferably from 1 to 4, more preferably from 1 to 3, still more preferably from 1 to 2.

Preferred examples of the hydrophilic structural unit (b) include an acrylic acid and a methacrylic acid.

The content of the hydrophilic structural unit (b) is preferably from 4 to 40 mass %, more preferably from 6 to 25 mass %, still more preferably form 8 to 15 mass %, based on the entire mass of the vinyl polymer.

<Structural Unit (c)>

The vinyl polymer for use in the present invention may contain, as described above, (c) a structural unit having a structure different from the hydrophobic structural unit (a1), the hydrophobic structural unit (a2) and the hydrophilic structural unit (b) (hereinafter, simply referred to as a "structural unit (c)").

The content of the structural unit (c) is preferably from 15 to 80 mass %, more preferably from 25 to 70 mass %, still more preferably form 40 to 60 mass %, based on the entire mass of the vinyl polymer.

The monomer when the structural unit (c) is a hydrophobic structural unit is not particularly limited as long as it has a functional group capable of forming a polymer and a hydrophobic functional group, and any of conventional monomers may be used.

The monomer capable of forming the hydrophobic structural unit is preferably vinyl monomers (e.g., (meth)acrylamides, styrenes, vinyl esters) in view of availability, handleability and general-purpose use.

The (meth)acrylamides include (meth)acrylamides such as N-cyclohexyl(meth)acrylamide, N-2-(methoxyethyl)(meth) acrylamide, N,N-diallyl(meth)acrylamide and N-allyl(meth) acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, methyl vinylbenzoate, α-methylstyrene and vinylnaphthalene, with styrene and α-methylstyrene being preferred.

Examples of the vinyl esters include vinyl esters such as vinyl acetate, vinyl chloroacetate, vinyl propionate, vinyl butyrate, vinyl methoxy acetate and vinyl benzoate, with vinyl acetate being preferred.

One of these may be used alone, or two or more thereof may be mixed and used.

The vinyl monomer may be composed of only the hydrophobic structural unit (a1) and the hydrophilic structural unit (b).

The aqueous ink for inkjet recording is preferably an aqueous ink where the hydrophobic structural unit (a) of the vinyl polymer contains at least one structural unit selected from a structural unit derived from a phenoxyethyl(meth)acrylate and a structural unit derived from a benzyl(meth)acrylate in a ratio of, in terms of the total amount, 20 mass % or more based on the entire mass of the vinyl polymer and the hydrophilic structural unit (b) contains at least one structural unit selected from structural units derived from an acrylic acid or a methacrylic acid in a ratio of, in terms of the total amount, 30 mass % or less based on the entire mass of the vinyl polymer.

In view of pigment dispersibility and storage stability, the acid value of the vinyl polymer for use in the present invention is preferably from 30 to 300 mgKOH/g, more preferably from 40 mgKOH/g to less than 150 mgKOH/g, still more preferably from 50 to 100 mgKOH/g.

The acid value as used herein is defined as the mass (mg) of KOH necessary for completely neutralizing 1 g of the vinyl polymer and can be measured by the method described in JIS Standards (JIS K0070, 1992).

The vinyl polymer for use in the present invention may be either a random copolymer in which respective structural units are randomly introduced or may be a block copolymer in which respective structural units are regularly introduced. In the case of a block copolymer, the polymer may be synthesized by introducing respective blocks in any order, and the same constituent component may be used for two or more blocks, but the vinyl polymer is preferably a random copolymer in view of general-purpose applicability and productability.

The molecular weight of the vinyl polymer for use in the present invention is, in terms of the mass average molecular weight (Mw), preferably from 30,000 to 150,000, more preferably from 30,000 to 100,000, still more preferably from 30,000 to 80,000.

The weight average molecular weight within the range above is preferred from the standpoint that the vinyl polymer is liable to provide a good steric repulsion effect as a dispersant and thanks to the steric effect, tends to reduce the time required for the adsorption to pigment.

Furthermore, the molecular weight distribution (represented by mass average molecular weight value/number average molecular weight value) of the vinyl polymer for use in the present invention is preferably from 1 to 6, more preferably from 1 to 4.

The molecular weight distribution within the range above is preferred in view of dispersion stability and ejection stability of the ink. The number average molecular weight and mass average molecular weight as used herein are a molecular weight measured by the differential refractometer detection with a solvent of THF in a GPC analyzer using column TSKgel GMHxL, TSKgel G4000HxL or TSKgel G2000HxL (all trade names, produced by Tosoh Corporation) and expressed in terms of polystyrene as the standard material.

The vinyl polymer for use in the present invention may be synthesized by various polymerization methods such as solution polymerization, precipitation polymerization, suspension polymerization, sedimentation polymerization, bulk polymerization and emulsion polymerization. The polymerization reaction may be performed by a known operation such as batch system, semi-continuous system and continuous system.

Examples of the method for initiating the polymerization include a method using a radical initiator and a method by the irradiation of light or radiation. The polymerization method and the method for initiating the polymerization are described in, for example, Teiji Tsuruta, *Kobunshi Gosei Houhou (Polymer Synthesis Method)*, revised edition, Nikkan Kogyo Shimbun (1971) and Takayuki Otsu and Masayoshi Kinoshita (co-authored), *Kobunshi Gosei no Jikkenn Ho (Experimental Technique For Polymer Synthesis)*, pp. 124-154, Kagaku Dojin (1972).

Among the above-described polymerization methods, a solution polymerization method using a radical initiator is particularly preferred. Example of the solvent for use in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol. These solvents may be used individually or as a mixture of two or more thereof or may be used as a mixed solvent with water.

The polymerization temperature needs to be set in connection with the molecular weight of the polymer to be produced and the kind of the initiator and is usually on the order of 0 to 100° C., but the polymerization is preferably performed at a temperature of 50 to 100° C.

The reaction pressure may be appropriately selected and is usually from 1 to 100 kg/cm$^2$, preferably on the order of 1 to 30 kg/cm$^2$. The reaction time is approximately from 5 to 30 hours. The obtained resin may be subjected to purification such as reprecipitation.

In view of dispersion stability, the ratio of the amount added of the vinyl polymer for use in the present invention is, on the mass basis, preferably from 10 to 100%, more preferably from 30 to 60%, based on the pigment.

<Azo Pigment>

The azo pigment for use in the present invention is represented by formula (1).

The azo pigment represented by the following formula (1) is described below.

The compound represented by formula (1) readily undergoes an intramolecular or intermolecular interaction of the colorant molecule due to its specific structure, exhibits low solubility in water, an organic solvent or the like, and can be used as an azo pigment in a preferred form.

Unlike a dye that is used by dissolving it in water or an organic solvent in a molecular dispersion state, the pigment is used by finely dispersing it as a particle such as molecular aggregate, in a medium.

[Chem. 10]

(1):

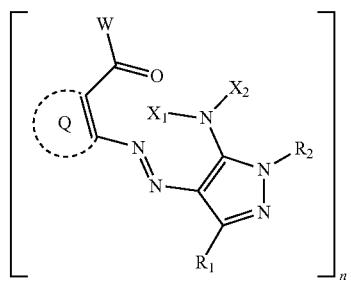

(in the formula (1), Q represents a 5- to 7-membered heterocyclic ring together with the carbon atoms, W represents an alkoxy group, an amino group, an alkyl group or an aryl group, $X_1$ and $X_2$ each independently represents a hydrogen atom, an alkyl group, an acyl group, an alkylsulfonyl group or an arylsulfonyl group, $R_1$ represents a hydrogen atom or a substituent, $R_2$ represents a heterocyclic group, n represents an integer of 1 to 4, and the structure represents a dimer through Q, W, $X_1$, $X_2$, $R_1$ or $R_2$ when n=2, represents a trimer through Q, W, $X_1$, $X_2$, $R_1$ or $R_2$ when n=3, and represents a tetramer through Q, W, $X_1$, $X_2$, $R_1$ or $R_2$ when n=4).

When n is 1, Q, W, $X_1$, $X_2$, $R_1$ and $R_2$ each represents a monovalent group and the azo pigment is the bracketed monoazo pigment.

When n is 2, Q, W, $X_1$, $X_2$, $R_1$ and $R_2$ each represents a monovalent or divalent group, provided that at least one thereof represents a divalent group, and the azo pigment is a bis-azo pigment of the bracketed colorant.

When n is 3, Q, W, $X_1$, $X_2$, $R_1$ and $R_2$ each represents a monovalent, divalent or trivalent group, provided that at least two thereof represents a divalent substituent or at least one thereof represents a trivalent group, and the azo pigment is a tris-azo pigment of the bracketed colorant.

When n is 4, Q, W, $X_1$, $X_2$, $R_1$ and $R_2$ each represents a monovalent, divalent or trivalent group, provided that at least two thereof represents a divalent substituent or at least one thereof represents a trivalent group or that at least one is a tetravalent group, and the azo pigment is a tetra-azo pigment.

n is preferably an integer of 1 to 3, more preferably 1 or 2, and most preferably 2. When n is 2, the solubility in water or an organic solvent is decreased (substantially insolubilized), and this is preferred in that the water resistance and chemical resistance are enhanced.

In formula (1), $X_1$ and $X_2$ each independently represents a hydrogen atom, an alkyl group, an acyl group, an alkylsulfonyl group or an arylsulfonyl group.

The alkyl groups represented by $X_1$ and $X_2$ each independently includes a linear, branched or cyclic, substituted or unsubstituted alkyl group and also includes a cycloalkyl group, a bicycloalkyl group and a cycloalkyl group having many ring structures, such as tricyclo structure. The alkyl group in the substituents described hereinafter (for example, the alkyl group of an alkoxy group, an alkylcarbonyl group or an alkylsulfonyl group) indicates an alkyl group having such a concept.

More specifically, the alkyl group is preferably an alkyl group having a carbon number of 1 to 30, more preferably a carbon number of 1 to 8, and examples thereof include a methyl group, an ethyl group, an n-propyl group, an i-propyl group, a tert-butyl group, an n-octyl group, an eicosyl group, a 2-chloroethyl group, a 2-cyanoethyl group and a 2-ethylhexyl group. The cycloalkyl group is preferably a substituted or unsubstituted cycloalkyl group having a carbon number of 3 to 30, and examples thereof include a cyclohexyl group, a cyclopentyl group and a 4-n-dodecylcyclohexyl group. The bicycloalkyl group is preferably a substituted or unsubstituted bicycloalkyl group having a carbon number of 5 to 30, that is, a monovalent group formed by removing one hydrogen atom from a bicycloalkane having a carbon number of 5 to 30, and examples thereof include bicyclo[1.2.2]heptan-2-yl group and bicyclo[2.2.2]octan-3-yl group.

The acyl groups represented by $X_1$ and $X_2$ each is independently, preferably a formyl group, a substituted or unsubstituted alkylcarbonyl group having a carbon number of 2 to 30, a substituted or unsubstituted arylcarbonyl group having a carbon number of 7 to 30, or a substituted or unsubstituted heterocyclic carbonyl group having a carbon number of 2 to 30, with the carbonyl group being bonded through a carbon atom, more preferably an alkylcarbonyl group having a carbon number of 1 to 8, a substituted or unsubstituted arylcarbonyl group having a carbon number of 7 to 18, or a substituted or unsubstituted heterocyclic carbonyl group having a carbon number of 2 to 18, with the carbonyl group being bonded through a carbon atom. Examples thereof include an acetyl group, a pivaloyl group, a 2-chloroacetyl group, a stearoyl group, a benzoyl group, a p-n-octyloxyphenylcarbonyl group, a 2-pyridylcarbonyl group and a 2-furylcarbonyl group.

The alkylsulfonyl groups or arylsulfonyl groups represented by $X_1$ and $X_2$ each is independently, preferably a substituted or unsubstituted alkylsulfonyl group having a carbon number of 1 to 30 or a substituted or unsubstituted arylsulfonyl group having a carbon number of 6 to 30, more preferably a substituted or unsubstituted alkylsulfonyl group having a carbon number of 1 to 8 or a substituted or unsubstituted arylsulfonyl group having a carbon number of 6 to 18. Examples thereof include a methylsulfonyl group, an ethylsulfonyl group, a phenylsulfonyl group and a p-methylphenylsulfonyl group.

Above all, $X_1$ and $X_2$ each is independently, preferably a hydrogen atom, an acyl group or an alkylsulfonyl group, more preferably a hydrogen atom, and it is still more preferred that both $X_1$ and $X_2$ are a hydrogen atom. In the case where at least either one or both of $X_1$ and $X_2$ are a hydrogen atom, the colorant molecule is liable to intramolecularly or intermolecularly form a strong hydrogen bond, and this makes it easy to configure a pigment having a more stable molecular arrangement, whereby better hue and higher fastness (for example, light fastness, gas resistance, heat resistance, water resistance and chemical resistance) can be achieved.

In formula (1), W represents an alkoxy group, an amino group, an alkyl group, or an aryl group.

The alkoxy group represented by W is preferably a substituted or unsubstituted alkoxy group having a carbon number of 1 to 30, more preferably a substituted or unsubstituted alkoxy group having a carbon number of 1 to 5. Examples thereof include a methoxy group, an ethoxy group, an i-propoxy group, a tert-butoxy group, an n-octyloxy group and a 2-methoxyethoxy group.

The amino group represented by W includes an alkylamino group, an arylamino group and a heterocyclic amino group and is preferably an amino group, a substituted or unsubstituted alkylamino group having a carbon number of 1 to 30, or a substituted or unsubstituted anilino group having a carbon number of 6 to 30, more preferably an amino group, a substituted or unsubstituted alkylamino group having a carbon number of 1 to 8, or a substituted or unsubstituted anilino group having a carbon number of 6 to 18, still more preferably an amino group, a substituted or unsubstituted alkylamino group having a carbon number of 1 to 4, or a substituted or unsubstituted anilino group having a carbon number of 6 to 12, for example, an amino group (—$NH_2$), a methylamino group (—$NHCH_3$), a dimethylamino group {—$N(CH_3)_2$}, an anilino group (—NHPh), an N-methyl-anilino group {—N($CH_3$)Ph} or a diphenylamino group {—$N(Ph)_2$}.

Examples thereof include a methylamino group, a dimethylamino group, an anilino group, an N-methylanilino group and a diphenylamino group.

The alkyl group represented by W includes a linear, branched or cyclic, substituted or unsubstituted alkyl group and also includes a cycloalkyl group, a bicycloalkyl group and a cycloalkyl group having many ring structures, such as tricyclo structure. The alkyl group in the substituents described hereinafter (for example, the alkyl group of an alkoxy group or an alkylthio group) indicates an alkyl group having such a concept. More specifically, the alkyl group is preferably an alkyl group having a carbon number of 1 to 30, and examples thereof include a methyl group, an ethyl group, an n-propyl group, an i-propyl group, an n-butyl group, an i-butyl group, a s-butyl group, a tert-butyl group, an n-octyl group, an eicosyl group, a 2-chloroethyl group, a 2-cyanoethyl group and a 2-ethylhexyl group. The cycloalkyl group is preferably a substituted or unsubstituted cycloalkyl group having a carbon number of 3 to 30, and examples thereof include a cyclohexyl group, a cyclopentyl group and a 4-n-dodecylcyclohexyl group. The bicycloalkyl group is preferably a substituted or unsubstituted bicycloalkyl group having a carbon number of 5 to 30, that is, a monovalent group formed by removing one hydrogen atom from a bicycloalkane having a carbon number of 5 to 30, and examples thereof include bicyclo[1.2.2]heptan-2-yl group and bicyclo[2.2.2]octan-3-yl group.

The aryl group represented by W is preferably a substituted or unsubstituted aryl group having a carbon number of 6 to 30, and examples thereof include a phenyl group, a p-tolyl group, a naphthyl group, an m-chlorophenyl group and an o-hexadecanoylaminophenyl group.

The aryl group is preferably a substituted or unsubstituted aryl group having a carbon number of 6 to 30, more preferably a substituted or unsubstituted aryl group having a carbon number of 6 to 18, still more preferably a substituted or unsubstituted aryl group having a carbon number of 6 to 12, and examples thereof include a phenyl group, a p-tolyl group, a naphthyl group, an m-chlorophenyl group and an o-hexadecanoylaminophenyl group.

W is preferably an alkoxy group (e.g., methoxy group, ethoxy group, i-propoxy group, tert-butoxy group), an amino group (e.g., —$NH_2$ group, methylamino group, dimethylamino group, aniline group), an alkyl group (e.g., methyl group, ethyl group, n-propyl group, i-propyl group, tert-butyl group, cyclopropyl group) or an aryl group (e.g., phenyl group, p-tolyl group, naphthyl group), more preferably an alkoxy group, an amino group, a phenyl group or an alkyl group, still more preferably an alkoxy group or an amino group.

Above all, an alkoxy group having a total carbon number of 5 or less, an amino group (an —$NH_2$ group) or an alkylamino group having a total carbon number of 5 or less is preferred. When W is an alkoxy group having a total carbon number of 5 or less, an amino group or an alkylamino group having a total carbon number of 5 or less, the colorant molecule is liable to at least either intramolecularly or intermolecularly form a strong hydrogen bond, and this is preferred in view of good hue and high fastness (for example, light fastness, gas resistance, heat resistance, water resistance and chemical resistance).

In particular, from the standpoint of hue, light fastness and solvent resistance, W is preferably an alkoxy group having a total carbon number of 3 or less, an amino group (an —$NH_2$ group) or an alkylamino group having a total carbon number of 3 or less, more preferably a methoxy group (an —$OCH_3$ group) or an ethoxy group (an —$OC_2H_5$ group), and in view of good hue and enhanced light fastness, most preferably a methoxy group.

In formula (1), $R_1$ represents a hydrogen atom or a substituent. Examples of the substituent when $R_1$ represents a substituent include a linear or branched alkyl group having a carbon number of 1 to 12, a linear or branched aralkyl group having a carbon number of 7 to 18, a linear or branched alkenyl group of having 2 to 12, a linear or branched alkynyl group having a carbon number of 2 to 12, a linear or branched cycloalkyl group having a carbon number of 3 to 12, a linear or branched cycloalkenyl group having a carbon number of 3 to 12 (e.g., methyl, ethyl, n-propyl, i-propyl, n-butyl, i-butyl, sec-butyl, tert-butyl, 2-ethylhexyl, 2-methylsulfonylethyl, 3-phenoxypropyl, trifluoromethyl, cyclopentyl), a halogen atom (e.g., chlorine atom, bromine atom), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxy group, a nitro group, a carboxy group, an amino group, an alkyloxy group (e.g., methoxy, ethoxy, 2-methoxyethoxy, 2-methylsulfonylethoxy), an aryloxy group (e.g., phenoxy, 2-methylphenoxy, 4-tert-butylphenoxy, 3-nitrophenoxy, 3-tert-butyloxycarbonylphenoxy, 3-methoxycarbonylphenyloxy), an acylamino group (e.g., acetamido, benzamido, 4-(3-tert-butyl-4-hydroxyphenoxy)butaneamido), an alkylamino group (e.g., methylamino, butylamino, diethylamino, methylbutylamino), an arylamino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), an alkylsulfonylamino group and an arylsulfonylamino group (e.g., methylsulfonylamino, phenylsulfonylamino, p-toluenesulfonylamino), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methylsulfonyl, octylsulfonyl, phenylsulfonyl, p-toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxy group, a sulfo group).

In formula (1), $R_1$ is preferably a substituted or unsubstituted acylamino group having a total carbon number of 1 to 8, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear or branched alkyl group having a total carbon number of 1 to 8, still more preferably a methyl group, an i-propyl group or a tert-butyl group, yet still more preferably an i-propyl group or a tert-butyl group, and most preferably a tert-butyl group.

When $R_1$ is a linear or branched alkyl group having a small total carbon number (for example, a carbon number of 1 to 4), more excellent hue, tinctorial strength and fastness of image can be achieved.

In formula (1), $R_2$ represents a heterocyclic group, which may be further fused. $R_2$ is preferably a 5- to 8-membered heterocyclic group, more preferably a 5- or 6-membered substituted or unsubstituted heterocyclic group, still more preferably a 6-membered nitrogen-containing heterocyclic group having a carbon number of 3 to 10.

Examples of the heterocyclic group represented by $R_2$ include, without limiting the substitution position, pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidinyl, piperazinyl, imidazolidinyl, thiazolinyl and sulfolanyl.

Preferred examples of the heterocyclic group include pyridyl, pyrimidinyl, S-triazinyl, pyridazinyl, pyrazinyl, 1,2,4-thiadiazolyl, 1,3,4-thiadiazolyl and imidazolyl. Among these, pyridyl, pyrimidinyl, S-triazinyl, pyridazinyl and pyrazinyl are more preferred, pyrimidinyl and S-triazinyl are still more preferred in view of hue, tinctorial strength and fastness of image, pyrimidinyl having a substituent at 4- and 6-positions and S-triazinyl having an alkoxy group at 2-position and having a carbon number of 1 to 4 are yet still more preferred in view of hue and fastness of image, and pyrimidinyl having substituents at 4- and 6-positions is most preferred in view of good hue and enhanced light fastness.

In formula (1), Q represents a 5- to 7-membered heterocyclic ring together with the carbon atoms, and an aliphatic ring, aromatic ring or another heterocyclic ring may be condensed to the heterocyclic ring. Examples of the 5- to 7-membered heterocyclic ring formed by Q together with the carbon atoms include a thienyl group, a furyl group, a pyrrolyl group, an indolyl group, an imidazolyl group, a pyrazolyl group, a thiazolyl group, an isothiazolyl group, an oxazolyl group, an isoxazolyl group, a triazinyl group, a pyridyl group, a pyrazinyl group and a pyridazinyl group. Each heterocyclic ring may further have a substituent.

The 5- to 7-membered heterocyclic ring represented by Q together with the carbon atoms is preferably a 5-membered nitrogen-containing heterocycle, and most preferably any of heterocyclic rings represented by the following formulae (a) to (j).

Among these, any of heterocyclic rings represented by formulae (a) to (0 and (j) is preferred, any of heterocyclic rings represented by formulae (a), (b), (c), (e) and (j) is more preferred, any of heterocyclic rings represented by formulae (a) or (c) is still more preferred, and a heterocyclic ring represented by formula (a) is most preferred in view of hue, tinctorial strength and fastness of image. Incidentally, in the following formulae (a) to (j), "*" denotes the bonding position to an azo group in formula (1).

[Chem. 11]

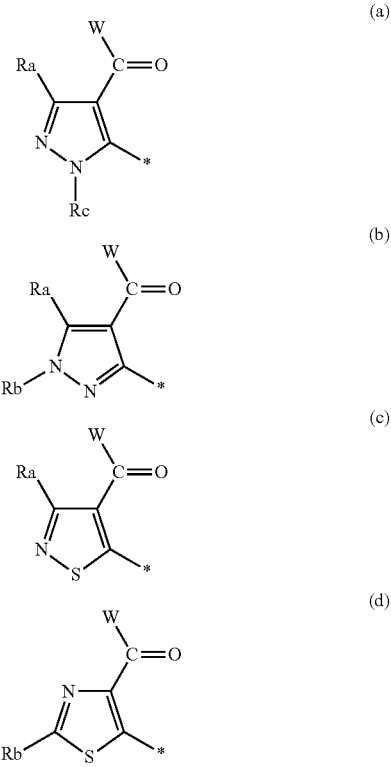

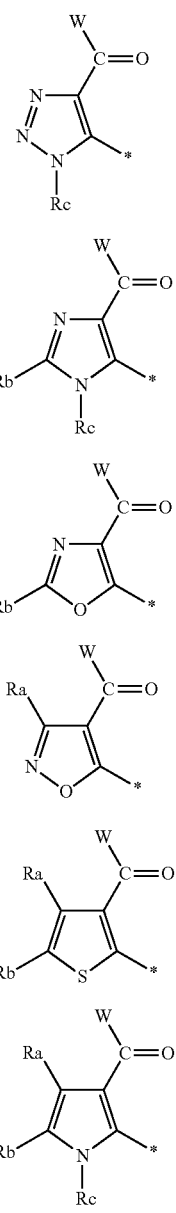

In Formulae (a) to (j), Ra represents a hydrogen atom or a substituent. Rb and Rc each independently represents a hydrogen atom, an alkyl group, a cycloalkyl group, an aralkyl group, an alkenyl group, an alkynyl group, an aryl group or a heterocyclic group. W has the same meaning as W in formula (1), and preferred examples thereof are also the same.

W is preferably an alkoxy group (e.g., methoxy group, ethoxy group, i-propoxy group, tert-butoxy group), an amino group (e.g., —NH$_2$ group, methylamino group, dimethylamino group, aniline group), an alkyl group (e.g., methyl group, ethyl group, n-propyl group, i-propyl group, tert-butyl group, cyclopropyl group) or an aryl group (e.g., phenyl group, p-tolyl group, naphthyl group), more preferably an alkoxy group, an amino group or an alkyl group, still more preferably an alkoxy group or an amino group.

More preferably, W is an alkoxy group having a total carbon number of 5 or less, an amino group (an —NH$_2$ group) or an alkylamino group having a total carbon number of 5 or less. When W is an alkoxy group having a total carbon number of 5 or less, an amino group or an alkylamino group having a total carbon number of 5 or less, this is preferred in view of good hue and high fastness (e.g., resistance to light, gas, heat, water and chemicals).

From the standpoint of hue, light fastness and solvent resistance, an alkoxy group having a total carbon number of 3 or less, an amino group (an —NH$_2$ group), or an alkylamino group having a total carbon number of 3 or less is preferred, a methoxy group (an —OCH$_3$ group), an ethoxy group (an —OC$_2$H$_5$ group) or an amino group is more preferred, and a methoxy group is most preferred in view of good hue and enhanced light fastness.

Ra is preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a hydrogen atom or a linear or branched alkyl group having a carbon number of 1 to 8, still more preferably a hydrogen atom or a linear alkyl group having a total carbon number of 1 to 4, yet still more preferably a hydrogen atom or a methyl group in view of hue and fastness of image, and most preferably a hydrogen atom in view of good hue and enhanced light fastness.

Rb and Rc each is preferably a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group, more preferably a substituted or unsubstituted alkyl group, a substituted or unsubstituted aryl group or a substituted or unsubstituted heterocyclic group, still more preferably an alkyl group having a total carbon number of 3 or less in view of hue and fastness of image, and most preferably a methyl group in view of good hue and enhanced light fastness.

When Q, W, X$_1$, X$_2$, R$_1$ and R$_2$ each further has a substituent, examples of the substituent include the following substituents (hereinafter, sometimes referred to as a "substituent J").

Examples include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, a silyl group and an ionic hydrophilic group.

More specifically, examples of the halogen atom include a fluorine atom, a chlorine atom, a bromine atom and an iodine atom.

The alkyl group includes a linear, branched or cyclic, substituted or unsubstituted alkyl group and also includes a cycloalkyl group, a bicycloalkyl group, and a cycloalkyl group having many ring structures, such as tricyclo structure.

The alkyl group in the substituents described hereinafter (for example, the alkyl group of an alkoxy group or an alkylthio group) indicates an alkyl group having such a concept. More specifically, the alkyl group is preferably an alkyl group having a carbon number of 1 to 30, and examples thereof include a methyl group, an ethyl group, an n-propyl group, an isopropyl group, a tert-butyl group, an n-octyl group, an eicosyl group, a 2-chloroethyl group, a 2-cyanoethyl group and a 2-ethylhexyl group. The cycloalkyl group is preferably a substituted or unsubstituted cycloalkyl group having a carbon number of 3 to 30, and examples thereof include a cyclohexyl group, a cyclopentyl group and a 4-n-dodecylcyclohexyl group. The bicycloalkyl group is preferably a substituted or unsubstituted bicycloalkyl group having a carbon number of 5 to 30, that is, a monovalent group formed by removing one hydrogen atom from a bicycloalkane having a carbon number of 5 to 30, and examples thereof include bicyclo[1.2.2]heptan-2-yl group and bicyclo[2.2.2]octan-3-yl group.

The aralkyl group includes a substituted or unsubstituted aralkyl group. The substituted or unsubstituted aralkyl group is preferably an aralkyl group having a carbon number of 7 to 30, and examples thereof include a benzyl group and a 2-phenethyl group.

The alkenyl group includes a linear, branched or cyclic, substituted or unsubstituted alkenyl group and also includes a cycloalkenyl group and a bicycloalkenyl group. Specifically, the alkenyl group is preferably a substituted or unsubstituted alkenyl group having a carbon number of 2 to 30, and examples thereof include a vinyl group, an allyl group, a prenyl group, a geranyl group and an oleyl group. The cycloalkenyl group is preferably a substituted or unsubstituted cycloalkenyl group having a carbon number of 3 to 30, that is, a monovalent group formed by removing one hydrogen atom from a cycloalkene having a carbon number of 3 to 30, and examples thereof include a 2-cyclopenten-1-yl group and a 2-cyclohexen-1-yl group. The bicycloalkenyl group is a substituted or unsubstituted bicycloalkenyl group, preferably a substituted or unsubstituted bicycloalkenyl group having a carbon number of 5 to 30, that is, a monovalent group formed by removing one hydrogen atom from a bicycloalkene having one double bond, and examples thereof include a bicyclo[2.2.1]hept-2-en-1-yl group and a bicyclo[2.2.2]oct-2-en-4-yl group.

The alkynyl group is preferably a substituted or unsubstituted alkynyl group having a carbon number of 2 to 30, and examples thereof include an ethynyl group, a propargyl group and a trimethylsilylethynyl group.

The aryl group is preferably a substituted or unsubstituted aryl group having a carbon number of 6 to 30, and examples thereof include a phenyl group, a p-tolyl group, a naphthyl group, an m-chlorophenyl group and an o-hexadecanoylaminophenyl group.

The heterocyclic group is preferably a monovalent group formed by removing one hydrogen atom from a 5- or 6-membered substituted or unsubstituted aromatic or non-aromatic heterocyclic compound, more preferably a 5- or 6-membered aromatic heterocyclic group having a carbon number of 3 to 30, and examples thereof include a 2-furyl group, a 2-thienyl group, a 2-pyrimidinyl group and a 2-benzothiazolyl group.

The alkoxy group is preferably a substituted or unsubstituted alkoxy group having a carbon number of 1 to 30, and examples thereof include a methoxy group, an ethoxy group, an isopropoxy group, a tert-butoxy group, an n-octyloxy group and a 2-methoxyethoxy group.

The aryloxy group is preferably a substituted or unsubstituted aryloxy group having a carbon number of 6 to 30, and examples thereof include a phenoxy group, a 2-methylphenoxy group, a 4-tert-butylphenoxy group, a 3-nitrophenoxy group and a 2-tetradecanoylaminophenoxy group.

The silyloxy group is preferably a substituted or unsubstituted silyloxy group having a carbon number of 0 to 20, and examples thereof include a trimethylsilyloxy group and a diphenylmethylsilyloxy group.

The heterocyclic oxy group is preferably a substituted or unsubstituted heterocyclic oxy group having a carbon number of 2 to 30, and examples thereof include a 1-phenyltetrazol-5-oxy group and a 2-tetrahydropyranyloxy group.

The acyloxy group is preferably a formyloxy group, a substituted or unsubstituted alkylcarbonyloxy group having a carbon number of 2 to 30, a substituted or unsubstituted arylcarbonyloxy group having a carbon number of 6 to 30, and examples thereof include an acetyloxy group, a pivaloyloxy group, a stearoyloxy group, a benzoyloxy group and a p-methoxyphenycarbonyloxy group.

The carbamoyloxy group is preferably a substituted or unsubstituted carbamoyloxy group having a carbon number of 1 to 30, and examples thereof include an N,N-dimethylcarbamoyloxy group, an N,N-diethylcarbamoyloxy group, a morpholinocarbonyloxy group, an N,N-di-n-octylaminocarbonyloxy group and an N-n-octylcarbamoyloxy group.

The alkoxycarbonyloxy group is preferably a substituted or unsubstituted alkoxycarbonyloxy group having a carbon number of 2 to 30, and examples thereof include a methoxycarbonyloxy group, an ethoxycarbonyloxy group, a tert-butoxycarbonyloxy group and an n-octyloxycarbonyloxy group.

The aryloxycarbonyloxy group is preferably a substituted or unsubstituted aryloxycarbonyloxy group having a carbon number of 7 to 30, and examples thereof include a phenoxycarbonyloxy group, a p-methoxyphenoxycarbonyloxy group and a p-n-hexadecyloxyphenoxycarbonyloxy group.

The amino group includes an alkylamino group, an arylamino group and a heterocyclic amino group and is preferably an amino group, a substituted or unsubstituted alkylamino group having a carbon number of 1 to 30, or a substituted or unsubstituted anilino group having a carbon number of 6 to 30, and examples thereof include a methylamino group, a dimethylamino group, an anilino group, an N-methyl-anilino group and a diphenylamino group.

The acylamino group is preferably a formylamino group, a substituted or unsubstituted alkylcarbonylamino group having a carbon number of 1 to 30, a substituted or unsubstituted arylcarbonylamino group having a carbon number of 6 to 30, and examples thereof include an acetylamino group, a pivaloylamino group, a lauroylamino group, a benzoylamino group and a 3,4,5-tri-n-octyloxyphenylcarbonylamino group.

The aminocarbonylamino group is preferably a substituted or unsubstituted aminocarbonylamino group having a carbon number of 1 to 30, and examples thereof include a carbamoylamino group, an N,N-dimethylaminocarbonylamino group, an N,N-diethylaminocarbonylamino group and a morpholinocarbonylamino group.

The alkoxycarbonylamino group is preferably a substituted or unsubstituted alkoxycarbonylamino group having a carbon number of 2 to 30, and examples thereof include a methoxycarbonylamino group, an ethoxycarbonylamino group, a tert-butoxycarbonylamino group, an n-octadecyloxycarbonylamino group and an N-methyl-methoxycarbonylamino group.

The aryloxycarbonylamino group is preferably a substituted or unsubstituted aryloxycarbonylamino group having a carbon number of 7 to 30, and examples thereof include a phenoxycarbonylamino group, a p-chlorophenoxycarbonylamino group and an m-n-octyloxyphenoxycarbonylamino group.

The sulfamoylamino group is preferably a substituted or unsubstituted sulfamoylamino group having a carbon number of 0 to 30, and examples thereof include a sulfamoylamino group, an N,N-dimethylaminosulfonylamino group and an N-n-octylaminosulfonylamino group.

The alkylsulfonylamino group or the arylsulfonylamino group is preferably a substituted or unsubstituted alkylsulfonylamino group having a carbon number of 1 to 30 or a substituted or unsubstituted arylsulfonylamino group having a carbon number of 6 to 30, and examples thereof include a methylsulfonylamino group, a butylsulfonylamino group, a phenylsulfonylamino group, a 2,3,5-trichlorophenylsulfonylamino group and a p-methylphenylsulfonylamino group.

The alkylthio group is preferably a substituted or unsubstituted alkylthio group having a carbon number of 1 to 30, and examples thereof include a methylthio group, an ethylthio group and an n-hexadecylthio group.

The arylthio group is preferably a substituted or unsubstituted arylthio group having a carbon number of 6 to 30, and examples thereof include a phenylthio group, a p-chlorophenylthio group and an m-methoxyphenylthio group.

The heterocyclic thio group is preferably a substituted or unsubstituted heterocyclic thio group having a carbon number of 2 to 30, and examples thereof include a 2-benzothiazolylthio group and a 1-phenyltetrazol-5-ylthio group.

The sulfamoyl group is preferably a substituted or unsubstituted sulfamoyl group having a carbon number of 0 to 30, and examples thereof include an N-ethylsulfamoyl group, an N-(3-dodecyloxypropyl)sulfamoyl group, an N,N-dimethylsulfamoyl group, an N-acetylsulfamoyl group, an N-benzoyl sulfamoyl group and an N—(N'-phenylcarbamoyl)sulfamoyl group.

The alkylsulfinyl group or the arylsulfinyl group is preferably a substituted or unsubstituted alkylsulfinyl group having a carbon number of 1 to 30 or a substituted or unsubstituted arylsulfinyl group having a carbon number of 6 to 30, and examples thereof include a methylsulfinyl group, an ethylsulfinyl group, a phenylsulfinyl group and a p-methylphenylsulfinyl group.

The alkylsulfonyl group or the arylsulfonyl group is preferably a substituted or unsubstituted alkylsulfonyl group having a carbon number of 1 to 30 or a substituted or unsubstituted arylsulfonyl group having a carbon number of 6 to 30, and examples thereof include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group having a carbon number of 2 to 30, a substituted or unsubstituted arylcarbonyl group having a carbon number of 7 to 30, or a substituted or unsubstituted heterocyclic carbonyl group having a carbon number of 2 to 30, with the carbonyl group being bonded through a carbon atom, and examples thereof include an acetyl group, a pivaloyl group, a 2-chloroacetyl group, a stearoyl group, a benzoyl group, a p-n-octyloxyphenylcarbonyl group, a 2-pyridylcarbonyl group and a 2-furylcarbonyl group.

The aryloxycarbonyl group is preferably a substituted or unsubstituted aryloxycarbonyl group having a carbon number of 7 to 30, and examples thereof include a phenoxycarbonyl group, an o-chlorophenoxycarbonyl group, an m-nitrophenoxycarbonyl group and a p-tert-butylphenoxycarbonyl group.

The alkoxycarbonyl group is preferably a substituted or unsubstituted alkoxycarbonyl group having a carbon number of 2 to 30, and examples thereof include a methoxycarbonyl group, an ethoxycarbonyl group, a tert-butoxycarbonyl group and an n-octadecyloxycarbonyl group.

The carbamoyl group is preferably a substituted or unsubstituted carbamoyl group having a carbon number of 1 to 30, and examples thereof include a carbamoyl group, an N-methylcarbamoyl group, an N,N-dimethylcarbamoyl group, an N,N-di-n-octylcarbamoyl group and an N-(methylsulfonyl)carbamoyl group.

The arylazo group or the heterocyclic azo group is preferably a substituted or unsubstituted arylazo group having a carbon number of 6 to 30 or a substituted or unsubstituted heterocyclic azo group having a carbon number of 3 to 30, and examples thereof include phenylazo, p-chlorophenylazo and 5-ethylthio-1,3,4-thiadiazol-2-ylazo group.

The imido group is preferably, for example, an N-succinimido group or an N-phthalimido group.

The phosphino group is preferably a substituted or unsubstituted phosphino group having a carbon number of 0 to 30, and examples thereof include a dimethylphosphino group, a diphenylphosphino group and a methylphenoxyphosphino group.

The phosphinyl group is preferably a substituted or unsubstituted phosphinyl group having a carbon number of 0 to 30, and examples thereof include a phosphinyl group, a dioctyloxyphosphinyl group and a diethoxyphosphinyl group.

The phosphinyloxy group is preferably a substituted or unsubstituted phosphinyloxy group having a carbon number of 0 to 30, and examples thereof include a diphenoxyphosphinyloxy group and a dioctyloxyphosphinyloxy group.

The phosphinylamino group is preferably a substituted or unsubstituted phosphinylamino group having a carbon number of 0 to 30, and examples thereof include a dimethoxyphosphinylamino group and a dimethylaminophosphinylamino group.

The silyl group is preferably a substituted or unsubstituted silyl group having a carbon number of 0 to 30, and examples thereof include a trimethylsilyl group, a tert-butyldimethylsilyl group and a phenyldimethylsilyl group.

The ionic hydrophilic group is preferably a group forming, for example, a lake pigment, such as —$SO_3M$ and —$CO_2M$, wherein M is Ca, Mg, Ba or the like.

Of these substituents, when the substituent has a hydrogen atom, the hydrogen atom may be substituted for by the substituent above. Examples of such a substituent include an alkylcarbonylaminosulfonyl group, an arylcarbonylaminosulfonyl group, an alkylsulfonylaminocarbonyl group and an arylsulfonylaminocarbonyl group. Examples thereof include a methylsulfonylaminocarbonyl group, a p-methylphenylsulfonylaminocarbonyl group, an acetylaminosulfonyl group and a benzoylaminosulfonyl group.

As for the combination of preferred substituents of the pigment represented by formula (1) of the present invention, a compound in which at least one of various substituents is the above-described preferred group is preferred, a compound in which a larger number of various substituents are the above-described preferred groups is more preferred, and a compound in which all substituents are the above-described preferred groups is most preferred.

The particularly preferred combination as the azo pigment represented by formula (1) of the present invention includes those containing the following (i) to (vi):

(i) $X_1$ and $X_2$ each is independently, preferably a hydrogen atom, an alkyl group (e.g., methyl group, ethyl group, n-propyl group, i-propyl group, tert-butyl group, cyclopropyl group), an acyl group (e.g., formyl group, acetyl group, pivaloyl group, benzoyl group), an alkylsulfonyl group (e.g., methylsulfonyl group, ethylsulfonyl group), an arylsulfonyl group (e.g., phenylsulfonyl group), more preferably a hydrogen atom, an acetyl group, or a methylsulfonyl group, still more preferably a hydrogen atom. Above all, it is most preferred that both $X_1$ and $X_2$ are a hydrogen atom.

(ii) W is preferably an alkoxy group (e.g., methoxy group, ethoxy group, i-propoxy group, tert-butoxy group), an amino group (e.g., —$NH_2$ group, methylamino group, dimethylamino group, aniline group), an alkyl group (e.g., methyl group, ethyl group, n-propyl group, i-propyl group, tert-butyl group, cyclopropyl group) or an aryl group (e.g., phenyl group, p-tolyl group, naphthyl group), more preferably an alkoxy group, an amino group or an alkyl group, still more preferably an alkoxy group or an amino group.

More preferably, W is preferably an alkoxy group having a total carbon number of 5 or less, an amino group (an —$NH_2$ group), or an alkylamino group having a total carbon number of 5 or less. An alkoxy group having a total carbon number of 5 or less, an amino group, or an alkylamino group having a total carbon number of 5 or less is preferred in view of good hue and high fastness (e.g., resistance to light, gas, heat, water and chemicals).

Above all, from the standpoint of hue, light fastness and solvent resistance, an alkoxy group having a total carbon number of 3 or less, an amino group (an —$NH_2$ group), and an alkylamino group having a total carbon number of 3 or less are preferred, a methoxy group (an —$OCH_3$ group) and an ethoxy group (an —$OC_2H_5$ group) are more preferred, and a methoxy group is most preferred in view of good hue and enhanced light fastness.

(iii) $R_1$ is preferably a hydrogen atom or a substituent (for example, a substituted or unsubstituted acylamino group having a total carbon number of 1 to 8, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12), more preferably a linear or branched alkyl group having a total carbon number of 1 to 8, a substituted or unsubstituted aryl group having a total carbon number of 6 to 10 or a substituted or unsubstituted heterocyclic group having a total carbon number of 4 to 8, still more preferably a methyl group, an i-propyl group, a tert-butyl group, a phenyl ring or a pyridine ring, and most preferably a tert-butyl group.

(iv) $R_2$ represents a heterocyclic group, which may be further condensed. $R_2$ is preferably a 5- to 8-membered heterocyclic group, more preferably a 5- or 6-membered substituted or unsubstituted heterocyclic group, still more preferably a 6-membered nitrogen-containing heterocyclic group having a carbon number of 3 to 10. Preferred examples of the heterocyclic ring include a pyridine ring, a pyrimidine ring, an S-triazine ring, a pyridazine ring, a pyrazine ring, a 1,2,4-thiadiazole ring, a 1,3,4-thiadiazole ring and an imidazole ring. Among these, a pyridine ring, a pyrimidine ring, an S-triazine ring, a pyridazine ring and a pyrazine ring are more preferred, a pyrimidine ring and an S-triazine ring are still more preferred, and a pyrimidine ring is most preferred.

(v) Q represents a 5- to 7-membered heterocyclic ring together with the carbon atoms, and an aliphatic ring, an aromatic ring or another heterocyclic ring may be fused to the heterocyclic ring. Particularly preferred examples of the 5- to 7-membered heterocyclic ring formed by Q together with the carbon atoms include a thienyl group, a furyl group, a pyrrolyl group, an indolyl group, an imidazolyl group, a pyrazolyl group, a thiazolyl group, an isothiazolyl group, an oxazolyl group, an isoxazolyl group, a triazinyl group, a pyridyl group, a pyrazinyl group and a pyridazinyl group. Each heterocyclic group may further have a substituent. Particularly, the 5- to 7-membered heterocyclic ring formed by Q together with the carbon atoms is preferably a 5-membered nitrogen-containing heterocyclic ring, and most preferably a heterocyclic ring represented by any of the following formulae (a) to (j).

[Chem. 12]

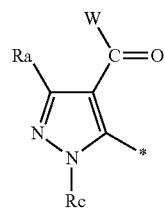

(a)

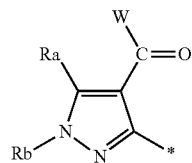

(b)

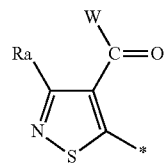

(c)

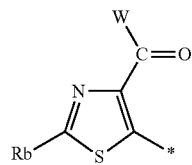

(d)

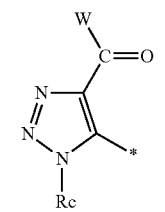

(e)

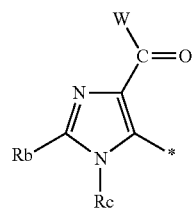

(f)

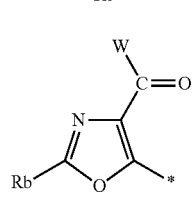

(g)

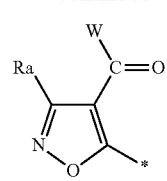

(h)

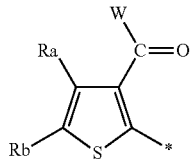

(i)

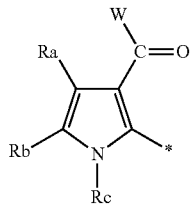

(j)

In formulae (a) to (j), Ra represents a hydrogen atom or a substituent. Rb and Rc each independently represents a hydrogen atom, an alkyl group, a cycloalkyl group, an aralkyl group, an alkenyl group, an alkynyl group, an aryl group or a heterocyclic group. W has the same meaning as W in formula (1) and preferred examples thereof are also the same.

Ra is preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a hydrogen atom, or a linear or branched alkyl group having a total carbon number of 1 to 8, still more preferably a hydrogen atom or a linear alkyl group having a total carbon number of 1 to 4, yet still more preferably a hydrogen atom or a methyl group, and most preferably a hydrogen atom.

Rb and Rc each is preferably a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group, more preferably a substituted or unsubstituted alkyl group, a substituted or unsubstituted aryl group or a substituted or unsubstituted heterocyclic group, still more preferably an alkyl group having a total carbon number of 5 or less, yet still more preferably an alkyl group having a total carbon number of 3 or less, and most preferably a methyl group.

The 5-membered heterocyclic ring represented by Q together with the carbon atoms is preferably a 5-membered nitrogen-containing heterocyclic ring, and most preferably a heterocyclic ring represented by any of the following formula (a) to (j).

Among these, (a) to (f) and (j) are more preferred, (a), (b), (c), (e) and (j) are more preferred, (a) and (c) are still more preferred, and (a) is most preferred in view of hue, tinctorial strength and fastness of image.

(vi) n is preferably an integer of 1 to 3, more preferably 1 or 2, and most preferably n=2.

The azo pigment represented by formula (1) is preferably an azo pigment represented by the following formula (2).

The azo pigment represented by formula (2), its tautomer, and a salt or hydrate thereof are described in detail below.

[Chem. 13]

(2):

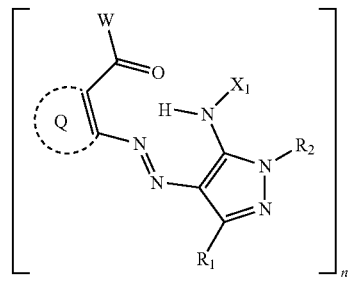

(in the formula (2), Q, W, $X_1$, $R_1$, $R_2$ and n have the same meanings as Q, W, $X_1$, $R_1$, $R_2$ and n in formula (1), and the structure represents a dimer through Q, W, $X_1$, $R_1$ or $R_2$ when n=2, represents a trimer through Q, W, $X_1$, $R_1$ or $R_2$ when n=3, and represents a tetramer through Q, W, $X_1$, $R_1$ or $R_2$ when n=4).

Q, W, $X_1$, $R_1$, $R_2$, and n are described in more detail below.

Examples of Q are the same as examples of Q in formula (1), and preferred examples thereof are also the same.

Examples of W are the same as examples of W in formula (1), and preferred examples thereof are also the same.

Examples of $X_1$ are the same as examples of $X_1$ in formula (1), and preferred examples thereof are also the same.

Examples of $R_1$ and $R_2$ are the same as examples of $R_1$ and $R_2$ in formula (1), and preferred examples thereof are also the same.

Examples of n are the same as examples of n in formula (1), and preferred examples thereof are also the same.

As for the combination of preferred substituents of the pigment represented by formula (2) of the present invention, a compound in which at least one of various substituents are the above-described preferred group is preferred, a compound in which a larger number of various substituents are the above-described preferred groups is more preferred, and a compound in which all substituents are the above-described preferred groups is most preferred.

The combination particularly preferred as the azo pigment represented by formula (2) of the present invention is a combination containing the following (i) to (vi).

(i) $X_1$ is preferably a hydrogen atom, an alkyl group (e.g., methyl group, ethyl group, n-propyl group, isopropyl group, tert-butyl group, cyclopropyl group), an acyl group (e.g., formyl group, acetyl group, pivaloyl group, benzoyl group), an alkylsulfonyl group (e.g., methylsulfonyl group, ethylsulfonyl group), an arylsulfonyl group (e.g., phenylsulfonyl group), more preferably a hydrogen atom, an acetyl group or a methylsulfonyl group, and most preferably a hydrogen atom.

(ii) W is preferably an alkoxy group (e.g., methoxy group, ethoxy group, i-propoxy group, tert-butoxy group), an amino group (e.g., —$NH_2$ group, methylamino group, dimethylamino group, aniline group), an alkyl group (e.g., methyl group, ethyl group, n-propyl group, i-propyl group, tert-butyl group, cyclopropyl group) or an aryl group (e.g., phenyl group, p-tolyl group, naphthyl group), more preferably an alkoxy group, an amino group or an alkyl group, still more preferably an alkoxy group or an amino group.

More preferably, W is an alkoxy group having a total carbon number of 5 or less, an amino group (an —NH₂ group), or an alkylamino group having a total carbon number of 5 or less. An alkoxy group having a total carbon number of 5 or less, an amino group, or an alkylamino group having a total carbon number of 5 or less is preferred in view of good hue and high fastness (e.g., resistance to light, gas, heat, water and chemicals).

Above all, from the standpoint of hue, light fastness and solvent resistance, an alkoxy group having a total carbon number of 3 or less, an amino group (an —NH₂ group), and an alkylamino group having a total carbon number of 3 or less are preferred, a methoxy group (an —OCH₃ group) and an ethoxy group (an —OC₂H₅ group) are more preferred, and a methoxy group is most preferred in view of good hue and enhanced light fastness.

(iii) $R_1$ is preferably a hydrogen atom or a substituent (for example, a substituted or unsubstituted acylamino group having a total carbon number of 1 to 8, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12), more preferably a linear or branched alkyl group having a total carbon number of 1 to 8, a substituted or unsubstituted aryl group having a total carbon number of 6 to 10 or a substituted or unsubstituted heterocyclic group having a total carbon number of 4 to 8, still more preferably a methyl group, an i-propyl group, a tert-butyl group, a phenyl ring or a pyridine ring, and most preferably a tert-butyl group.

(iv) $R_2$ represents a heterocyclic group, which may be further condensed. $R_2$ is preferably a 5- to 8-membered heterocyclic group, more preferably a 5- or 6-membered substituted or unsubstituted heterocyclic group, still more preferably a 6-membered nitrogen-containing heterocyclic group having a carbon number of 3 to 10. Preferred examples of the heterocyclic ring include a pyridine ring, a pyrimidine ring, an S-triazine ring, a pyridazine ring, a pyrazine ring, a 1,2,4-thiadiazole ring, a 1,3,4-thiadiazole ring and an imidazole ring. Among these, a pyridine ring, a pyrimidine ring, an S-triazine ring, a pyridazine ring and a pyrazine ring are more preferred, a pyrimidine ring and an S-triazine ring are still more preferred, and a pyrimidine ring is most preferred.

(v) Q represents a 5- to 7-membered heterocyclic ring together with the carbon atoms, and an aliphatic ring, an aromatic ring or another heterocyclic ring may be condensed to the heterocyclic ring. Particularly preferred examples of the 5- to 7-membered heterocyclic ring formed by Q together with the carbon atoms include a thienyl group, a furyl group, a pyrrolyl group, an indolyl group, an imidazolyl group, a pyrazolyl group, a thiazolyl group, an isothiazolyl group, an oxazolyl group, an isoxazolyl group, a triazinyl group, a pyridyl group, a pyrazinyl group and a pyridazinyl group. Each heterocyclic group may further have a substituent. Particularly, the 5- to 7-membered heterocyclic ring formed by Q together with the carbon atoms is preferably a 5-membered nitrogen-containing heterocyclic ring, and most preferably a heterocyclic ring represented by any of the following formulae (a) to (j).

[Chem. 14]

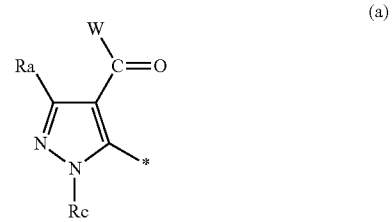

(a)

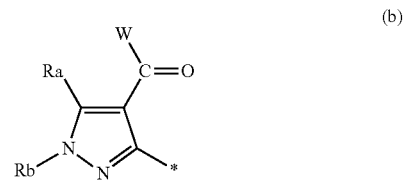

(b)

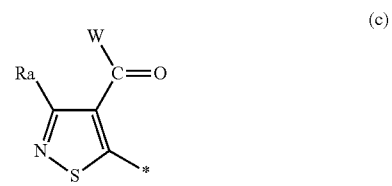

(c)

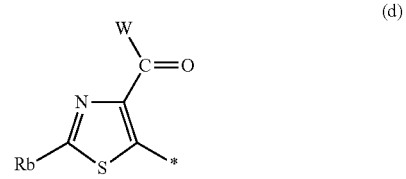

(d)

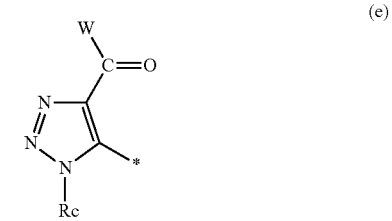

(e)

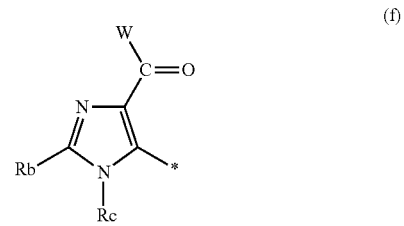

(f)

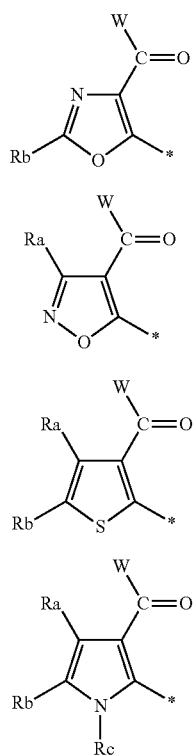

In formulae (a) to (j), Ra represents a hydrogen atom or a substituent. Rb and Rc each independently represents a hydrogen atom, an alkyl group, a cycloalkyl group, an aralkyl group, an alkenyl group, an alkynyl group, an aryl group or a heterocyclic group. W has the same meaning as W in formula (1) and preferred examples thereof are also the same.

Ra is preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a hydrogen atom, or a linear or branched alkyl group having a total carbon number of 1 to 8, still more preferably a hydrogen atom or a linear alkyl group having a total carbon number of 1 to 4, yet still more preferably a hydrogen atom or a methyl group, and most preferably a hydrogen atom.

Rb and Rc each is preferably a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group, more preferably a substituted or unsubstituted alkyl group, a substituted or unsubstituted aryl group or a substituted or unsubstituted heterocyclic group, still more preferably an alkyl group having a total carbon number of 5 or less, yet still more preferably an alkyl group having a total carbon number of 3 or less, and most preferably a methyl group.

The 5-membered heterocyclic ring represented by Q together with the carbon atoms is preferably a 5-membered nitrogen-containing heterocyclic ring, and most preferably a heterocyclic ring represented by any of the following formula (a) to (j).

Among these, (a) to (f) and (j) are more preferred, (a), (b), (c), (e) and (j) are more preferred, (a) and (c) are still more preferred, and (a) is most preferred in view of hue, tinctorial strength and fastness of image.

The 5-membered heterocyclic ring represented by Q together with the carbon atoms is preferably formula (a), (b) or (c), and most preferably formula (a).

(vi) n is preferably an integer of 1 to 3, more preferably 1 or 2, and most preferably n=2.

A tautomer of the azo pigment represented by formula (1) or (2) is also included in the scope of the present invention. Formulae (1) and (2) are shown in the form of a canonical structure out of several kinds of tautomers which are chemically acceptable structures, but the azo pigment may be a tautomer having a structure other than those described above or may be used as a mixture containing a plurality of tautomers.

For example, an azo-hydrazone tautomer represented by the following formula (2') may be considered for the azo pigment represented by formula (2).

A compound represented by the following formula (2') that is a tautomer of the azo pigment represented by formula (2) is included in the scope of the present invention.

[Chem. 15]

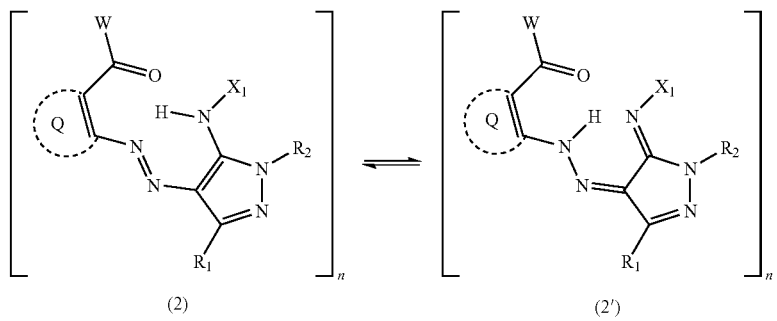

(wherein in formula (2'), $R_1$, $R_2$, Q, W, $X_1$ and n have the same meanings as $R_1$, $R_2$, Q, W, $X_1$ and n in formula (2)).

The azo pigment represented by formula (1) is preferably an azo pigment represented by the following formula (3).

The azo pigment represented by formula (3), its tautomer, and a salt or hydrate thereof are described in detail below.

[Chem. 16]

(3):

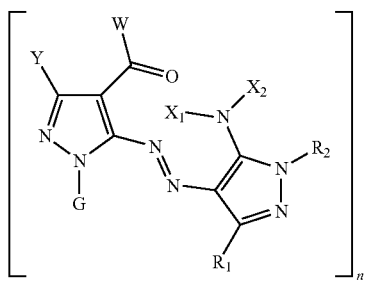

(in the formula (3), Y represents a hydrogen atom or a substituent, G represents a hydrogen atom, an alkyl group, a cycloalkyl group, an aralkyl group, an alkenyl group, an alkynyl group, an aryl group or a heterocyclic group, W, $X_1$, $X_2$, $R_1$, $R_2$ and n have the same meanings as W, $X_1$, $X_2$, $R_1$, $R_2$ and n in formula (1), and the formula represents a dimer through Q, W, $X_1$, $X_2$, $R_1$ or $R_2$ when n=2, and the formula represents a trimer through Q, W, $X_1$, $X_2$, $R_1$ or $R_2$ when n=3, and the formula represents a tetramer through Q, W, $X_1$, $X_2$, $R_1$ or $R_2$ when n=4).

W, $X_1$, $X_2$, $R_1$, $R_2$, G, Y and n are described in more detail below.

Examples of W are the same as examples of W in formula (1), and preferred examples thereof are also the same.

Examples of $X_1$ and $X_2$ are the same as examples of $X_1$ and $X_2$ in formula (1), and preferred examples thereof are also the same.

Examples of $R_1$ and $R_2$ are the same as examples of $R_1$ and $R_2$ in formula (1), and preferred examples thereof are also the same.

Examples of n are the same as examples of n in formula (1), and preferred examples thereof are also the same.

G represents a hydrogen atom, an alkyl group, a cycloalkyl group, an aralkyl group, an alkenyl group, an alkynyl group, an aryl group or a heterocyclic group and is preferably a hydrogen atom, a methyl group, an ethyl group, a n-propyl group, an i-propyl group, a tert-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group or a pyrazinyl group, more preferably a hydrogen atom, a methyl group, a phenyl group, a pyridyl group, a pyrimidinyl group or a pyrazinyl group, still more preferably a methyl group, a 2-pyridyl group, a 2,6-pyrimidinyl group or a 2,5-pyrazinyl group, yet still more preferably an alkyl group having a total carbon number of 5 or less, even yet still more preferably an alkyl group having a total carbon number of 3 or less, and most preferably a methyl group.

Examples of Y when it represents a substituent include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group and a silyl group. Particularly preferred examples of Y include a hydrogen atom, an alkyl group (e.g., methyl group), an aryl group (e.g. phenyl group), a heterocyclic group (e.g., 2-pyridyl group), and an alkylthio group (e.g., methylthio group). Among these, a hydrogen atom, a methyl group, a phenyl group and a methylthio group are preferred, and a hydrogen atom is most preferred.

As for the combination of preferred substituents of the pigment represented by formula (3) of the present invention, a compound in which at least one of various substituents is the above-described preferred group is preferred, a compound in which a larger number of various substituents are the above-described preferred groups is more preferred, and a compound in which all substituents are the above-described preferred groups is most preferred.

The combination particularly preferred as the azo pigment represented by formula (3) of the present invention is a combination containing the following (i) to (vii).

(i) $X_1$ and $X_2$ each is independently, preferably a hydrogen atom, an alkyl group (e.g., methyl group, ethyl group, n-propyl group, i-propyl group, tert-butyl group, cyclopropyl group), an acyl group (e.g., formyl group, acetyl group, pivaloyl group, benzoyl group), an alkylsulfonyl group (e.g., methylsulfonyl group, ethylsulfonyl group), an arylsulfonyl group (e.g., phenylsulfonyl group), more preferably a hydrogen atom, an acetyl group or a methylsulfonyl group, still more preferably a hydrogen atom. Above all, at least either one of $X_1$ and $X_2$ is preferably a hydrogen atom, and it is most preferred that both are a hydrogen atom. When at least either one of $X_1$ and $X_2$ is a hydrogen atom, not only the intermolecular interaction of colorant molecules but also the intramolecular interaction are liable to be firmly formed, and this makes it easy to configure a pigment having a more stable molecular arrangement, which is preferred in view of good hue and high fastness (resistance to light, gas, heat, water and chemicals).

(ii) W is preferably an alkoxy group (e.g., methoxy group, ethoxy group, i-propoxy group, tert-butoxy group), an amino group (e.g., —$NH_2$ group, methylamino group, dimethylamino group, aniline group), an alkyl group (e.g., methyl group, ethyl group, n-propyl group, i-propyl group, tert-butyl group, cyclopropyl group) or an aryl group (e.g., phenyl group, p-tolyl group, naphthyl group), more preferably an alkoxy group, an amino group or an alkyl group, still more preferably an alkoxy group or an amino group.

More preferably, W is preferably an alkoxy group having a total carbon number of 5 or less, an amino group (an —$NH_2$ group), or an alkylamino group having a total carbon number of 5 or less. An alkoxy group having a total carbon number of 5 or less, an amino group, or an alkylamino group having a total carbon number of 5 or less is preferred in view of good hue and high fastness (resistance to light, gas, heat, water and chemicals).

Above all, from the standpoint of hue, light fastness and solvent resistance, an alkoxy group having a total carbon number of 3 or less, an amino group (an —$NH_2$ group), and an alkylamino group having a total carbon number of 3 or less are preferred, a methoxy group (an —$OCH_3$ group) and an ethoxy group (an —$OC_2H_5$ group) are more preferred, and a methoxy group is most preferred in view of good hue and enhanced light fastness.

(iii) $R_1$ is preferably a hydrogen atom or a substituent (for example, a substituted or unsubstituted acylamino group having a total carbon number of 1 to 8, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12), more preferably a linear or branched alkyl group having a total carbon number of 1 to 8, a substituted or unsubstituted aryl group having a total carbon number of 6 to 10 or a substituted or unsubstituted heterocyclic group having a total carbon number of 4 to 8, still more preferably a methyl group, an i-propyl group, a tert-butyl group, a phenyl ring or a pyridine ring, and most preferably a tert-butyl group.

(iv) $R_2$ represents a heterocyclic group, which may be further condensed. $R_2$ is preferably a 5- to 8-membered heterocyclic group, more preferably a 5- or 6-membered substituted or unsubstituted heterocyclic group, still more preferably a 6-membered nitrogen-containing heterocyclic group having a carbon number of 3 to 10. Preferred examples of the heterocyclic ring include a pyridine ring, a pyrimidine ring, an S-triazine ring, a pyridazine ring, a pyrazine ring, a 1,2,4-thiadiazole ring, a 1,3,4-thiadiazole ring and an imidazole ring. Among these, a pyridine ring, a pyrimidine ring, an S-triazine ring, a pyridazine ring and a pyrazine ring are more preferred, a pyrimidine ring and an S-triazine ring are still more preferred, and a pyrimidine ring is most preferred.

(v) G preferably represents a hydrogen atom or an alkyl group, cycloalkyl group, aralkyl group, alkenyl group, alkynyl group, aryl group or heterocyclic group, having a total carbon number of 12 or less.

More preferably, G represents an alkyl group having a total carbon number of 6 or less, a cycloalkyl group having a total carbon number of 6 or less, an aralkyl group having a total carbon number of 12 or less, an alkenyl group having a total carbon number of 12 or less, an alkynyl group having a total carbon number of 12 or less, an aryl group having a total carbon number of 18 or less, or a heterocyclic group having a total carbon number of 12 or less.

Still more preferably, G represents a hydrogen atom, a methyl group, an ethyl group, an n-propyl group, an isopropyl group, a tert-butyl group, a cyclopropyl group, a benzyl group, a 2-phenethyl group, a vinyl group, an allyl group, an ethynyl group, a propargyl group, a benzyl group, a 2-phenethyl group, a phenyl group, a p-tolyl group, a naphthyl group, a pyridyl group, a pyrimidinyl group or a pyrazinyl group.

Above all, a hydrogen atom, a phenyl group, a pyridyl group, a pyrimidinyl group or a pyrazinyl group is preferred, a methyl group, a 2-pyridyl group, a 2,6-pyrimidinyl group or a 2,5-pyrazinyl group is more preferred, and a methyl group is most preferred.

(vi) Y is preferably a hydrogen atom, an alkyl group (e.g., methyl group), an aryl group (e.g., phenyl group), a heterocyclic group (e.g., 2-pyridyl group) or an alkylthio group (e.g., methylthio group), more preferably a hydrogen atom, a methyl group, a phenyl group or a methylthio group, and most preferably a hydrogen atom.

(vii) n is preferably an integer of 1 to 3, more preferably 1 or 2, and most preferably n=2.

In formulae (1), (2) and (3), a compound where n is 2 or 3 is preferred, and a compound where n is 2 is more preferred. When n is 2, high tinctorial strength, excellent light resistance and enhanced chemical resistance are achieved.

In formula (1), (2) and (3), when n=2, the azo pigment, its tautomer, or a salt or hydrate thereof represents a dimer through Q, W, $X_1$, $X_2$, $R_1$ or $R_2$.

In the case where the azo pigment of the present invention, its tautomer or a salt or hydrate thereof represents a dimer, examples of the bonding mode include those represented by the following formulae (4), (5), (6), (7), (8) and (9).

[Chem. 17]

(4):

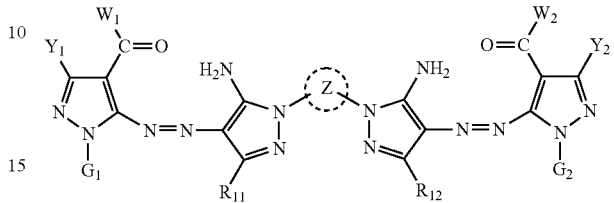

In formula (4), $G_1$ and $G_2$ each independently has the same meaning as G in formula (3).

$R_{11}$ and $R_{12}$ each independently has the same meaning as $R_1$ in formula (3).

$W_1$ and $W_2$ each independently has the same meaning as W in formula (3).

$Y_1$ and $Y_2$ each independently has the same meaning as Y in formula (3).

Z has the same meaning as in the case where $R_2$ in formula (3) represents a divalent substituent.

[Chem. 18]

(5):

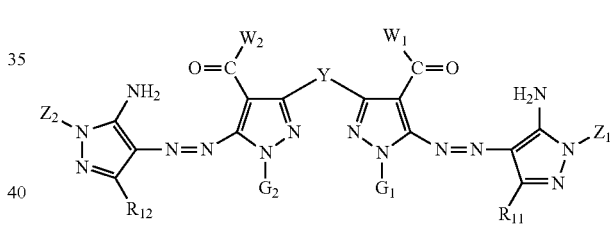

In formula (5), $G_1$ and $G_2$ each independently has the same meaning as G in formula (3).

$R_{11}$ and $R_{12}$ each independently has the same meaning as $R_1$ in formula (3).

$W_1$ and $W_2$ each independently has the same meaning as W in formula (3).

$Z_1$ and $Z_2$ each independently has the same meaning as $R_2$ in formula (3).

Y has the same meaning as in the case where Y in formula (3) represents a divalent substituent.

[Chem. 19]

(6):

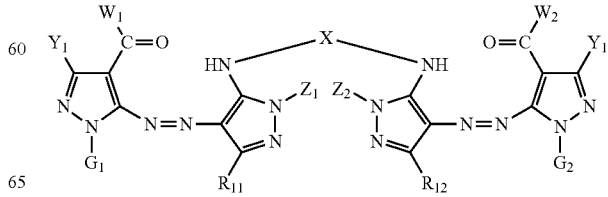

In formula (6), $G_1$ and $G_2$ each independently has the same meaning as G in formula (3).

$R_{11}$ and $R_{12}$ each independently has the same meaning as $R_1$ in formula (3).

$W_1$ and $W_2$ each independently has the same meaning as W in formula (3).

$Y_1$ and $Y_2$ each independently has the same meaning as Y in formula (3).

$Z_1$ and $Z_2$ each independently has the same meaning as $R_2$ in formula (3).

X has the same meaning as in the case where $X_1$ or $X_2$ in formula (3) represents a divalent substituent.

[Chem. 20]

(7):

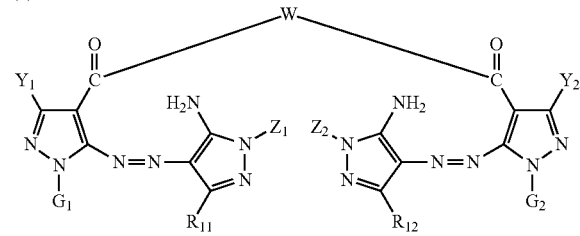

In formula (7), $G_1$ and $G_2$ each independently has the same meaning as G in formula (3).

$R_{11}$ and $R_{12}$ each independently has the same meaning as $R_1$ in formula (3).

$Y_1$ and $Y_2$ each independently has the same meaning as Y in formula (3).

$Z_1$ and $Z_2$ each independently has the same meaning as $R_2$ in formula (3).

W has the same meaning as in the case where W in formula (3) represents a divalent substituent.

[Chem. 21]

(8):

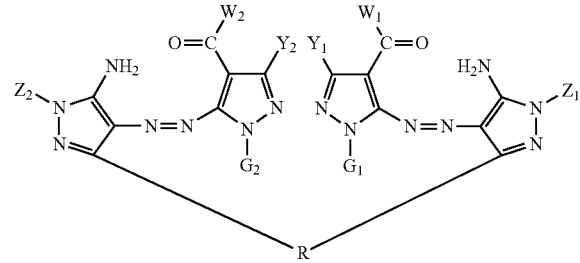

In formula (8), $G_1$ and $G_2$ each independently has the same meaning as G in formula (3).

$W_1$ and $W_2$ each independently has the same meaning as W in formula (3).

$Y_1$ and $Y_2$ each independently has the same meaning as Y in formula (3).

$Z_1$ and $Z_2$ each independently has the same meaning as $R_1$ in formula (3).

R has the same meaning as in the case where $R_1$ in formula (3) represents a divalent substituent.

[Chem. 22]

(9):

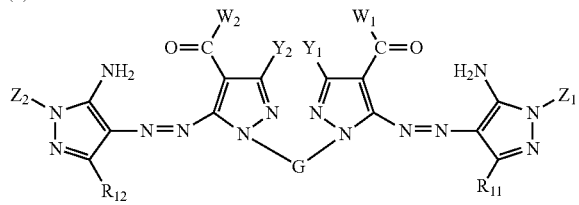

In formula (9), $R_{11}$ and $R_{12}$ each independently has the same meaning as $R_1$ in formula (3).

$W_1$ and $W_2$ each independently has the same meaning as W in formula (3).

$Y_1$ and $Y_2$ each independently has the same meaning as Y in formula (3).

$Z_1$ and $Z_2$ each independently has the same meaning as $R_1$ in formula (3).

G has the same meaning as in the case where G in formula (3) represents a divalent substituent.

In the present invention, the azo pigment represented by formula (3) is preferably an azo pigment represented by any of formulae (4) (5), (7), (8) and (9), more preferably an azo pigment represented by any of formulae (4), (5), (7) and (9), and most preferably an azo pigment represented by formula (4).

The azo pigment represented by formula (4), its tautomer and a salt or hydrate thereof are described in detail below.

[Chem. 23]

(4):

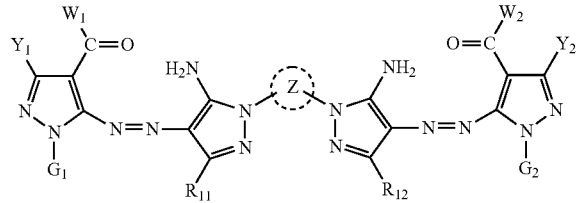

In formula (4) Z represents a 5- to 8-membered nitrogen-containing heterocyclic ring, $Y_1$, $Y_2$, $R_{11}$ and $R_{12}$ each independently represents a hydrogen atom or a substituent, $G_1$ and $G_2$ each independently represents a hydrogen atom, an alkyl group, a cycloalkyl group, an aralkyl group, an alkenyl group, an alkynyl group, an aryl group or a heterocyclic group, and $W_1$ and $W_2$ each independently represents an alkoxy group, an amino group, an alkyl group or an aryl group.

In formula (4), Z represents a divalent 5- to 8-membered nitrogen-containing heterocyclic ring. Preferred examples of the heterocyclic ring include, without limiting the substitution position, a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring and a pyridane ring. Z is preferably a 6-membered nitrogen-containing heterocyclic ring, and examples thereof include a pyridine ring, a pyrimidine ring and an S-triazine ring. Z is more preferably a pyrimidine ring. In the case where Z is a 6-membered nitrogen-containing heterocyclic ring, this is preferred also in view of hydrogen bondability and molecular planarity, because the intramolecular or intermolecular activity of the colorant molecule is liable to be more enhanced.

In formula (4), $Y_1$ and $Y_2$ each has the same meaning as Y in formula (2), and preferred examples are also the same.

In formula (4), $G_1$ and $G_2$ each has the same meaning as G in formula (2), and preferred examples are also the same.

In formula (4), $R_{11}$ and $R_{12}$ each has the same meaning as $R_1$ in formula (1), and preferred examples are also the same.

In formula (4), $W_1$ and $W_2$ each has the same meaning as W in formula (1), and preferred examples are also the same.

A tautomer of the azo pigment represented by formula (1) is also included in the scope of the present invention.

Formula (1) is shown in the form of a canonical structure out of several kinds of tautomers which are chemically acceptable structures, but the azo pigment may be a tautomer having a structure other than those described or may be used as a mixture containing a plurality of tautomers.

For example, an azo-hydrazone tautomer represented by the following formula (4') may be thought for the pigment represented by formula (4).

The compound represented by the following formula (4'), which is a tautomer of the azo pigment represented by formula (4), is also included in the scope of the present invention.

[Chem. 24]

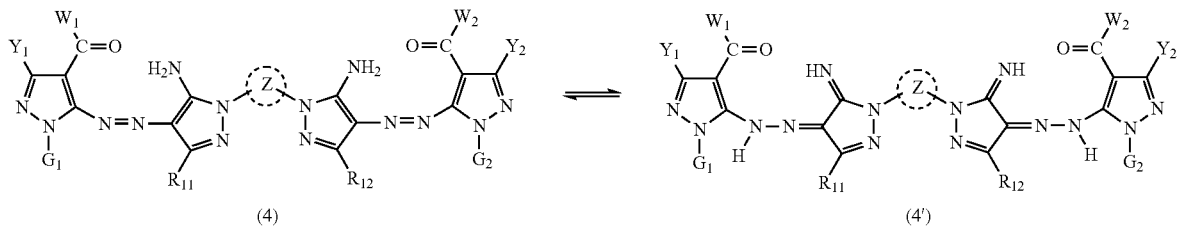

(wherein in formula (4'), $R_{11}$, $R_{12}$, $W_1$, $W_2$, $Y_1$, $Y_2$, $G_1$, $G_2$ and Z have the same meanings as $R_{11}$, $R_{12}$, $W_1$, $W_2$, $Y_1$, $Y_2$, $G_1$, $G_2$ and Z in formula (4)).

In this regard, as for the combination of preferred substituents of the compound represented by formula (4), a compound in which at least one of various substituents is the above-described preferred group is preferred, a compound in which a larger number of various substituents are the above-described preferred groups is more preferred, and a compound in which all substituents are the above-described preferred groups is most preferred.

The combination particularly preferred as the azo pigment represented by formula (4) of the present invention is a combination containing the following (i) to (v).

(i) $W_1$ and $W_2$ each is independently, preferably an alkoxy group (e.g., methoxy group, ethoxy group, i-propoxy group, tert-butoxy group), an amino group (e.g., —$NH_2$ group, methylamino group, dimethylamino group, aniline group), an alkyl group (e.g., methyl group, ethyl group, n-propyl group, i-propyl group, tert-butyl group, cyclopropyl group) or an aryl group (e.g., phenyl group, p-tolyl group, naphthyl group), more preferably an alkoxy group, an amino group or an alkyl group, still more preferably an alkoxy group or an amino group, yet still more preferably an alkoxy group having a total carbon number of 5 or less, an amino group (an —$NH_2$ group) or an alkylamino group having a total carbon number of 5 or less, even yet still more preferably an alkoxy group having a total carbon number of 3 or less, an amino group (an —$NH_2$ group) or an alkylamino group having a total carbon number of 3 or less, and most preferably a methoxy group (an —$OCH_3$ group).

(ii) $R_{11}$ and $R_{12}$ each is independently, preferably a hydrogen atom or a substituent (for example, a substituted or unsubstituted acylamino group having a total carbon number of 1 to 8, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12), more preferably a linear or branched alkyl group having a total carbon number of 1 to 8, still more preferably a methyl group, an i-propyl group or a tert-butyl group, and most preferably a tert-butyl group.

(iii) Z represents a divalent heterocyclic group, which may be further condensed. Z is preferably a 5- to 8-membered heterocyclic group, more preferably a 5- or 6-membered substituted or unsubstituted heterocyclic group, such as pyrrole ring, pyrazole ring, triazole ring, imidazole ring, thiazole ring, isothiazole ring, oxazole ring, isoxazole ring, thiadiazole ring, thiophene ring, furan ring, pyridine ring, pyrimidine ring, triazine ring and pyridazine ring, still more preferably a 6-membered nitrogen-containing heterocyclic group having a carbon number of 3 to 10. Preferred examples of the heterocyclic ring include a pyridine ring, a pyrimidine ring, an S-triazine ring, a pyridazine ring and a pyrazine ring. Among these, a pyridine ring, a pyrimidine ring, an S-triazine ring, a pyridazine ring and a pyrazine ring are more preferred, a pyrimidine ring and an S-triazine ring are still more preferred, and a pyrimidine ring is most preferred.

(iv) $G_1$ and $G_2$ each independently represents a hydrogen atom, an alkyl group, a cycloalkyl group, an aralkyl group, an alkenyl group, an alkynyl group, an aryl group or a heterocyclic group and is preferably a hydrogen atom, a methyl group, an ethyl group, a n-propyl group, an i-propyl group, a tert-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group or a pyrazinyl group, more preferably a hydrogen atom, a methyl group, a phenyl group, a pyridyl group, a pyrimidinyl group or a pyrazinyl group, still more preferably a methyl group, a 2-pyridyl group, a 2,6-pyrimidinyl group or a 2,5-pyrazinyl group, yet still more preferably an alkyl group having a total carbon number of 5 or less, even yet still more preferably an alkyl group having a total carbon number of 3 or less, and most preferably a methyl group.

(v) $Y_1$ and $Y_2$ each is independently a hydrogen atom, an alkyl group (e.g., methyl group), an aryl group (e.g., phenyl group), a heterocyclic group (e.g., 2-pyridyl group) or an alkylthio group (e.g., methylthio group), preferably a hydrogen atom, a methyl group, a phenyl group or a methylthio group, and most preferably a hydrogen atom.

In formulae (1), (2) and (3), a compound where n is 2 or 3 is preferred, and a compound where n is 2 is more preferred.

When n is 2, high tinctorial strength, excellent light resistance and enhanced chemical resistance are achieved.

Out of the azo pigments represented by formula (1), (2), (3) and (4) of the present invention, azo pigments represented by the following formulae (10) to (13) are preferred.

[Chem. 25]

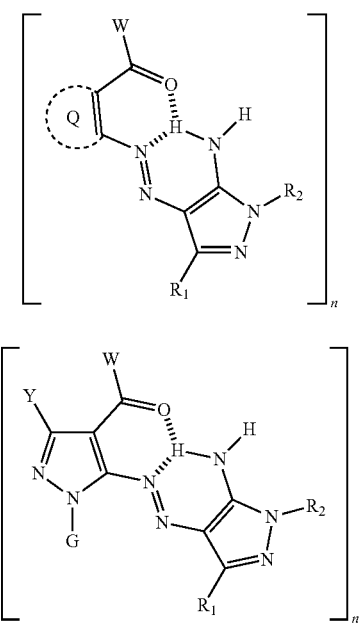

In formula (10), $R_1$, $R_2$, W and Q have the same meanings as $R_1$, $R_2$, W and Q in formula (2).

In formula (11), G, $R_1$, $R_2$, W and Y have the same meanings as G, $R_1$, $R_2$, W and Y in formula (3).

[Chem. 26]

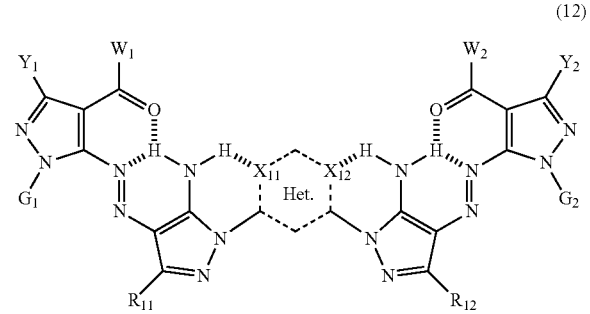

In formula (12), $G_1$, $G_2$, $R_{11}$, $R_{12}$, $W_1$, $W_2$, $Y_1$ and $Y_2$ have the same meanings as $G_1$, $G_2$, $R_{11}$, $R_{12}$, $W_1$, $W_2$, $Y_1$ and $Y_2$ in formula (4).

$X_{11}$ and $X_{12}$ each independently constitutes a heterocyclic ring formed by Z in formula (4) and represents a heteroatom in the heterocyclic ring formed by Het.

[Chem. 27]

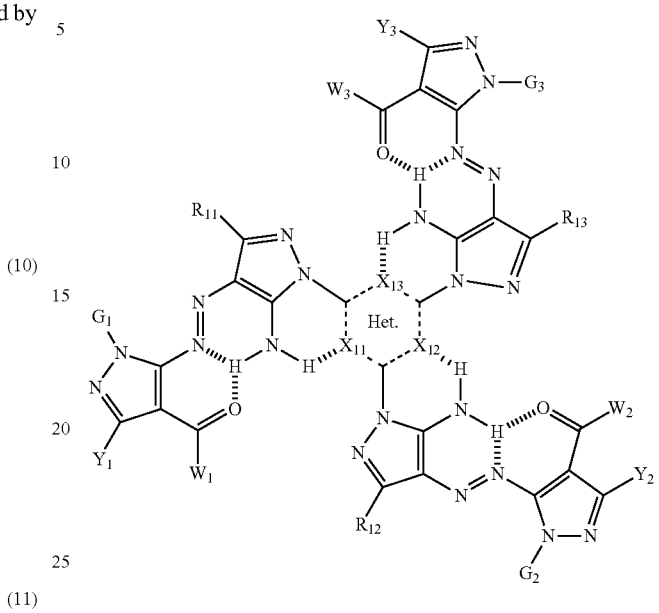

In formula (13), $G_1$, $G_2$ and $G_3$ each independently has the same meaning as G in formula (3).

$W_1$, $W_2$ and $W_3$ each independently has the same meaning as W in formula (3).

$Y_1$, $Y_2$ and $Y_3$ each independently has the same meaning as Y in formula (3). $R_{11}$, $R_{12}$ and $R_{13}$ each independently has the same meaning as $R_1$ in formula (3).

$X_{11}$, $X_{12}$ and $X_{13}$ each independently has the same meaning as in the case where $R_2$ in formula (3) represents a trivalent heterocyclic ring, and represents a heteroatom in the heterocyclic ring formed by Het.

For the azo pigments represented by formulae (1), (2), (3) and (4), a large number of tautomers may be considered.

Also, in the present invention, it is preferred that the azo pigment represented by formula (1) has a substituent capable of forming an intramolecular hydrogen bond or an intramolecular cross-hydrogen bond. The azo pigment preferably has at least one or more substituent capable of forming an intramolecular cross-hydrogen bond, more preferably has at least three or more substituents capable of forming an intramolecular hydrogen bond, still more preferably has at least three or more substituents capable of forming an intramolecular hydrogen bond, where at least two hydrogen bonds are forming an intramolecular cross-hydrogen bond.

Out of the azo pigments represented by formulae (1), (2), (3) and (4), particularly preferred examples of the azo pigment include, as described above, azo pigments represented by formulae (10) to (13).

The reason why such a structure is preferred is because as shown in formulae (10) to (13), a nitrogen atom constituting a heterocyclic ring, a hydrogen atom and a heteroatom (a nitrogen atom of an azo group or its tautomer, i.e., hydrazone group, an oxygen atom of a carbonyl group, or a nitrogen atom of an amino group), contained in the azo pigment structure, are liable to readily form at least one or more intramolecular cross-hydrogen bond (intramolecular hydrogen bond).

The reason why such a structure is preferred is because as shown in formula (10) and (11), a nitrogen atom constituting a heterocyclic group, a hydrogen atom of an amino group, and a heteroatom (a nitrogen atom of an azo group or its tautomer, i.e., hydrazone group, an oxygen atom of a carbonyl group, or a nitrogen atom of an amino group), contained in the azo pigment structure, are liable to readily form at least one or more intramolecular cross-hydrogen bond.

More preferably, as shown in formulae (12) and (13), a nitrogen atom constituting a heterocyclic group, a hydrogen atom of an amino group, and a heteroatom (a nitrogen atom of an azo group or its tautomer, i.e., hydrazone group, an oxygen atom of a carbonyl group, or a nitrogen atom of an amino group), contained in the azo pigment structure, are liable to readily form at least four intramolecular hydrogen bonds and at the same time, liable to readily form at least two or more intramolecular cross-hydrogen bonds.

For these reasons, the molecular planarity is improved and the intramolecular/intermolecular interaction is enhanced, as a result, the crystallinity of the azo pigment represented, for example, by formula (12) is increased (a higher order structure is easily formed) to greatly enhance the performances required of the pigment, such as light fastness, thermal stability, wet heat stability, water resistance, gas resistance and solvent resistance, and this is a most preferred example.

In the present invention, each of the compounds represented by formula (1) to (13) can be applied even when an isotope (for example, 2H, 3H, 13C or 15N) is contained therein.

Specific examples of the azo pigments represented by formulae (1) to (13) are illustrated below, but the azo pigment for use in the present invention is not limited thereto. In the following specific examples, the structure is shown in the form of a canonical structure out of several kinds of tautomers which are chemically acceptable structures, but the structure may be of course a tautomer structure other than the structures described herein.

[Chem. 28]

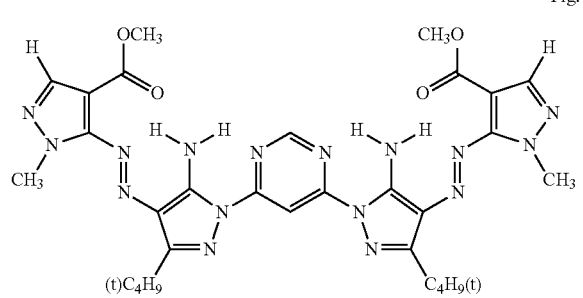

Fig. -1

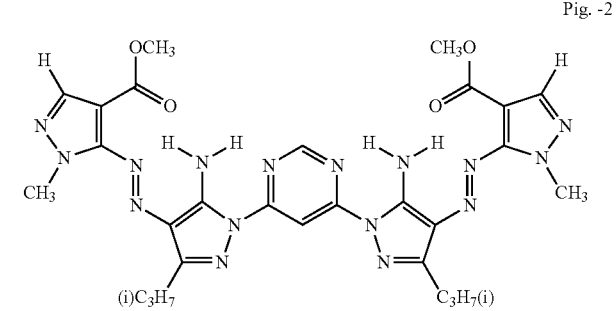

Fig. -2

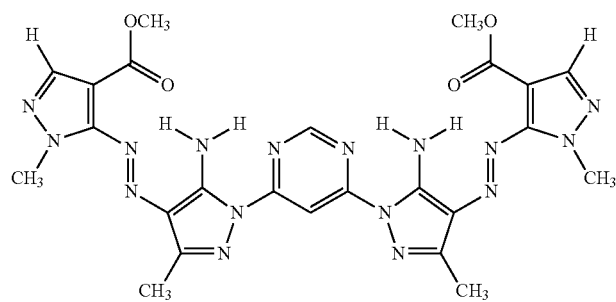

Fig. -3

[Chem. 29]

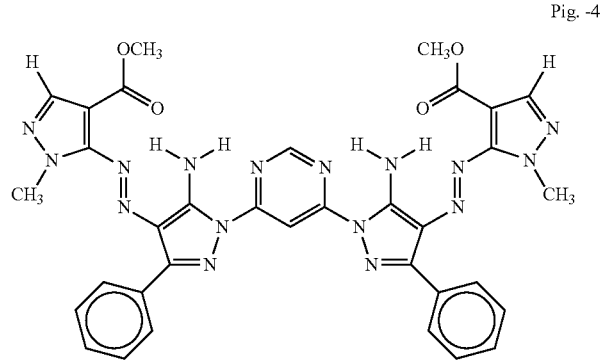

Fig. -4

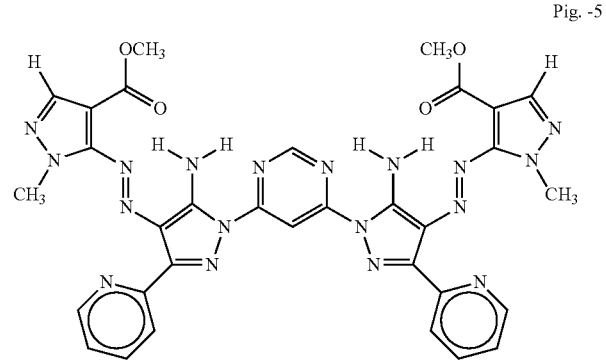

Fig. -5

-continued

[Chem. 30]

[Chem. 31]

-continued

[Chem. 32]

[Chem. 33]

-continued

[Chem. 34]

[Chem. 35]

-continued

[Chem. 36]

[Chem. 37]

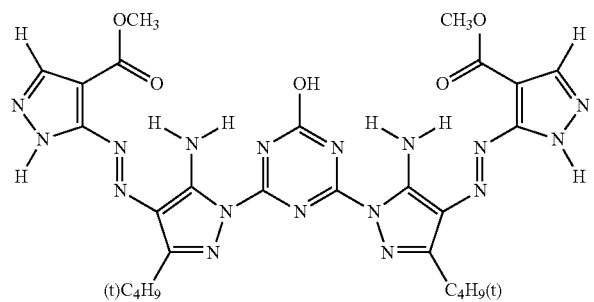
Pig. -30
[Chem. 38]
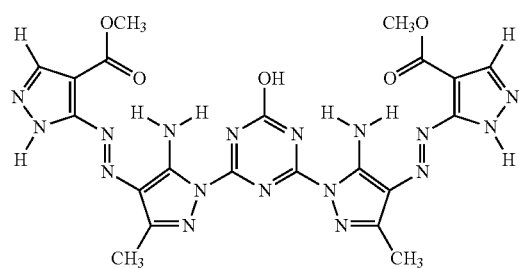
Pig. -31
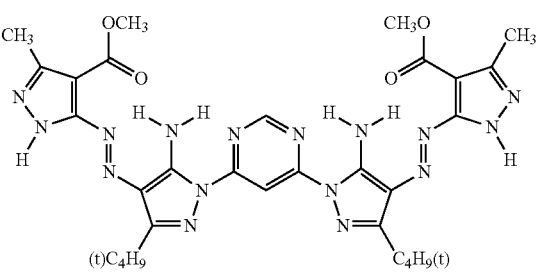
Pig. -32
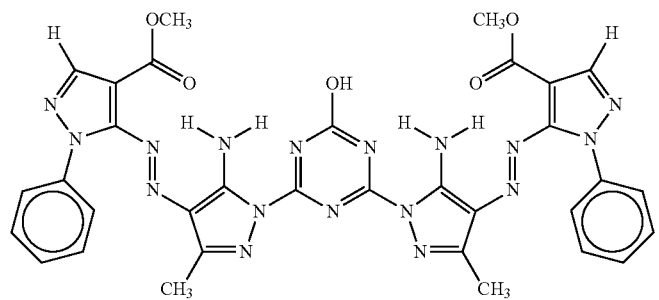
Pig. -33
[Chem. 39]
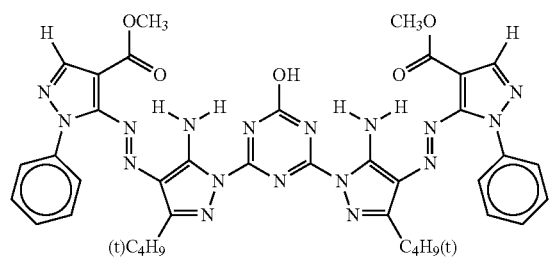
Pig. -34
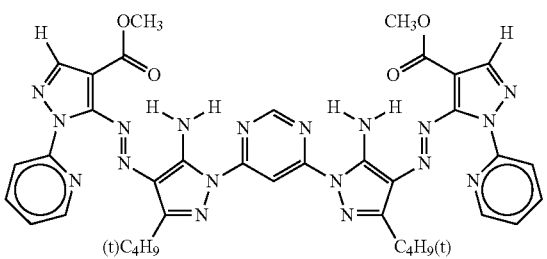
Pig. -35
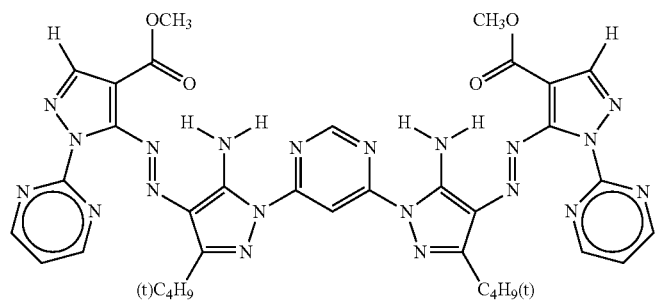
Pig. -36

-continued
[Chem. 40]
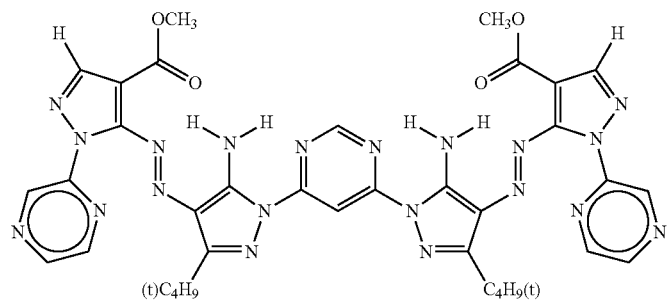
Pig. -37
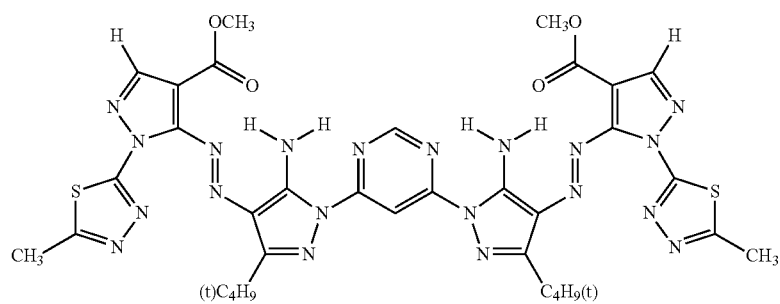
Pig. -38
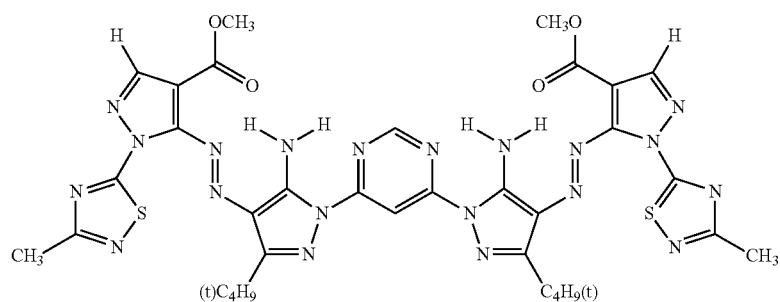
Pig. -39
[Chem. 41]
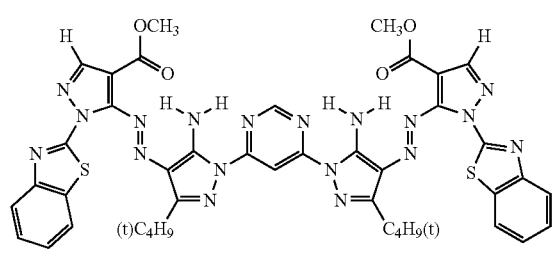
Pig. -40
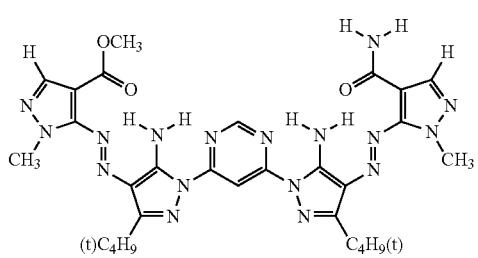
Pig. -41
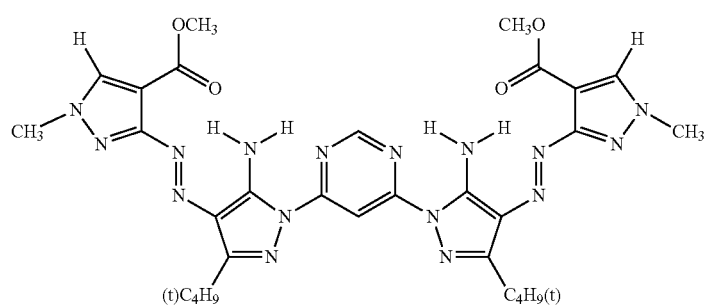
Pig. -42

-continued

[Chem. 42]

[Chem. 43]

[Chem. 44]

-continued
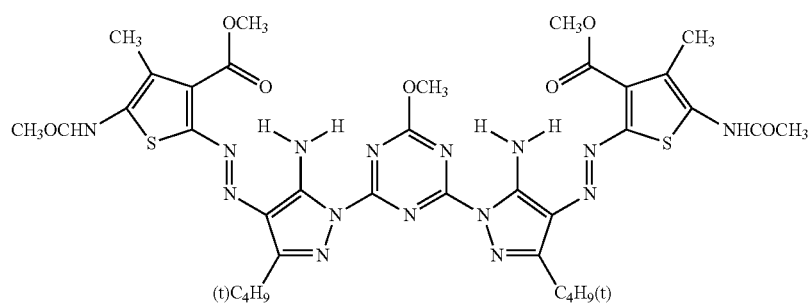
Pig. -50
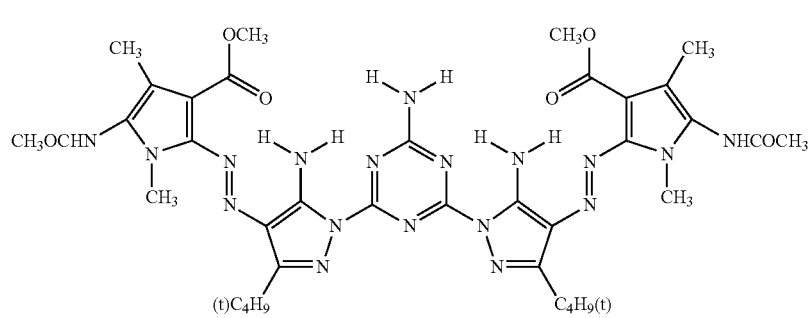
Pig. -51
[Chem. 45]
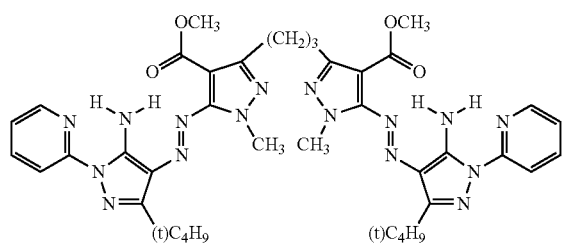
Pig. -52
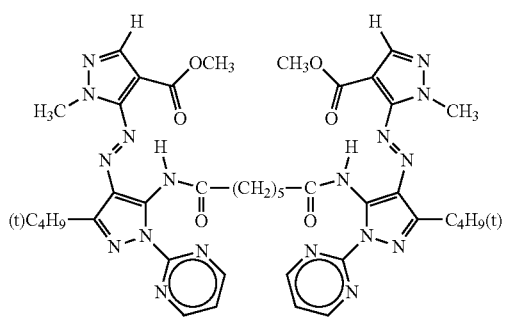
Pig. -53
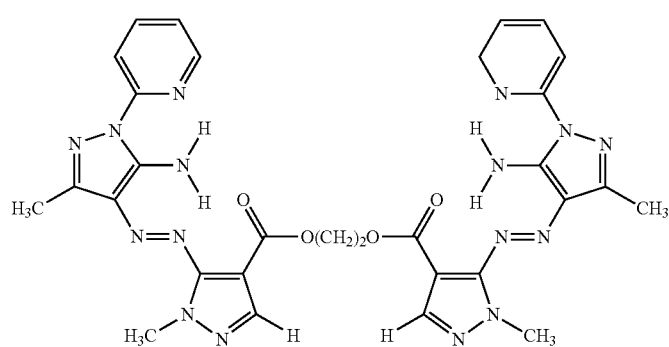
Pig. -54

[Chem. 46]
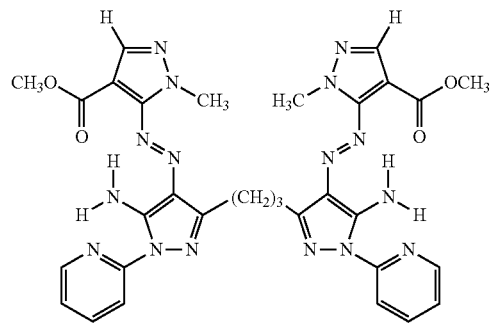
Pig. -55
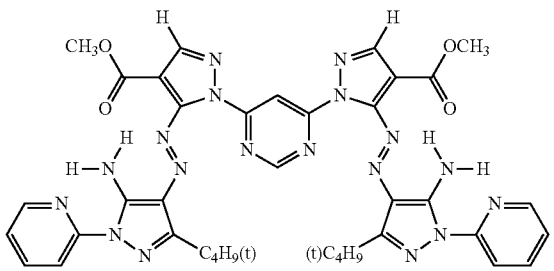
Pig. -56
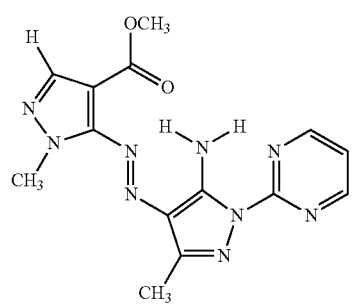
Pig. -57
[Chem. 47]
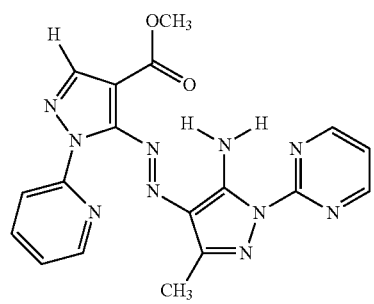
Pig. -58
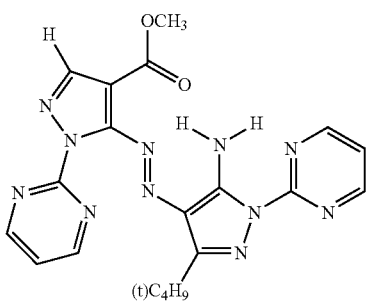
Pig. -59
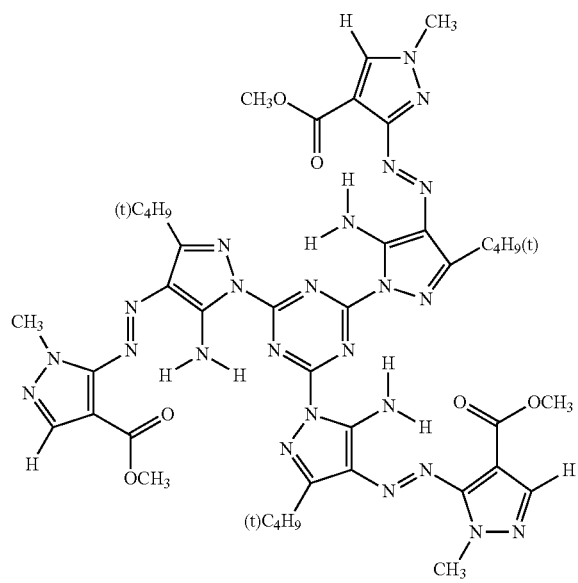
Pig. -60

[Chem. 48]

[Chem. 49]

[Chem. 50]

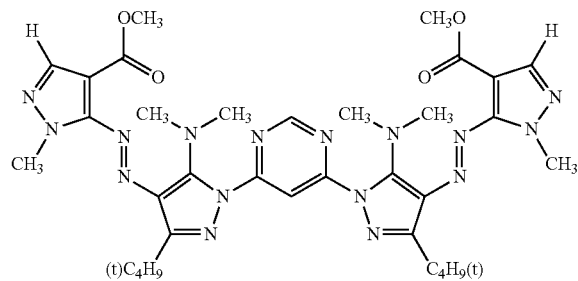

Pig. -67

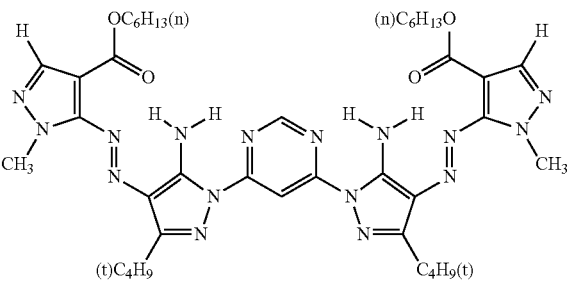

Pig. -68

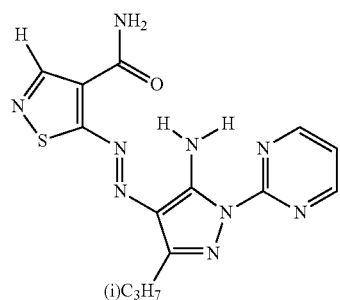

Pig. -69

[Chem. 51]

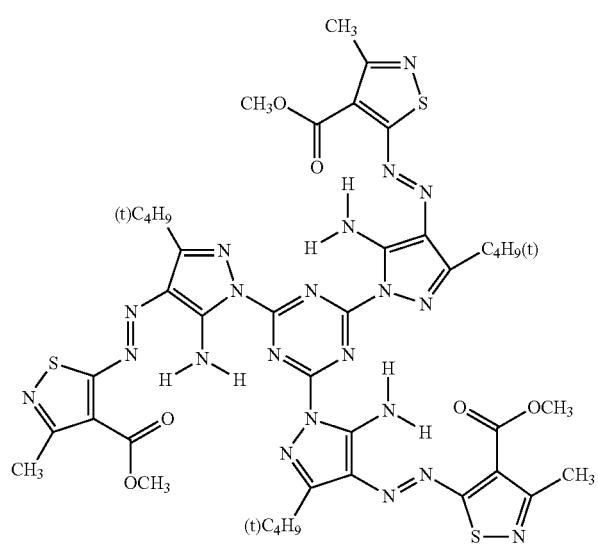

Pig. -70

In the present invention, even when a tautomer is present depending on the structure, the compound is shown by a representative form, and tautomers different from those described in the present invention are also included in the azo pigment of the present invention. Furthermore, salts and hydrates of the azo pigment of the present invention are included in the azo pigment of the present invention.

The pigment represented by formula (1) of the present invention may be sufficient if its chemical structure is formula (1) or a tautomer thereof, and may be a pigment having any crystalline morphology called polymorphism.

The crystalline polymorphism means that the chemical composition is the same but the arrangement of building blocks (molecules or ions) in the crystal differs. The chemical and physical properties are determined by the crystal structure, and each polymorphic form can be distinguished by the rheology, color and other color characteristics. Also, different polymorphic forms can be confirmed by X-ray diffraction (powder X-ray diffraction measurement results) or X-ray analysis (X-ray crystal structure analysis results).

In the case where a polymorphic crystalline form is present in the pigment represented by formulae (1) to (4) of the present invention, the pigment may have any polymorphic form or may have a mixture of two or more kinds of polymorphic forms, but the main component preferably has a single crystalline form, that is, a polymorphic crystalline form is preferably not mixed in the main component, and the content of the azo pigment having a single crystalline form is from 70 to 100%, preferably from 80 to 100%, more preferably from 90 to 100%, still more preferably from 95 to 100%, yet still more preferably 100%, based on the entire azo pigment. By using as the main component an azo pigment having a single crystalline form, regularity with respect to the arrangement of colorant molecules is enhanced, the intramolecular/intermolecular interaction is intensified, a high-order three-dimensional network is readily formed, and this is preferred in view of performances required of the pigment, such as enhanced hue, fastness to light, heat, humidity and oxidative gas, and solvent resistance.

The ratio of the polymorphic crystalline form mixed in the azo pigment can be confirmed by the values obtained in physicochemical measurement of a solid, such as single-crystal X-ray crystal structure analysis, powder X-ray diffraction (XRD), micrograph of crystal (TEM), and IR (KBr method).

In the present invention, in the case where the azo pigment represented by formula (1) has an acid radical, the acid radical may be partially or entirely salt-type, or a salt-type pigment and a free acid-type pigment may coexist. Examples of the salt type include an alkali metal salt such as Na, Li and K, an ammonium salt which may be substituted with an alkyl group or a hydroxyalkyl group, and an organic amine salt. Examples of the organic amine include a lower alkylamine, a hydroxy-substituted lower alkylamine, a carboxy-substituted lower alkylamine, and a polyamine having from 2 to 10 alkylene imine units having a carbon number of 2 to 4. The salt type is not limited only to one kind, but a plurality of kinds may also be present together.

In the structure of the pigment for use in the present invention, when a plurality of acid radicals are contained in one molecule, the plurality of acid radicals may be salt-type or acid-type and may be different from each other.

In the present invention, the azo pigment represented by formula (1) may be a hydrate containing a water molecule in the crystal.

One example of the production method for the azo pigment represented by formula (1) is described below. For example, a heterocyclic amine represented by the following formula (A) is converted into a diazonium form under acidic conditions, caused to undergo a coupling reaction with a compound represented by the following formula (B) and then subjected to a post-treatment in an ordinary manner, whereby the azo pigment represented by formula (1) can be produced.

[Chem. 52]

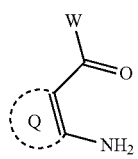

Formula (A)

Formula (B):

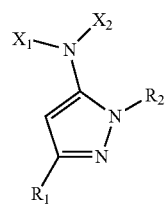

(In formulae (A) and (B), W, Q, $R_1$, $R_2$, $X_1$ and $X_2$ have the same meanings as in formula (1).)

The heterocyclic amine represented by formula (A) can be produced generally by a commonly employed method, for example, by a method described in Helv. Chim. Acta., 41, 1958, 1052-1056, and Helv. Chim. Acta., 42, 1959, 349-352, or a method in accordance therewith.

The compound represented by formula (B) can be produced by a method described in International Publication No. 06/082669 or JP-A-2006-57076 or a method in accordance therewith.

The conversion of the heterocyclic amine represented by formula (A) into a diazonium may be performed by allowing the heterocyclic amine to react with a reagent such as sodium nitrite, nitrosylsulfuric acid and isoamyl nitrite in an acidic solvent such as sulfuric acid, phosphoric acid, acetic acid, hydrochloric acid and methanesulfonic acid at a temperature of 15° C. or less for approximately from 10 minutes to 6 hours.

The coupling reaction may be performed by reacting the diazonium salt obtained by the above-described method with a compound represented by formula (B) at 40° C. or less, preferably 25° C. or less, for approximately from 10 minutes to 12 hours.

A crystal is sometimes precipitated in the solution obtained by such a reaction, but generally, a crystal may be precipitated by adding water or an alcohol-based solvent to the reaction solution and the crystal may be collected by filtration. Also, a crystal may be precipitated by adding an alcohol-based solvent, water or the like to the reaction solution and the precipitated crystal may be collected by filtration. The crystal collected by filtration is washed/dried, if desired, whereby the azo pigment represented by formula (1) can be obtained.

The compound represented by formula (1) is obtained as a crude azo pigment (crude) by the production method above, but in the case of using the compound as the pigment of the present invention, a post-treatment is preferably performed. Examples of the post-treatment method include a process of controlling the pigment particle by a milling treatment such as solvent salt milling, salt milling, dry milling, solvent milling and acid pasting or by a solvent heating treatment, and a surface treatment process using a resin, a surfactant, a dispersant or the like.

For the compound represented by formula (1) of the present invention, a solvent heating treatment and/or a solvent salt milling are preferably performed as the post-treatment.

Examples of the solvent used for the solvent heating treatment include water, an aromatic hydrocarbon-based solvent such as toluene and xylene, a halogenated hydrocarbon-based solvent such as chlorobenzene and o-dichlorobenzene, an alcohol-based solvent such as isopropanol and isobutanol, a polar aprotic organic solvent such as N,N-dimethylformamide, N,N-dimethylacetamide and N-methyl-2-pyrrolidone, glacial acetic acid, pyridine, and a mixture thereof. In the solvent described above, an inorganic or organic acid or base may be further added. The temperature of the solvent heating treatment varies depending on the desired primary particle diameter of the pigment but is preferably from 40 to 150° C., more preferably from 60 to 100° C. Also, the treatment time is preferably from 30 minutes to 24 hours.

In the solvent salt milling, for example, the crude azo pigment, an inorganic salt and an organic solvent incapable of dissolving these are charged into a kneading machine, and kneading milling is performed therein. As for the inorganic salt, a water-soluble inorganic salt can be suitably used and, for example, an inorganic salt such as sodium chloride, potassium chloride and sodium sulfate is preferably used. Use of an inorganic salt having an average particle diameter of 0.5 to 50 µm is more preferred. The amount of the inorganic salt used is preferably from 3 to 20 times by mass, more preferably from 5 to 15 times by mass, based on the crude azo pigment. As for the organic solvent, a water-soluble organic solvent can be suitably used and in view of safety, a high boiling point solvent is preferred, because the solvent enters an evaporable state due to rise in the temperature during kneading. Examples of such an organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy) ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent used is preferably from 0.1 to 5 times by mass based on the crude azo pigment. The kneading temperature is preferably from 20 to 130° C., more preferably from 40 to 110° C. Examples of the kneading machine which can be used include a kneader and a mix-muller.

<Vinyl Polymer Particle>

The vinyl polymer particle for use in the present invention contains the azo pigment represented by formula (1), its tautomer or a salt or hydrate thereof and a vinyl polymer (hereinafter sometimes referred to as a "resin" or a "specific resin") containing (a) a hydrophobic structural unit having an aromatic ring bonded to the polymer main chain through a linking group and (b) a hydrophilic structural unit.

The vinyl polymer particle containing the pigment for use in the present invention can be produced by a conventional physical or chemical method using the specific resin, the pigment and the like. For example, the resin can be produced by the method described in JP-A-9-151342, JP-A-10-140065, JP-A-11-209672, JP-A-11-172180, JP-A-10-25440 and JP-A-11-43636. Specific examples thereof include a phase inversion method and an acid precipitation method described in JP-A-9-151342 and JP-A-10-140065. Above all, a phase inversion method is preferred in view of dispersion stability.

The specific resin preferably contains (a) a hydrophobic structural unit having an aromatic ring bonded to the polymer main chain through a linking group and (b) a hydrophilic structural unit.

a) Phase Inversion Method

The phase inversion method is fundamentally a self-dispersion (phase inversion emulsification) method of dispersing a mixed melt of a self-dispersing or self-dissolving resin and a pigment in water, where a pigment-containing vinyl polymer particle can be obtained. The term "mixed melt" as used herein includes a state of the melt being mixed without dissolving, a state of the melt being dissolved and mixed, and a state containing these two states. Specific examples of the production method by the "phase inversion method" include the methods described in JP-A-10-140065.

b) Acid Precipitation Method

The acid precipitation method is a method of preparing a hydrous cake composed of the resin and the pigment and neutralizing a part or all of anionic groups of the resin in the hydrous cake by using a basic compound to obtain a pigment-containing vinyl polymer particle.

The acid precipitation method specifically includes a method comprising (1) a step of dispersing the resin and the pigment in an alkaline aqueous medium and, if desired, performing a heat treatment to gel the resin, (2) a step of adjusting the pH to neutral or acidic to hydrophobe the resin, thereby firmly attaching the resin to the pigment, (3) a step of, if desired, performing filtration and water washing to obtain a hydrous cake, (4) a step of neutralizing a part or all of anionic groups of the resin in the hydrous cake by using a basic compound and then re-dispersing the cake in an aqueous medium, and (5) a step of, if desired, performing a heat treatment to gel the resin.

Specific examples of the production method by the phase inversion method or acid precipitation method include the methods described in JP-A-9-151342 and JP-A-10-140065.

In the aqueous ink for inkjet recording of the present invention, the pigment-containing vinyl polymer particle can be obtained by providing a step of obtaining the specific resin as an aqueous dispersion, more specifically, a preparation step of preparing a dispersion of a pigment-containing vinyl polymer particle by a method comprising the following steps (1) and (2). Also, the production of the aqueous ink for inkjet recording of the present invention can be performed suitably by a method of providing the above-described preparation step and using the obtained dispersion of a pigment-containing vinyl polymer particle together with water and a water-soluble organic solvent to produce an aqueous ink.

Step (1): A step of dispersing a mixture containing the above-described specific resin for use in the present invention, an organic solvent, a neutralizing agent, a pigment and water by stirring or the like to obtain a dispersion.

Step (2): A step of removing the organic solvent from the dispersion.

The stirring method is not particularly limited, and a mixing/stirring apparatus in general use and, if desired, a disperser such as ultrasonic disperser, high-pressure homogenizer and bead mill may be used.

The preferred organic solvent includes an alcohol-based solvent, a ketone-based solvent and an ether-based solvent.

Examples of the alcohol-based solvent include isopropyl alcohol, n-butanol, tert-butanol and ethanol. Examples of the ketone-based solvent include acetone, methyl ethyl ketone, diethyl ketone and methyl isobutyl ketone. Examples of the ether-based solvent include dibutyl ether and dioxane. Among these solvents, a ketone-based solvent such as methyl ethyl ketone and an alcohol-based solvent such as isopropyl alcohol are preferred, and methyl ethyl ketone is most preferred.

The neutralizing agent is used to neutralize a part or all of dissociative groups and form a stably emulsified or dispersed state of the specific resin in water. In the case where the specific resin has an anionic dissociative group as the dissociative group, the neutralizing agent used here includes a basic compound such as organic amine compound, ammonia and alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine and triisopropanolamine. Examples of the alkali metal hydroxide include lithium hydroxide, sodium hydroxide and potassium hydroxide. Among these, in view of dispersion stability in water, sodium hydroxide, potassium hydroxide, triethylamine and triethanolamine are preferred, and sodium hydroxide and potassium hydroxide are more preferred.

The content of the basic compound is preferably from 5 to 120 mol %, more preferably from 10 to 120 mol %, still more preferably from 80 to 120 mol %, per 100 mol % of the dissociative group. When the content is 5 mol % or more, this is effective in stabilizing dispersion in water, and when it is 120 mol % or less, an effect of reducing water-soluble components is produced.

In the step (2), the organic solvent is distilled off from the dispersion obtained in the step (1) by an ordinary method such as reduced-pressure distillation to effect phase inversion to an aqueous system, whereby a dispersion of a vinyl polymer particle containing a pigment with the pigment particle surface being covered by the resin can be obtained. In the obtained dispersion, the organic solvent is substantially removed, and the amount of the organic solvent is preferably 0.2 mass % or less, more preferably 0.1 mass % or less.

More specifically, the aqueous ink for inkjet recording can be produced, for example, by providing (1) a step of mixing a solution that is prepared by dissolving the anionic group-containing specific resin for use in the present invention in an organic solvent, with a basic compound (neutralizing agent) and water, thereby effecting neutralization, (2) a step of mixing the resulting mixed solution and a pigment to form a suspension and then dispersing the pigment by a disperser or the like to obtain a pigment liquid dispersion, and (3) a step of removing the organic solvent, for example by distillation to coat the pigment with the anionic group-containing specific resin and dispersing the coated pigment in an aqueous medium to obtain an aqueous dispersion.

For more specific details, JP-A-11-2096722 and JP-A-11-172180 may be referred to.

The average particle diameter of the pigment-containing vinyl polymer particle contained in the aqueous ink for inkjet recording of the present invention is preferably from 10 to 400 nm, more preferably from 10 to 200 nm, still more preferably from 50 to 150 nm. When the average particle diameter is 10 nm or more, the suitability for production is enhanced, and when it is 400 nm or less, good storage stability is obtained. The pigment-containing vinyl polymer particle is not particularly limited in its particle diameter distribution and may be either a vinyl polymer particle having a broad particle diameter distribution or a vinyl polymer particle having a monodisperse particle diameter distribution.

The average particle diameter and particle diameter distribution of the pigment-containing vinyl polymer particle are values determined by measuring the volume average particle diameter according to a dynamic light scattering method using a Nanotrac particle size distribution measuring apparatus, UPA-EX150 (manufactured by Nikkiso Co., Ltd.).

In the present invention, the dispersing treatment may be performed using, for example, a ball mill, a roll mill, a bead mill, a high-pressure homogenizer, a high-speed stirring-type disperser or an ultrasonic homogenizer.

In the present invention, the content of the vinyl polymer particle in the aqueous ink for inkjet recording is, in view of dispersion stability and concentration of the aqueous ink for inkjet recording, preferably from 1 to 10 mass %, more preferably from 2 to 8 mass %, still more preferably from 2 to 6 mass %.

<Water-Soluble Solvent>

The aqueous ink for inkjet recording of the present invention contains a water-soluble solvent as an essential component. The water-soluble solvent includes a water-soluble organic solvent. The water-soluble organic solvent is used for the purpose of functioning as an anti-drying agent, a wetting agent or a penetration accelerator.

The anti-drying agent is used for the purpose of preventing nozzle clogging due to drying of the ink for inkjet recording at an ink ejection port. The anti-drying agent and wetting agent are preferably a water-soluble organic solvent having a vapor pressure lower than that of water. Also, for the purpose of allowing more successful penetration of the ink for inkjet recording into paper, a water-soluble organic solvent is suitably used as the penetration accelerator.

Examples of the water-soluble organic solvent include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, polyoxyethylene glyceryl ether, polyoxypropylene glyceryl ether, 2-butene-1,4-diol, 2-ethyl-1,3-hexanediol, 2-methyl-2,4-pentanediol, 1,2-octanediol, 1,2-hexanediol, 1,2-pentanediol and 4-methyl-1,2-pentanediol; saccharides such as glucose, mannose, fructose, ribose, xylose, arabinose, galactose, aldonic acid, glucitol, (sorbitol), maltose, cellobiose, lactose, sucrose, trehalose and maltotriose; sugar alcohols; hyaluronic acids; so-called solid wetting agents such as ureas; alkyl alcohols having a carbon number of 1 to 4, such as ethanol, methanol, butanol, propanol and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-tert-butyl ether, diethylene glycol mono-tert-butyl ether, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, and sulfolane. These organic solvents may be used individually or in combination of two or more thereof.

In use as an anti-drying agent or a wetting agent, a polyol compound is useful, and examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol and 1,2,6-hexanetriol. One of these compounds may be used alone, or two or more thereof may be used in combination.

In use as a penetrant, a polyol compound is preferred, and examples of the aliphatic diol include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol. Among these, 2-ethyl-1,3-hexanediol and 2,2,4-trimethyl-1,3-pentanediol are preferred.

As regards the water-soluble solvent for use in the present invention, one kind may be used alone or a mixture of two or more kinds may be used. Preferred examples of the water-soluble solvent include glycerin, dipropylene glycol, polyoxyethylene glyceryl ether and polyoxypropylene glyceryl ether.

The content of the water-soluble organic solvent is from 5 to 60 mass %, preferably from 10 to 40 mass %, based on the entire mass of the ink.

The amount added of water for use in the present invention is not particularly limited but is preferably from 10 to 99 mass %, more preferably from 30 to 80 mass %, still more preferably from 50 to 70 mass %, based on the entire mass of the ink.

<Surfactant>

The ink of the present invention preferably contains a surface tension regulating agent. The surface tension regulating agent includes nonionic, cationic, anionic and betaine surfactants. In order to successfully hit the ink by an inkjet system, the added amount of the surface tension regulating agent is preferably an amount capable of adjusting the surface tension of the ink of the present invention to from 20 to 60 mN/m, more preferably from 20 to 45 mN/m, still more preferably from 25 to 40 mN/m.

In the present invention, for example, a compound having a structure containing both a hydrophilic moiety and a hydrophobic moiety in the molecule may be effectively used as the surfactant, and any of an anionic surfactant, a cationic surfactant, an amphoteric surfactant and a nonionic surfactant can be used. Furthermore, the above-described polymer substance (polymer dispersant) is also usable as the surfactant.

Specific examples of the anionic surfactant include sodium dodecylbenzenesulfonate, sodium laurylsulfate, sodium alkyldiphenyl ether disulfonate, sodium alkylnaphthalenesulfonate, sodium dialkylsulfosuccinate, sodium stearate, potassium oleate, sodium dioctylsulfosuccinate, sodium polyoxyethylene alkyl ether sulfate, sodium polyoxyethylene allyl ether sulfate, sodium polyoxyethylene alkylphenyl ether sulfate, sodium dialkylsulfosuccinate, sodium stearate, sodium oleate, and sodium tert-octylphenoxyethoxypolyethoxyethylsulfate. One of these surfactants or two or more thereof may be selected.

Specific examples of the nonionic surfactant include polyoxyethylene lauryl ether, polyoxyethylene octylphenyl ether, polyoxyethylene oleylphenyl ether, polyoxyethylene nonyiphenyl ether, an oxyethylene-oxypropylene block copolymer, tert-octylphenoxyethyl polyethoxyethanol and nonylphenoxyethyl polyethoxyethanol. One of these surfactants or two or more thereof may be selected.

Examples of the cationic surfactant include a tetraalkylammonium salt, an alkylamine salt, a benzalkonium salt, an alkylpyridinium salt and an imidazolium salt, and specific examples thereof include dihydroxyethyl stearylamine, 2-heptadecenyl-hydroxyethylimidazoline, lauryldimethylbenzylammonium chloride, cetylpyridinium chloride and stearamidomethylpyridinium chloride.

The amount of the surfactant added to the liquid composition for inkjet recording of the present invention is not particularly limited but is preferably 1 mass % or more, more preferably from 1 to 10 mass %, still more preferably from 1 to 3 mass %.

<Other Components>

The ink of the present invention may contain other additives. Examples of other additives include known additives such as ultraviolet absorber, anti-fading agent, fungicide, pH adjusting agent, rust preventing agent, antioxidant, emulsion stabilizer, antiseptic, defoaming agent, viscosity adjusting agent, dispersion stabilizer and chelating agent.

Examples of the ultraviolet absorber include benzophenone-based ultraviolet absorber, a benzotriazole-based ultraviolet absorber, a salicylate-based ultraviolet absorber, a cyanoacrylate-based ultraviolet absorber and a nickel complex salt-based ultraviolet absorber.

As for the anti-fading agent, various organic or metal complex-based anti-fading agents may be used. Examples of the organic anti-fading agents include hydroquinones, alkoxyphenols, dialkoxyphenols, phenols, anilines, amines, indanes, chromans, alkoxyanilines and heterocyclic rings, and examples of the metal complex include a nickel complex and a zinc complex.

Examples of the fungicide include sodium dehydroacetate, sodium benzoate, sodium pyridinethione-1-oxide, ethyl p-hydroxybenzoate, 1,2-benzisothiazolin-3-one, sodium sorbate and pentachlorophenol sodium. The fungicide is preferably used in an amount of 0.02 to 1.00 mass % in the ink.

The pH adjusting agent is not particularly limited as long as it can adjust the pH to a desired value without adversely affecting the recording ink prepared, and an appropriate pH adjusting agent may be selected according to the purpose, but examples thereof include alcohol amines (e.g., diethanolamine, triethanolamine, 2-amino-2-ethyl-1,3-propanediol), alkali metal hydroxides (e.g., lithium hydroxide, sodium hydroxide, potassium hydroxide), ammonium hydroxides (e.g., ammonium hydroxide, quaternary ammonium hydroxide), phosphonium hydroxides and alkali metal carbonates.

Examples of the rust preventing agent include acidic sulfite, sodium thiosulfate, ammonium thiodiglycolate, diisopropylammonium nitrite, pentaerythritol tetranitrate and dicyclohexylammonium nitrite.

Examples of the antioxidant include a phenol-based antioxidant (including a hindered phenol-based antioxidant), an amine-based antioxidant, a sulfur-based antioxidant and a phosphorous-based antioxidant.

Examples of the chelating agent include sodium ethylenediaminetetraacetate, sodium nitrilotriacetate, sodium hydroxyethylethylenediaminetriacetate, sodium diethylenetriaminepentaacetate and sodium uramil diacetate.

<Resin Fine Particle>

The ink of the present invention may contain a resin fine particle or a polymer latex. Examples of the resin fine particle or polymer latex which can be used include acrylic resin, vinyl acetate-based resin, styrene-butadiene-based resin, vinyl chloride-based resin, acryl-styrene-based resin, butadiene-based resin, styrene-based resin, crosslinked acrylic resin, crosslinked styrene-based resin, benzoguanamine resin, phenol resin, silicone resin, epoxy resin, urethane-based resin, paraffin-based resin and fluororesin. Of these examples, preferred are acrylic resin, acryl-styrene-based resin, styrene-based resin, crosslinked acrylic resin and crosslinked styrene-based resin.

Preferred examples of the resin fine particle include a self-dispersing polymer fine particle. The self-dispersing polymer fine particle is a fine particle of a high-molecular polymer capable of forming a dispersed state in an aqueous medium in the absence of other surfactants by the action of a functional group (in particular, an acidic group or a salt thereof) possessed by the polymer itself, and this is a high-molecular polymer not containing a free emulsifier. The dispersed state as used herein includes both an emulsified state (emulsion) where the high-molecular polymer is dispersed in a liquid state in an aqueous medium, and a dispersed state (suspension) where the high-molecular polymer is dispersed in a solid state in an aqueous medium. In the present invention, a high-molecular polymer capable of forming a dispersed state where the high-molecular polymer is dispersed in a solid state is preferred.

In view of self-dispersibility, the self-dispersing polymer fine particle for use in the present invention preferably contains a high-molecular polymer containing a hydrophilic constituent unit and a constituent unit derived from an aromatic group-containing monomer.

The hydrophilic constituent unit is not particularly limited as long as it is derived from a hydrophilic group-containing monomer, and this unit may be derived from one kind of a hydrophilic group-containing monomer or may be derived from two or more kinds of hydrophilic group-containing monomers. The hydrophilic group is not particularly limited and may be a dissociative group or a nonionic hydrophilic group. From the standpoint of accelerating self-dispersion and stabilizing the formed emulsion or dispersion state, the hydrophilic group is preferably a dissociative group, more preferably an anionic dissociative group. Examples of the dissociative group include a carboxyl group, a phosphoric acid group and a sulfonic acid group. Among these, a carboxyl group is preferred in view of fixing property of the ink composition prepared. Examples of the dissociative group-containing monomer include an unsaturated carboxylic acid monomer, an unsaturated sulfonic acid monomer and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid and 2-methacryloyloxymethylsuccinic acid. Specific examples of the unsaturated sulfonic acid monomer include styrenesulfonic acid, 2-acrylamido-2-methylpropanesulfonic acid, 3-sulfopropyl(meth)acrylate and bis-(3-sulfopropyl)-itaconic acid ester. Specific examples of the unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate. In view of dispersion stability and ejection stability, an unsaturated carboxylic acid monomer is preferred, and an acrylic acid and a methacrylic acid are more preferred.

The aromatic group-containing monomer is not particularly limited as long as it is a compound containing an aromatic group and a polymerizable group. The aromatic group may be a group derived from an aromatic hydrocarbon or a group derived from an aromatic heterocyclic ring. An aromatic group derived from an aromatic hydrocarbon is preferred in view of stability of the particle shape in an aqueous medium. The polymerizable group may be a condensation polymerizable group or an addition polymerizable group. In the present invention, considering the stability of particle shape in an aqueous medium, an addition polymerizable group is preferred, and a group containing an ethylenically unsaturated bond is more preferred.

The aromatic group-containing monomer is preferably a monomer having an aromatic hydrocarbon-derived aromatic group and an ethylenically unsaturated bond, more preferably an aromatic group-containing (meth)acrylate monomer. Examples of the aromatic group-containing monomer include a phenoxyethyl(meth)acrylate, a benzyl(meth)acrylate, a phenyl(meth)acrylate and a styrene-based monomer. Among these, from the aspect of the balance between hydrophilicity and hydrophobicity of the polymer chain and the ink fixing property, at least one selected from a phenoxyethyl (meth)acrylate, a benzyl(meth)acrylate and a phenyl(meth) acrylate is preferred, a phenoxyethyl(meth)acrylate is more preferred, and phenoxyethyl acrylate is still more preferred.

Incidentally, the term "(meth)acrylate" means an acrylate or a methacrylate. It is preferred that the self-dispersing polymer fine particle contains a constituent unit derived from an aromatic group-containing (meth)acrylate monomer and the content thereof is from 10 to 95 mass %. When the content of the aromatic group-containing (meth)acrylate monomer is from 10 to 95 mass %, the stability of self-emulsified or self-dispersed state is enhanced and an increase in the ink viscosity can be suppressed. In view of stability of the self-dispersed state or from the standpoint of stabilizing the particle shape in an aqueous medium by the use of a hydrophobic interaction between aromatic rings or reducing the amount of water-soluble components by virtue of appropriate hydrophobization of the particle, the content of the constituent unit is more preferably from 15 to 90 mass %, still more preferably from 15 to 80 mass %, yet still more preferably from 25 to 70 mass %.

The self-dispersing polymer fine particle may consist of, for example, a constituent unit composed of an aromatic group-containing monomer and a constituent unit composed of a dissociative group-containing monomer and may further contain other constituent units, if desired.

The monomer forming other constituent units is not particularly limited as long as it is a monomer copolymerizable with the aromatic group-containing monomer and the dissociative group-containing monomer. Above all, an alkyl group-containing monomer is preferred in view of flexibility of the polymer structure and easy control of the glass transition temperature (Tg).

Examples of the alkyl group-containing monomer include an alkyl(meth)acrylate such as methyl (meth)acrylate, ethyl (meth)acrylate, isopropyl(meth)acrylate, n-propyl(meth)acrylate, n-butyl(meth)acrylate, isobutyl(meth)acrylate, tert-butyl(meth)acrylate, hexyl(meth)acrylate and ethylhexyl (meth)acrylate; an ethylenically unsaturated monomer having a hydroxyl group, such as hydroxymethyl (meth)acrylate, 2-hydroxyethyl(meth)acrylate, 2-hydroxypropyl(meth) acrylate, 4-hydroxybutyl(meth)acrylate, hydroxypentyl (meth)acrylate and hydroxyhexyl (meth)acrylate; a dialkylaminoalkyl(meth)acrylate such as dimethylaminoethyl (meth)acrylate; and a (meth)acrylamide including an N-hydroxyalkyl(meth)acrylamide such as N-hydroxymethyl (meth)acrylamide, N-hydroxyethyl(meth)acrylamide and N-hydroxybutyl(meth)acrylamide, and an N-alkoxyalkyl (meth)acrylamide such as N-methoxymethyl(meth)acrylamide, N-ethoxymethyl(meth)acrylamide, N-(n-,iso)butoxymethyl(meth)acrylamide, N-methoxyethyl(meth)acrylamide, N-ethoxyethyl(meth)acrylamide and N-(n-,iso)butoxyethyl(meth)acrylamide.

The molecular weight of the high-molecular polymer constituting the self-dispersing polymer fine particle for use in the present invention is, in terms of the mass average molecular weight, preferably from 3,000 to 200,000, more preferably from 5,000 to 150,000, still more preferably from 10,000 to 100,000. By setting the mass average molecular weight to 3,000 or more, the amount of water-soluble components can be effectively reduced, and by setting the mass average molecular weight to 200,000 or less, the self-dispersion stability can be increased.

The mass average molecular weight can be measured by gel permeation chromatograph (GPC).

From the standpoint of controlling the hydrophilicity and hydrophobicity of the polymer, the high-molecular polymer constituting the self-dispersing polymer fine particle preferably contains an aromatic group-containing (meth)acrylate monomer in a copolymerization ratio of 15 to 90 mass %, a carboxyl group-containing monomer and an alkyl group-containing monomer and has an acid value of 25 to 100 and a mass average molecular weight of 3,000 to 200,000, more preferably contains an aromatic group-containing (meth) acrylate monomer in a copolymerization ratio of 15 to 80 mass %, a carboxyl group-containing monomer and an alkyl group-containing monomer and has an acid value of 25 to 95 and a mass average molecular weight of 5,000 to 150,000.

The average particle diameter of the self-dispersing polymer fine particle is preferably from 10 nm to 1 μm, more preferably from 10 to 200 nm, still more preferably from 20 to 100 nm, yet still more preferably from 20 to 50 nm.

The amount of the self-dispersing fine particle added is preferably from 0.5 to 20 mass %, more preferably from 3 to 20 mass %, still more preferably from 5 to 15 mass %, based on the ink.

The glass transition temperature Tg of the self-dispersing polymer fine particle is preferably 30° C. or more, more preferably 40° C. or more, still more preferably 50° C. or more. The polymer particle is not particularly limited in its particle diameter distribution and may be either a polymer particle having a broad particle diameter distribution or a polymer particle having a monodisperse particle diameter distribution. Also, two or more kinds of polymer fine particles each having a monodisperse particle diameter distribution may be mixed and used.

<Liquid Composition for Enhancing Printability>

In the present invention, for example, a liquid composition for enhancing the printability is preferably imparted to a printing medium.

One preferred example of the liquid composition for enhancing the printability, which can be used in the present invention, is a liquid composition capable of producing an aggregate by changing the pH of the ink. At this time, the pH of the liquid composition is preferably from 1 to 6, more preferably from 2 to 5, still more preferably from 3 to 5. The component of the liquid composition is preferably selected from, for example, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts thereof. One kind of these compounds may be used, or two or more kinds thereof may be used in combination.

One preferred example of the liquid composition for enhancing the printability, which can be used in the present invention, is a processing solution having added thereto a polyvalent metal salt or a polyallylamine. Examples of the component of the liquid composition include, as the polyvalent metal salt, an alkaline earth metal of Group 2A of the periodic table (e.g., magnesium, calcium), a transition metal of Group 3B of the periodic table (e.g., lanthanum), a cation from Group 3A of the periodic table (e.g., aluminum), and lanthanides (e.g., neodymium); and include polyallylamine and a polyallylamine derivative. Of these, calcium and magnesium are preferred. Examples of the anion that may be preferably employed as a counter salt of calcium or magnesium include a carboxylate salt (e.g., formate, acetate, benzoate), a nitrate, a chloride and a thiocyanate. As for the amount added to the processing solution, the salt may be allowed to exist in an amount of about 1 to about 10 mass %, preferably from about 1.5 to about 7 mass %, more preferably from about 2 to about 6 mass %, in the processing solution.

<Physical Properties of Ink>

The surface tension of the ink of the present invention is preferably from 20 to 60 mN/m, more preferably 20 to 45 mN/m, still more preferably 25 to 40 mN/m.

The viscosity at 20° C. of the ink of the present invention is preferably from 1.2 to 15.0 mPa·s, more preferably from 2 mPa·s to less than 13 mPa·s, still more preferably from 2.5 mPa·s to less than 10 mPa·s.

<Inkjet Recording Method>

As for the inkjet recording method preferred in the present invention, energy is provided to the ink for inkjet recording to form an image on a known image-receiving material, that is, plain paper, resin-coated paper such as inkjet exclusive paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like. Incidentally, those described in paragraphs 0093 to 0105 of JP-A-2003-306623 can be applied as the inkjet recording method preferred in the present invention.

In forming an image, a polymer latex compound may be used in combination for the purpose of imparting gloss or water resistance or improving the weather resistance. The timing of imparting the latex compound to an image-receiving material may be before or after imparting a colorant or simultaneously therewith. Accordingly, the site to which the polymer latex compound is added may be in the image-receiving paper or in the ink, or a liquid material of the polymer latex alone may be used. Specifically, the methods described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944) and JPA-2002-080759 (Japanese Patent Application No. 2000-268952) may be preferably used.

The image forming system preferred in the present invention, as one example, includes a first step: a step of imparting a liquid composition for enhancing printability to a recording medium; a second step: a step of imparting an ink composition to the recording medium imparted with the liquid composition; and other steps: other steps are not particularly limited and may be appropriately selected according to the purpose, and examples thereof include a drying/removing step and a heating/fixing step. The drying/removing step is not particularly limited except for drying and removing the ink solvent in the ink composition imparted to the recording medium and may be appropriately selected according to the purpose. The heating/fixing step is not particularly limited except for melting/fixing a latex particle contained in the ink used for the above-described inkjet recording method and may be appropriately selected according to the purpose.

The image forming system preferred in the present invention, as another example, includes a first step: a step of imparting a liquid composition for enhancing printability to an intermediate transfer material; a second step: a step of imparting an ink composition to the intermediate transfer material imparted with the liquid composition; a third step: a step of transferring an ink image formed on the intermediate transfer material, onto a recording medium; and other steps: other steps are not particularly limited and may be appropriately selected according to the purpose, and examples thereof include a drying/removing step and a heating/fixing step.

EXAMPLES

The present invention is described in greater detail below by referring to Examples, but the present invention is not limited to these Examples. In Examples, "parts" indicates parts by weight.

The azo pigment of the present invention can be synthesized in accordance with the synthesis method of Pig.-1 described in Synthesis Example 1 of Pigment below.

Synthesis Example 1

Synthesis of Pigment

Synthesis of Illustrative Compound (Pig.-1):

The synthesis scheme of Illustrative Compound (Pig.-1) is illustrated below.

[Chem. 53]
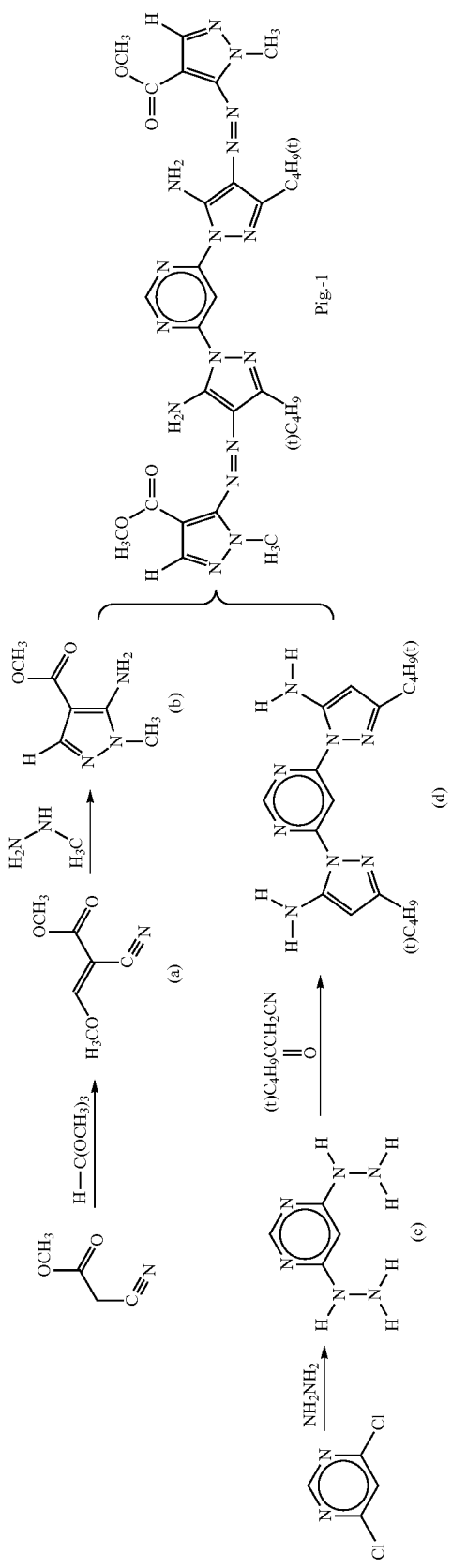

(1) Synthesis of Intermediate (a)

To 29.7 g (0.3 mol) of methyl cyanoacetate, 42.4 g (0.4 mol) of trimethyl orthoformate, 20.4 g (0.2 mol) of acetic acid anhydride and 0.5 g of p-toluenesulfonic acid were added. The resulting mixture was heated at 110° C. (outer temperature) and stirred for 20 hours while distilling off low-boiling-point components produced from the reaction system. The obtained reaction solution was concentrated under reduced pressure and then subjected to silica gel column purification to obtain 14.1 g of Intermediate (a) (yellow powder, yield: 30%). The NMR measurement results of Intermediate (a) obtained are as follows. $^1$H-NMR (300 MHz, CDCl$_3$) 7.96 (s, 1H), 4.15 (s, 3H), 3.81 (s, 3H).

(2) Synthesis of Intermediate (b)

To 7.4 mL (141 mmol) of methylhydrazine, 150 mL of isopropanol was added. The resulting mixture was cooled to 15° C. (inner temperature) and after gradually adding thereto 7.0 g (49.6 mmol) of Intermediate (a), the mixed solution was heated at 50° C. and stirred for 1 hour and 40 minutes. The obtained reaction solution was concentrated under reduced pressure and then subjected to silica gel column purification to obtain 10.5 g of Intermediate (b) (white powder, yield: 50%). The NMR measurement results of Intermediate (b) obtained are as follows. $^1$H-NMR (300 MHz, CDCl$_3$) 7.60 (s, 1H), 4.95 (brs, 2H), 3.80 (s, 3H), 3.60 (s, 3H).

(3) Synthesis of Intermediate (c)

To 130 mL of hydrazine monohydrate, 100 mL of methanol was added. The resulting mixed solution was cooled to 10° C. (inner temperature) and after gradually adding 50.0 g (336 mmol) of 4.6-dichloropyrimidine thereto (inner temperature: 20° C. or less), the mixed solution was heated at 50° C. and stirred for 4 hours and 30 minutes. The crystal precipitated from the reaction solution was collected by filtration, washed by splashing with isopropanol and dried to obtain 43.1 g of Intermediate (c) (white powder, yield: 92%). The NMR measurement results of Intermediate (c) obtained are as follows. $^1$H-NMR (300 MHz, d-DMSO) 7.82 (s, 1H), 7.55 (s, 2H), 5.96 (s, 1H), 4.12 (s, 4H).

(4) Synthesis of Intermediate (d)

To 35.0 g (0.25 mol) of Intermediate (c) and 68.8 g (0.55 mol) of pivaloylacetonitrile, 900 mL of water was added. This mixture was stirred at room temperature and to the resulting suspension, aqueous 1 M hydrochloric acid was added dropwise to adjust the pH to 3. Thereafter, the suspension was heated at 50° C. and stirred for 8 hours and to the obtained reaction solution, an aqueous 8 M potassium hydroxide solution was added dropwise to adjust the pH to 8. Furthermore, aqueous 1 M hydrochloric acid was added dropwise to adjust the pH to 6, and the precipitated crystal was collected by filtration, washed by splashing with isopropanol and then dried to obtain 83.0 g of Intermediate (d) (white powder, yield: 94%). The NMR measurement results of Intermediate (d) obtained are as follows. $^1$H-NMR (300 MHz, d-DMSO) 8.73 (s, 1H), 7.97 (s, 1H), 6.88 (s, 4H), 5.35 (s, 2H), 1.22 (s, 18H).

(5) Synthesis of Illustrative Compound (Pig.-1)

To 4.1 mL of concentrated sulfuric acid, 18.5 mL of acetic acid was added. The resulting mixture was stirred while ice cooling and thereto, 3.85 g (12.1 mmol) of 40% nitrosylsulfuric acid was added dropwise. To this mixed solution, 1.71 g (11.0 mmol) of Intermediate (b) was gradually added (inner temperature: 0° C. or less), and the obtained solution was stirred at 0° C. for 2 hours. Thereafter, 150 mg of urea was added to the reaction solution, and the mixed solution was further stirred at 0° C. for 15 minutes to prepare Diazo Solution A.

Diazo Solution A was gradually added dropwise to a mixed solution obtained by adding 50 mL of methanol to Intermediate (d), dissolving it under heating and then stirring the solution while ice cooling (inner temperature: 10° C. or less). This reaction solution was stirred at room temperature for 2 hours, and the precipitated crystal was collected by filtration and washed by splashing with methanol to obtain a crude crystal of Illustrative Compound (Pig.-1). Furthermore, water was added to the crude crystal and after stirring, the resulting suspension was adjusted to a pH of 7 with an aqueous sodium hydroxide solution. Subsequently, 20 mL of dimethylacetamide was added, followed by stirring at 80° C. for 2 hours, and the precipitated crystal was collected by filtration and suspension-washed with methanol. The obtained crystal was collected by filtration and dried to obtain 2.0 g of Illustrative Compound (Pig.-1) (yellow powder, yield: 79%).

Synthesis Example 2

Synthesis of Vinyl Polymer

The components in the following monomer composition were mixed to give a total amount of 100 parts by mass, 1 part by mass of 2,2'-azobis(2,4,-dimethylvaleronitrile) was further added as a polymerization initiator, and nitrogen gas purging was thoroughly performed, whereby a synthesis mixed solution was obtained.

| | |
|---|---|
| Phenoxyethyl methacrylate | 55 parts by mass |
| Methyl methacrylate | 35 parts by mass |
| Methacrylic acid | 10 parts by mass |
| 2-Mercaptoethanol | 0.1 parts by mass |

Subsequently, while stirring 100 parts by mass of methyl ethyl ketone in a nitrogen atmosphere, the temperature was raised to 75° C. The synthesis mixed solution obtained above was added dropwise with stirring at 75° C. over 3 hours. The reaction was further allowed to proceed at 75° C. for 5 hours under stirring. Thereafter, the reaction synthesis product was naturally cooled to 25° C. and diluted by adding methyl ethyl ketone to have a solid content of 50%, whereby a vinyl polymer solution having a mass average molecular weight of 41,000 was obtained.

Example 1

An aqueous 5 mol/L sodium hydroxide solution was added for neutralization to 10 parts by mass of the obtained 50% vinyl polymer solution. Here, the aqueous solution was added in an alkali amount large enough to completely neutralize a methacrylic acid or acrylic acid of the vinyl monomer. 10 Parts by mass of Pigment Illustrative Compound (Pig.-1) of the present invention was added, and the mixture was kneaded by a roll mill for 2 to 8 hours as needed. The kneaded material was dispersed in 100 parts by mass of ion-exchanged water and from the obtained dispersion, the organic solvent was completely removed at 55° C. under reduced pressure. Furthermore, the dispersion was concentrated by removing water to obtain a water dispersion of pigment-containing vinyl polymer particles, having a solid content concentration of 15 mass %.

The vinyl polymer of the present invention was synthesized by the same method as in Synthesis Example above according to the composition shown in Table 1.

(Preparation of Self-Dispersing Polymer Fine Particle)

Into a 2 liter-volume three-neck flask equipped with a stirrer, a thermometer, a reflux condenser and a nitrogen gas inlet tube, 350.0 g of methyl ethyl ketone was charged. The temperature was raised to 75° C. and while keeping the temperature in the reaction vessel at 75° C., a mixed solution containing 162.0 g of phenoxyethyl acrylate, 180.0 g of methyl methacrylate, 18.0 g of acrylic acid, 70 g of methyl ethyl ketone and 1.44 g of "V-601" (produced by Wako Pure Chemical Industries, Ltd.) was added dropwise at a constant rate so that the dropwise addition could be completed in 2 hours. After the completion of dropwise addition, a solution containing 0.72 g of "V-601" and 36.0 g of methyl ethyl ketone was added, and the resulting mixed solution was stirred at 75° C. for 2 hours. Furthermore, a solution containing 0.72 g of "V-601" and 36.0 g of isopropanol was added and after stirring at 75° C. for 2 hours, the temperature was raised to 85° C. and the stirring was further continued for 2 hours. The mass average molecular weight (Mw) of the obtained copolymer was 64,000 (calculated in terms of polystyrene by gel permeation chromatography (GPC); columns used: TSKgel SuperHZM-H, TSKgel SuperHZ4000 and TSKgel SuperHZ200 (manufactured by Tosoh Corporation)), and the acid value was 38.9 (mgKOH/g).

Next, 668.3 g of the polymer solution was weighed, 388.3 g of isopropanol and 145.7 ml of an aqueous 1 mol/L NaOH solution were added thereto, and the temperature in the reaction vessel was raised to 80° C. Subsequently, 720.1 g of distilled water was added dropwise at a rate of 20 ml/min to form a water dispersion. After keeping the temperature in the reaction vessel at 80° C. for 2 hours, at 85° C. for 2 hours and at 90° C. for 2 hours under atmospheric pressure, the pressure in the reaction vessel was reduced, and 913.7 g in total of isopropanol, methyl ethyl ketone and distilled water were distilled off to obtain a water dispersion (emulsion) of Self-Dispersing Polymer Fine Particle (B-01) having a solid content concentration of 28.0%.

| | |
|---|---|
| Water dispersion of pigment-containing vinyl polymer particle above | 25 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 28 parts by mass |

These components were mixed to obtain an ink composition.

The pH of the ink composition was measured by a pH meter, WM-50EG, manufactured by DKK-TOA Corporation, as a result, the pH was 8.5.

(Evaluation of Ejection Accuracy)

The pigment ink composition shown in Table 1 was put in a PET-made vessel and after airtight closing, left for aging in an environment of 58° C. for 4 weeks. Using DMP-2831 Printer manufactured by Fujifilm Dimatix Inc. as the inkjet recording apparatus, 10-cm lines were printed with an ink droplet amount of 2 pL at an ejection frequency of 20 kHz in nozzle array direction×delivery direction of 16×1200 dpi. As the recording medium, Color Photofinishing Pro produced by Fujifilm Corp. was used. The distance between lines at a position 5 cm apart from the hitting initiation part on the printed sample was measured by Dot Analyzer DA-6000 manufactured by Oji Scientific Instruments, and the standard deviation thereof was calculated and used for the evaluation of the accuracy in ejection direction.

A: The standard deviation is less than 3 µm.
B: The standard deviation is from 3 µm to less than 4 µm.
C: The standard deviation is from 4 µm to less than 4.55 µm.
D: The standard deviation is from 4.5 µm to less than 5 µm.
E: The standard deviation is 5 µm or more.

TABLE 1

Example 1

| Test No. | Pigment | Hydrophobic Structural Unit | Composition of Vinyl Polymer (mass %) | | | Mass Average Molecular Weight | Amount Added of Dispersant Based on Pigment | Ejection Accuracy | Remarks |
|---|---|---|---|---|---|---|---|---|---|
| | | | Methacrylic Acid | Methyl Methacrylate | | | | | |
| Test 101 | Illustrative Compound (Pig. 1) | phenoxyethyl methacrylate = 10 | 10 | 80 | | 42000 | 50% | B | Invention |
| Test 102 | Illustrative Compound (Pig. 1) | phenoxyethyl methacrylate = 25 | 10 | 65 | | 46000 | 50% | B | Invention |
| Test 103 | Illustrative Compound (Pig. 1) | phenoxyethyl methacrylate = 35 | 10 | 55 | | 45000 | 50% | A | Invention |
| Test 104 | Illustrative Compound (Pig. 1) | phenoxyethyl methacrylate = 55 | 10 | 35 | | 41000 | 50% | A | Invention |
| Test 105 | Illustrative Compound (Pig. 1) | phenoxyethyl methacrylate = 75 | 10 | 15 | | 47000 | 50% | B | Invention |
| Test 106 | Illustrative Compound (Pig. 1) | benzyl methacrylate = 10 | 10 | 80 | | 44000 | 50% | B | Invention |
| Test 107 | Illustrative Compound (Pig. 1) | benzyl methacrylate = 25 | 10 | 65 | | 48000 | 50% | B | Invention |
| Test 108 | Illustrative Compound (Pig. 1) | benzyl methacrylate = 35 | 10 | 55 | | 42000 | 50% | B | Invention |
| Test 109 | Illustrative Compound (Pig. 1) | benzyl methacrylate = 55 | 10 | 35 | | 41000 | 50% | B | Invention |
| Test 110 | Illustrative Compound (Pig. 1) | benzyl methacrylate = 75 | 10 | 15 | | 45000 | 50% | B | Invention |
| Test 111 | Illustrative Compound (Pig. 1) | styrene = 10 | 10 | 80 | | 43000 | 50% | X | Comparative Example |
| Test 112 | Illustrative Compound (Pig. 1) | styrene = 25 | 10 | 65 | | 44000 | 50% | Δ | Comparative Example |
| Test 113 | Illustrative Compound (Pig. 1) | styrene = 35 | 10 | 55 | | 49000 | 50% | X | Comparative Example |
| Test 114 | Illustrative Compound (Pig. 1) | styrene = 55 | 10 | 35 | | 42000 | 50% | X | Comparative Example |

TABLE 1-continued

Example 1

| Test No. | Pigment | Composition of Vinyl Polymer (mass %) | | | Mass Average Molecular Weight | Amount Added of Dispersant Based on Pigment | Ejection Accuracy | Remarks |
|---|---|---|---|---|---|---|---|---|
| | | Hydrophobic Structural Unit | Methacrylic Acid | Methyl Methacrylate | | | | |
| Test 115 | Illustrative Compound (Pig. 1) | styrene = 75 | 10 | 15 | 41000 | 50% | X | Comparative Example |
| Test 116 | Illustrative Compound (Pig. 1) | phenoxyethyl methacrylate = 55 | 8 | 37 | 46000 | 50% | A | Invention |
| Test 117 | Illustrative Compound (Pig. 1) | phenoxyethyl methacrylate = 55 | 15 | 30 | 45000 | 50% | A | Invention |
| Test 118 | Illustrative Compound (Pig. 1) | phenoxyethyl methacrylate = 55 | 17 | 28 | 49000 | 50% | B | Invention |
| Test 119 | Illustrative Compound (Pig. 1) | phenoxyethyl methacrylate = 55 | 30 | 15 | 47000 | 50% | B | Invention |
| Test 120 | Illustrative Compound (Pig. 1) | phenoxyethyl methacrylate = 45 | 40 | 15 | 44000 | 50% | B | Invention |
| Test 121 | Illustrative Compound (Pig. 1) | phenoxyethyl methacrylate = 55 | 10 | 35 | 41000 | 20% | B | Invention |
| Test 122 | Illustrative Compound (Pig. 1) | phenoxyethyl methacrylate = 55 | 10 | 35 | 41000 | 30% | A | Invention |
| Test 123 | Illustrative Compound (Pig. 1) | phenoxyethyl methacrylate = 55 | 10 | 35 | 41000 | 60% | A | Invention |
| Test 124 | Illustrative Compound (Pig. 1) | phenoxyethyl methacrylate = 55 | 10 | 35 | 41000 | 70% | B | Invention |
| Test 125 | Illustrative Compound (Pig. 1) | phenoxyethyl methacrylate = 55 | 10 | 35 | 25000 | 50% | B | Invention |
| Test 126 | Illustrative Compound (Pig. 1) | phenoxyethyl methacrylate = 55 | 10 | 35 | 30000 | 50% | A | Invention |
| Test 127 | Illustrative Compound (Pig. 1) | phenoxyethyl methacrylate = 55 | 10 | 35 | 80000 | 50% | A | Invention |
| Test 128 | Illustrative Compound (Pig. 1) | phenoxyethyl methacrylate = 55 | 10 | 35 | 85000 | 50% | B | Invention |
| Test 129 | Illustrative Compound (Pig. 2) | phenoxyethyl methacrylate = 55 | 10 | 35 | 41000 | 50% | A | Invention |
| Test 130 | Illustrative Compound (Pig. 3) | phenoxyethyl methacrylate = 55 | 10 | 35 | 41000 | 50% | A | Invention |
| Test 131 | Illustrative Compound (Pig. 4) | phenoxyethyl methacrylate = 55 | 10 | 35 | 41000 | 50% | A | Invention |
| Test 132 | Illustrative Compound (Pig. 6) | phenoxyethyl methacrylate = 55 | 10 | 35 | 41000 | 50% | A | Invention |
| Test 133 | Illustrative Compound (Pig. 9) | phenoxyethyl methacrylate = 55 | 10 | 35 | 41000 | 50% | A | Invention |
| Test 134 | Illustrative Compound (Pig. 10) | phenoxyethyl methacrylate = 55 | 10 | 35 | 41000 | 50% | A | Invention |
| Test 135 | Illustrative Compound (Pig. 11) | phenoxyethyl methacrylate = 55 | 10 | 35 | 41000 | 50% | A | Invention |
| Test 136 | Illustrative Compound (Pig. 12) | phenoxyethyl methacrylate = 55 | 10 | 35 | 41000 | 50% | A | Invention |
| Test 137 | Illustrative Compound (Pig. 15) | phenoxyethyl methacrylate = 55 | 10 | 35 | 41000 | 50% | A | Invention |
| Test 138 | Illustrative Compound (Pig. 18) | phenoxyethyl methacrylate = 55 | 10 | 35 | 41000 | 50% | A | Invention |
| Test 139 | Illustrative Compound (Pig. 19) | phenoxyethyl methacrylate = 55 | 10 | 35 | 41000 | 50% | A | Invention |
| Test 140 | Illustrative Compound (Pig. 21) | phenoxyethyl methacrylate = 55 | 10 | 35 | 41000 | 50% | A | Invention |
| Test 141 | Illustrative Compound (Pig. 24) | phenoxyethyl methacrylate = 55 | 10 | 35 | 41000 | 50% | A | Invention |
| Test 142 | Illustrative Compound (Pig. 25) | phenoxyethyl methacrylate = 55 | 10 | 35 | 41000 | 50% | A | Invention |
| Test 143 | Illustrative Compound (Pig. 34) | phenoxyethyl methacrylate = 55 | 10 | 35 | 41000 | 50% | A | Invention |
| Test 144 | Illustrative Compound (Pig. 35) | phenoxyethyl methacrylate = 55 | 10 | 35 | 41000 | 50% | A | Invention |
| Test 145 | Illustrative Compound (Pig. 36) | phenoxyethyl methacrylate = 55 | 10 | 35 | 41000 | 50% | A | Invention |
| Test 146 | Illustrative Compound (Pig. 37) | phenoxyethyl methacrylate = 55 | 10 | 35 | 41000 | 50% | A | Invention |
| Test 147 | Illustrative Compound (Pig. 42) | phenoxyethyl methacrylate = 55 | 10 | 35 | 41000 | 50% | B | Invention |
| Test 148 | Illustrative Compound (Pig. 43) | phenoxyethyl methacrylate = 55 | 10 | 35 | 41000 | 50% | B | Invention |
| Test 149 | Illustrative Compound (Pig. 45) | phenoxyethyl methacrylate = 55 | 10 | 35 | 41000 | 50% | B | Invention |
| Test 150 | Illustrative Compound (Pig. 46) | phenoxyethyl methacrylate = 55 | 10 | 35 | 41000 | 50% | B | Invention |
| Test 151 | Illustrative Compound (Pig. 47) | phenoxyethyl methacrylate = 55 | 10 | 35 | 41000 | 50% | B | Invention |
| Test 152 | Illustrative Compound (Pig. 50) | phenoxyethyl methacrylate = 55 | 10 | 35 | 41000 | 50% | B | Invention |
| Test 153 | Illustrative Compound (Pig. 51) | phenoxyethyl methacrylate = 55 | 10 | 35 | 41000 | 50% | B | Invention |
| Test 154 | Illustrative Compound (Pig. 56) | phenoxyethyl methacrylate = 55 | 10 | 35 | 41000 | 50% | B | Invention |
| Test 155 | Illustrative Compound (Pig. 57) | phenoxyethyl methacrylate = 55 | 10 | 35 | 41000 | 50% | B | Invention |
| Test 156 | Illustrative Compound (Pig. 60) | phenoxyethyl methacrylate = 55 | 10 | 35 | 41000 | 50% | B | Invention |
| Test 157 | Illustrative Compound (Pig. 69) | phenoxyethyl methacrylate = 55 | 10 | 35 | 41000 | 50% | C | Invention |
| Test 158 | Illustrative Compound (Pig. 70) | phenoxyethyl methacrylate = 55 | 10 | 35 | 41000 | 50% | C | Invention |
| Test 159 | C.I. Pigment Yellow 74 | phenoxyethyl methacrylate = 10 | 10 | 80 | 42000 | 50% | E | Comparative Example |
| Test 160 | C.I. Pigment Yellow 74 | phenoxyethyl methacrylate = 25 | 10 | 65 | 46000 | 50% | E | Comparative Example |
| Test 161 | C.I. Pigment Yellow 74 | phenoxyethyl methacrylate = 35 | 10 | 55 | 45000 | 50% | D | Comparative Example |
| Test 162 | C.I. Pigment Yellow 74 | phenoxyethyl methacrylate = 55 | 10 | 35 | 41000 | 50% | E | Comparative Example |
| Test 163 | C.I. Pigment Yellow 74 | phenoxyethyl methacrylate = 75 | 10 | 15 | 47000 | 50% | E | Comparative Example |

It is seen from Tests 101 to 105 that when Illustrative Compound (Pig.-1) of the present invention was used as the pigment and phenoxyethyl methacrylate was used for the hydrophobic structural unit of the vinyl polymer, good results were obtained particularly in the evaluation of ink ejection accuracy even after storage under high temperature conditions.

Also, it is seen from Tests 106 to 110 that better results were obtained when Illustrative Compound (Pig.-1) of the present invention was used as the pigment and benzyl methacrylate was used for the hydrophobic structural unit of the vinyl polymer.

Also, it is seen from Tests 111 to 115 that the ejection accuracy was worsened when Illustrative Compound (Pig.-1) of the present invention was used as the pigment and styrene was used for the hydrophobic structural unit of the vinyl polymer.

Also, it is seen from Tests 104 and 116 to 120 that particularly good results were obtained when Illustrative Compound (Pig.-1) of the present invention was used as the pigment and the ratio of the hydrophilic structural unit in the vinyl polymer was from 8 to 15 mass %.

Also, it is seen from Tests 104 and 121 to 124 that particularly good results were obtained when Illustrative Compound (Pig.-1) of the present invention was used as the pigment and the amount added of the vinyl polymer was from 30 to 60% based on the pigment.

Also, it is seen from Tests 104 and 125 to 128 that particularly good results were obtained when Illustrative Compound (Pig.-1) of the present invention was used as the pigment and the mass average molecular weight of the vinyl polymer was from 30,000 to 80,000.

Also, it is seen from the results of Tests 104, 129 to 146, 154 and 155 and Tests 147 to 153, 156 and 157 that good results were obtained when a pigment of formula (1) where Q is formula (a), such as Illustrative Compounds (Pig.-1), (Pig.-57) and (Pig.-60), of the present invention was used as the pigment.

Also, it is seen from the results of Tests 104 and 129 to 146 and Tests 147 to 153 and the results of Tests 154 and 155 and Tests 156 and 157 that good results were obtained when n=2 in formula (2), the pigment of formula (3) where n=2 is preferred, and particularly good results were obtained in the case of a bis-type azo pigment of formula (4).

Also, it is seen from Tests 158 to 163 that the ejection accuracy was worsened when C.I. Pigment Yellow 74 was used as the pigment.

Comparative Example 1

A liquid dispersion was produced by using C.I. Pigment Yellow 74 Pigment or Pigment Illustrative Compound (Pig.-1) of the present invention as the pigment and synthesizing a vinyl polymer in accordance with Synthesis Example described in paragraphs [0053] to [0059] of JP-A-2000-239594, and an aqueous ink containing the liquid dispersion was prepared in accordance with the method of Example 1 in the present invention.

The ink prepared above was evaluated for the ejection accuracy by the method in Example 1 of the present invention. The results are shown in Table 2.

TABLE 2

| Test No. | Pigment | Dispersant | Amount Added of Dispersant Based on Pigment | Ejection Accuracy | Remarks 1 | Remarks 2 |
| --- | --- | --- | --- | --- | --- | --- |
| Test 201 | C.I. Pigment Yellow 74 | Dispersant 1 | 50% | X | Comparative Example | Example 1 of JP-A-2000-239594 |
| Test 202 | Illustrative Compound (Pig. 1) | Dispersant 2 | 50% | X | Comparative Example | Example 1 of JP-A-2000-239594 |

Dispersant 1:

A copolymer of the following monomers.

| n-Butyl methacrylate | 35 mass % |
| --- | --- |
| n-Butyl acrylate | 10 mass % |
| 2-Hydroxyethyl methacrylate | 15 mass % |
| Methacrylic acid | 20 mass % |
| Styrene | 20 mass % |

Dispersant 2:

A copolymer of the following monomers.

| n-Butyl methacrylate | 35 mass % |
| --- | --- |
| n-Butyl acrylate | 10 mass % |
| 2-Hydroxyethyl methacrylate | 15 mass % |
| Methacrylic acid | 20 mass % |
| Styrene | 20 mass % |

As seen from Tests 201 and 202, good ejection accuracy could not be obtained in the case of an aqueous liquid dispersion described in JP-A-2000-239594.

Example 2

Aqueous inks for inkjet recording were produced in the same manner as in Tests 106 to 110 except that the pigment compound was produced by the same method as in Synthesis Example 1 by changing the benzyl acrylate for the hydrophobic structural unit of the high-molecular polymer in Tests 106 to 110 of Example 1 to phenoxyethyl acrylate or benzyl acrylate according to the formulation shown in Table 3, and evaluated for the ejection accuracy in the same manner as in Example 1. As shown in Table 3, good performance equal to that in Tests 106 to 110 was exhibited.

Aqueous inks for inkjet recording were produced in the same manner as in Test 109 except that methacrylic acid for the hydrophilic structural unit in Test 109 of Example 1 was changed to acrylic acid, and evaluated for the ejection accuracy in the same manner as in Example 1. As shown in Table 3, good performance equal to that in Test 109 was exhibited.

Aqueous inks for inkjet recording were produced in the same manner as in Test 109 except that methyl methacrylate for the structural unit (c) in Test 109 of Example 1 was changed to methyl acrylate, ethyl acrylate, ethyl methacrylate, butyl methacrylate, 2-ethylhexyl methacrylate, cyclohexyl methacrylate, cyclohexyl acrylate or styrene according to the formulation shown in Table 2, and evaluated for the ejection accuracy in the same manner as in Example 1. As shown in Table 3, good performance equal to that in Test 109 was exhibited.

TABLE 3

Example 2

| | | Composition of Vinyl Polymer (mass %) | | | Mass Average Molecular Weight | Amount Added of Dispersant Based on Pigment | Ejection Accuracy | Remarks |
|---|---|---|---|---|---|---|---|---|
| Test No. | Pigment | Hydrophobic Structural Unit | Methacrylic Acid | Methyl Methacrylate | | | | |
| Test 301 | Illustrative Compound (Pig. 1) | phenoxyethyl acrylate = 10 | 10 | 80 | 43000 | 50% | ○ | invention |
| Test 302 | Illustrative Compound (Pig. 1) | phenoxyethyl acrylate = 25 | 10 | 65 | 46000 | 50% | ○ | invention |
| Test 303 | Illustrative Compound (Pig. 1) | phenoxyethyl acrylate = 35 | 10 | 55 | 44000 | 50% | ○ | invention |
| Test 304 | Illustrative Compound (Pig. 1) | phenoxyethyl acrylate = 55 | 10 | 35 | 46000 | 50% | ○ | invention |
| Test 305 | Illustrative Compound (Pig. 1) | phenoxyethyl acrylate = 75 | 10 | 15 | 43000 | 50% | ○ | invention |
| Test 306 | Illustrative Compound (Pig. 1) | benzyl acrylate = 10 | 10 | 80 | 47000 | 50% | ○ | invention |
| Test 307 | Illustrative Compound (Pig. 1) | benzyl acrylate = 25 | 10 | 65 | 43000 | 50% | ○ | invention |
| Test 308 | Illustrative Compound (Pig. 1) | benzyl acrylate = 35 | 10 | 55 | 46000 | 50% | ○ | invention |
| Test 309 | Illustrative Compound (Pig. 1) | benzyl acrylate = 55 | 10 | 35 | 44000 | 50% | ○ | invention |
| Test 310 | Illustrative Compound (Pig. 1) | benzyl acrylate = 75 | 10 | 15 | 42000 | 50% | ○ | invention |

Example 3

Ejection accuracy was evaluated in the same manner as in Example 1 by using the pigment and high-molecular polymer shown in Table 4 except that in Examples 1 and 2, the aqueous ink for inkjet recording was put in a high-density polyethylene vessel and after airtight closing, stored at room temperature for 4 months instead of the aqueous ink being put in a PET-made vessel and after airtight closing, stored in an environment of 58° C. for 4 weeks. As a result, it could be confirmed that as shown in Table 4, in the case of the aqueous ink for inkjet recording of the present invention, good performance equal to that in Examples 1 and 2 can be obtained.

TABLE 4

Example 3

| | | Composition of Vinyl Polymer (mass %) | | | Mass Average Molecular Weight | Amount Added of Dispersant Based on Pigment | Ejection Accuracy | Remarks |
|---|---|---|---|---|---|---|---|---|
| Test No. | Pigment | Hydrophobic Structural Unit | Methacrylic Acid | Methyl Methacrylate | | | | |
| Test 401 | Illustrative Compound (Pig. 1) | phenoxyethyl methacrylate = 10 | 10 | 80 | 42000 | 50% | ○ | Invention |
| Test 402 | Illustrative Compound (Pig. 1) | phenoxyethyl methacrylate = 25 | 10 | 65 | 46000 | 50% | ⊙ | Invention |
| Test 403 | Illustrative Compound (Pig. 1) | phenoxyethyl methacrylate = 35 | 10 | 55 | 45000 | 50% | ⊙ | Invention |
| Test 404 | Illustrative Compound (Pig. 1) | phenoxyethyl methacrylate = 55 | 10 | 35 | 41000 | 50% | ⊙ | Invention |
| Test 405 | Illustrative Compound (Pig. 1) | phenoxyethyl methacrylate = 75 | 10 | 15 | 47000 | 50% | ○ | Invention |
| Test 406 | Illustrative Compound (Pig. 1) | benzyl methacrylate = 10 | 10 | 80 | 44000 | 50% | ○ | Invention |
| Test 407 | Illustrative Compound (Pig. 1) | benzyl methacrylate = 25 | 10 | 65 | 48000 | 50% | ○ | Invention |
| Test 408 | Illustrative Compound (Pig. 1) | benzyl methacrylate = 35 | 10 | 55 | 42000 | 50% | ⊙ | Invention |
| Test 409 | Illustrative Compound (Pig. 1) | benzyl methacrylate = 55 | 10 | 35 | 41000 | 50% | ○ | Invention |
| Test 410 | Illustrative Compound (Pig. 1) | benzyl methacrylate = 75 | 10 | 15 | 45000 | 50% | ○ | Invention |

TABLE 4-continued

Example 3

| Test No. | Pigment | Composition of Vinyl Polymer (mass %) | | | Mass Average Molecular Weight | Amount Added of Dispersant Based on Pigment | Ejection Accuracy | Remarks |
|---|---|---|---|---|---|---|---|---|
| | | Hydrophobic Structural Unit | Methacrylic Acid | Methyl Methacrylate | | | | |
| Test 411 | Illustrative Compound (Pig. 1) | styrene = 10 | 10 | 80 | 43000 | 50% | X | Comparative Example |
| Test 412 | Illustrative Compound (Pig. 1) | styrene = 25 | 10 | 65 | 44000 | 50% | Δ | Comparative Example |
| Test 413 | Illustrative Compound (Pig. 1) | styrene = 35 | 10 | 55 | 49000 | 50% | Δ | Comparative Example |
| Test 414 | Illustrative Compound (Pig. 1) | styrene = 55 | 10 | 35 | 42000 | 50% | Δ | Comparative Example |
| Test 415 | Illustrative Compound (Pig. 1) | styrene = 75 | 10 | 15 | 41000 | 50% | X | Comparative Example |
| Test 416 | Illustrative Compound (Pig. 1) | phenoxyethyl methacrylate = 55 | 8 | 37 | 46000 | 50% | ⊚ | Invention |
| Test 417 | Illustrative Compound (Pig. 1) | phenoxyethyl methacrylate = 55 | 15 | 30 | 45000 | 50% | ⊚ | Invention |
| Test 418 | Illustrative Compound (Pig. 1) | phenoxyethyl methacrylate = 55 | 17 | 28 | 49000 | 50% | ○ | Invention |
| Test 419 | Illustrative Compound (Pig. 1) | phenoxyethyl methacrylate = 55 | 30 | 15 | 47000 | 50% | ○ | Invention |
| Test 420 | Illustrative Compound (Pig. 1) | phenoxyethyl methacrylate = 45 | 40 | 15 | 44000 | 50% | ○ | Invention |
| Test 421 | Illustrative Compound (Pig. 1) | phenoxyethyl methacrylate = 55 | 10 | 35 | 41000 | 20% | ○ | Invention |
| Test 422 | Illustrative Compound (Pig. 1) | phenoxyethyl methacrylate = 55 | 10 | 35 | 41000 | 30% | ⊚ | Invention |
| Test 423 | Illustrative Compound (Pig. 1) | phenoxyethyl methacrylate = 55 | 10 | 35 | 41000 | 60% | ⊚ | Invention |
| Test 424 | Illustrative Compound (Pig. 1) | phenoxyethyl methacrylate = 55 | 10 | 35 | 41000 | 70% | ○ | Invention |
| Test 425 | Illustrative Compound (Pig. 1) | phenoxyethyl methacrylate = 55 | 10 | 35 | 25000 | 50% | ○ | Invention |
| Test 426 | Illustrative Compound (Pig. 1) | phenoxyethyl methacrylate = 55 | 10 | 35 | 30000 | 50% | ⊚ | Invention |
| Test 427 | Illustrative Compound (Pig. 1) | phenoxyethyl methacrylate = 55 | 10 | 35 | 80000 | 50% | ⊚ | Invention |
| Test 428 | Illustrative Compound (Pig. 1) | phenoxyethyl methacrylate = 55 | 10 | 35 | 85000 | 50% | ○ | Invention |
| Test 429 | Illustrative Compound (Pig. 18) | phenoxyethyl methacrylate = 55 | 10 | 35 | 41000 | 50% | ⊚ | Invention |
| Test 430 | Illustrative Compound (Pig. 57) | phenoxyethyl methacrylate = 55 | 10 | 35 | 41000 | 50% | ○ | Invention |
| Test 431 | Illustrative Compound (Pig. 60) | phenoxyethyl methacrylate = 55 | 10 | 35 | 41000 | 50% | ○ | Invention |
| Test 432 | C.I. pigment yellow 74 | phenoxyethyl methacrylate = 10 | 10 | 80 | 42000 | 50% | X | Comparative Example |
| Test 433 | C.I. pigment yellow 74 | phenoxyethyl methacrylate = 25 | 10 | 65 | 46000 | 50% | Δ | Comparative Example |
| Test 434 | C.I. pigment yellow 74 | phenoxyethyl methacrylate = 35 | 10 | 55 | 45000 | 50% | Δ | Comparative Example |
| Test 435 | C.I. pigment yellow 74 | phenoxyethyl methacrylate = 55 | 10 | 35 | 41000 | 50% | Δ | Comparative Example |
| Test 436 | C.I. pigment yellow 74 | phenoxyethyl methacrylate = 75 | 10 | 15 | 47000 | 50% | X | Comparative Example |
| Test 437 | Illustrative Compound (Pig. 1) | phenoxyethyl acrylate = 10 | 10 | 80 | 43000 | 50% | ○ | Invention |
| Test 438 | Illustrative Compound (Pig. 1) | phenoxyethyl acrylate = 25 | 10 | 65 | 46000 | 50% | ⊚ | Invention |
| Test 439 | Illustrative Compound (Pig. 1) | phenoxyethyl acrylate = 35 | 10 | 55 | 44000 | 50% | ○ | Invention |
| Test 440 | Illustrative Compound (Pig. 1) | phenoxyethyl acrylate = 55 | 10 | 35 | 46000 | 50% | ○ | Invention |
| Test 441 | Illustrative Compound (Pig. 1) | phenoxyethyl acrylate = 75 | 10 | 15 | 43000 | 50% | ○ | Invention |
| Test 442 | Illustrative Compound (Pig. 1) | benzyl acrylate = 10 | 10 | 80 | 47000 | 50% | ○ | Invention |
| Test 443 | Illustrative Compound (Pig. 1) | benzyl acrylate = 25 | 10 | 65 | 43000 | 50% | ○ | Invention |
| Test 444 | Illustrative Compound (Pig. 1) | benzyl acrylate = 35 | 10 | 55 | 46000 | 50% | ⊚ | Invention |
| Test 445 | Illustrative Compound (Pig. 1) | benzyl acrylate = 55 | 10 | 35 | 44000 | 50% | ○ | Invention |
| Test 446 | Illustrative Compound (Pig. 1) | benzyl acrylate = 75 | 10 | 15 | 42000 | 50% | ○ | Invention |

Example 4

Aqueous inks for inkjet recording were produced in the same manner as in Examples 1 to 3 by using the pigment and high-molecular polymer shown in Table 5 except that in Examples 1 to 3, in the preparation of aqueous ink, the water dispersion of Self-Dispersing Polymer Fine Particle (B-01) was replaced by ion-exchanged water, and evaluated for the ejection accuracy in the same manner as in Example 1. As shown in Table 5, in the case of the aqueous ink for inkjet recording of the present invention, good performance equal to that in Examples 1 to 3 was exhibited.

TABLE 5

Example 4 (without Self-Dispersing Polymer Fine Particle (B01) of Example 1)

| Test No. | Pigment | Composition of Vinyl Polymer (mass %) | | | Mass Average Molecular Weight | Amount Added of Dispersant Based on Pigment | Ejection Accuracy | Remarks |
|---|---|---|---|---|---|---|---|---|
| | | Hydrophobic Structural Unit | Methacrylic Acid | Methyl Methacrylate | | | | |
| Test 501 | Illustrative Compound (Pig. 1) | phenoxyethyl methacrylate = 10 | 10 | 80 | 42000 | 50% | ○ | Invention |
| Test 502 | Illustrative Compound (Pig. 1) | phenoxyethyl methacrylate = 25 | 10 | 65 | 46000 | 50% | ⊚ | Invention |

TABLE 5-continued

Example 4 (without Self-Dispersing Polymer Fine Particle (B01) of Example 1)

| Test No. | Pigment | Composition of Vinyl Polymer (mass %) | | | Mass Average Molecular Weight | Amount Added of Dispersant Based on Pigment | Ejection Accuracy | Remarks |
| --- | --- | --- | --- | --- | --- | --- | --- | --- |
| | | Hydrophobic Structural Unit | Methacrylic Acid | Methyl Methacrylate | | | | |
| Test 503 | Illustrative Compound (Pig. 1) | phenoxyethyl methacrylate = 35 | 10 | 55 | 45000 | 50% | ⊚ | Invention |
| Test 504 | Illustrative Compound (Pig. 1) | phenoxyethyl methacrylate = 55 | 10 | 35 | 41000 | 50% | ⊚ | Invention |
| Test 505 | Illustrative Compound (Pig. 1) | phenoxyethyl methacrylate = 75 | 10 | 15 | 47000 | 50% | ○ | Invention |
| Test 506 | Illustrative Compound (Pig. 1) | benzyl methacrylate = 10 | 10 | 80 | 44000 | 50% | ○ | Invention |
| Test 507 | Illustrative Compound (Pig. 1) | benzyl methacrylate = 25 | 10 | 65 | 48000 | ○ | ○ | Invention |
| Test 508 | Illustrative Compound (Pig. 1) | benzyl methacrylate = 35 | 10 | 55 | 42000 | 50% | ⊚ | Invention |
| Test 509 | Illustrative Compound (Pig. 1) | benzyl methacrylate = 55 | 10 | 35 | 41000 | 50% | ○ | Invention |
| Test 510 | Illustrative Compound (Pig. 1) | benzyl methacrylate = 75 | 10 | 15 | 45000 | 50% | ○ | Invention |
| Test 511 | Illustrative Compound (Pig. 1) | styrene = 10 | 10 | 80 | 43000 | 50% | X | Comparative Example |
| Test 512 | Illustrative Compound (Pig. 1) | styrene = 25 | 10 | 65 | 44000 | 50% | Δ | Comparative Example |
| Test 513 | Illustrative Compound (Pig. 1) | styrene = 35 | 10 | 55 | 49000 | 50% | Δ | Comparative Example |
| Test 514 | Illustrative Compound (Pig. 1) | styrene = 55 | 10 | 35 | 42000 | 50% | Δ | Comparative Example |
| Test 515 | Illustrative Compound (Pig. 1) | styrene = 75 | 10 | 15 | 41000 | 50% | X | Comparative Example |
| Test 516 | Illustrative Compound (Pig. 1) | phenoxyethyl methacrylate = 55 | 8 | 37 | 46000 | 50% | ⊚ | Invention |
| Test 517 | Illustrative Compound (Pig. 1) | phenoxyethyl methacrylate = 55 | 15 | 30 | 45000 | 50% | ⊚ | Invention |
| Test 518 | Illustrative Compound (Pig. 1) | phenoxyethyl methacrylate = 55 | 17 | 28 | 49000 | 50% | ○ | Invention |
| Test 519 | Illustrative Compound (Pig. 1) | phenoxyethyl methacrylate = 55 | 30 | 15 | 47000 | 50% | ○ | Invention |
| Test 520 | Illustrative Compound (Pig. 1) | phenoxyethyl methacrylate = 45 | 40 | 15 | 44000 | 50% | ○ | Invention |
| Test 521 | Illustrative Compound (Pig. 1) | phenoxyethyl methacrylate = 55 | 10 | 35 | 41000 | 20% | ○ | Invention |
| Test 522 | Illustrative Compound (Pig. 1) | phenoxyethyl methacrylate = 55 | 10 | 35 | 41000 | 30% | ⊚ | Invention |
| Test 523 | Illustrative Compound (Pig. 1) | phenoxyethyl methacrylate = 55 | 10 | 35 | 41000 | 60% | ⊚ | Invention |
| Test 524 | Illustrative Compound (Pig. 1) | phenoxyethyl methacrylate = 55 | 10 | 35 | 41000 | 70% | ○ | Invention |
| Test 525 | Illustrative Compound (Pig. 1) | phenoxyethyl methacrylate = 55 | 10 | 35 | 25000 | 50% | ○ | Invention |
| Test 526 | Illustrative Compound (Pig. 1) | phenoxyethyl methacrylate = 55 | 10 | 35 | 30000 | 50% | ⊚ | Invention |
| Test 527 | Illustrative Compound (Pig. 1) | phenoxyethyl methacrylate = 55 | 10 | 35 | 80000 | 50% | ⊚ | Invention |
| Test 528 | Illustrative Compound (Pig. 1) | phenoxyethyl methacrylate = 55 | 10 | 35 | 85000 | 50% | ○ | Invention |
| Test 529 | Illustrative Compound (Pig. 18) | phenoxyethyl methacrylate = 55 | 10 | 35 | 41000 | 50% | ⊚ | Invention |
| Test 530 | Illustrative Compound (Pig. 57) | phenoxyethyl methacrylate = 55 | 10 | 35 | 41000 | 50% | ○ | Invention |
| Test 531 | Illustrative Compound (Pig. 60) | phenoxyethyl methacrylate = 55 | 10 | 35 | 41000 | 50% | ○ | Invention |
| Test 532 | C.I. pigment yellow 74 | phenoxyethyl methacrylate = 10 | 10 | 80 | 42000 | 50% | X | Comparative Example |
| Test 533 | C.I. pigment yellow 74 | phenoxyethyl methacrylate = 25 | 10 | 65 | 46000 | 50% | Δ | Comparative Example |
| Test 534 | C.I. pigment yellow 74 | phenoxyethyl methacrylate = 35 | 10 | 55 | 45000 | 50% | Δ | Comparative Example |
| Test 535 | C.I. pigment yellow 74 | phenoxyethyl methacrylate = 55 | 10 | 35 | 41000 | 50% | X | Comparative Example |
| Test 536 | C.I. pigment yellow 74 | phenoxyethyl methacrylate = 75 | 10 | 15 | 47000 | 50% | X | Comparative Example |

Example 5

Ejection accuracy was evaluated in the same manner as in Example 1 except that in Examples 1 to 3, in place of using Color Photofinishing Pro produced by Fujifilm Corp. as the recording medium, "U-Lite" produced by Nippon Paper Industries Co., Ltd., "Xerox 4024" produced by Fuji Xerox Co., Ltd., "OK Prince High-Quality" produced by Oji Paper Co., Ltd., "Shiorai" produced by Nippon Paper Industries Co., Ltd., "OK Ever Lite Coat" produced by Oji Paper Co., Ltd., "Aurora Coat" produced by Nippon Paper Industries Co., Ltd., or "Tokubishi Art" produced by MITSUBISHI PAPER MILLS LIMITED was used. As a result, it could be confirmed that when the aqueous ink for inkjet recording of the present invention is used, good performance equal to that in Examples 1 to 3 can be obtained.

INDUSTRIAL APPLICABILITY

According to the present invention, an aqueous ink for inkjet recording, ensuring that even after storage for a long period of time or exposure to a high temperature, the ejection accuracy is excellent and generation of density unevenness and streak unevenness can be suppressed, can be provided.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2008-222808) filed on Aug. 29, 2008 and Japanese Patent Application (Patent Application No. 2009-182748) filed on Aug. 5, 2009, the contents of which are incorporated herein by way of reference.

The invention claimed is:

1. An aqueous ink for inkjet recording, comprising vinyl polymer particles containing A and B and a water-soluble solvent:

A: an azo pigment represented by the following formula (1), its tautomer, or a salt or hydrate thereof;

B: a vinyl polymer containing (a) a hydrophobic structural unit having an aromatic ring bonded to the polymer main chain through a linking group and (b) a hydrophilic structural unit:

(1):

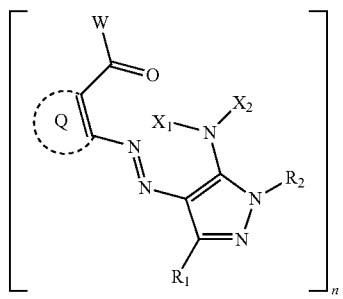

wherein Q represents a 5- to 7-membered heterocyclic ring together with the carbon atoms, W represents an alkoxy group, an amino group, an alkyl group or an aryl group, $X_1$ and $X_2$ each independently represents a hydrogen atom, an alkyl group, an acyl group, an alkylsulfonyl group or an aryl sulfonyl group, $R_1$ represents a hydrogen atom or a substituent, $R_2$ represents a heterocyclic group, n represents an integer of 1 to 4, and the formula represents a dimer through Q, W, $X_1$, $X_2$, $R_1$ or $R_2$ when n=2, and the formula represents a trimer through Q, W, $X_1$, $X_2$, $R_1$ or $R_2$ when n=3, and the formula represents a tetramer through Q, W, $X_1$, $X_2$, $R_1$ or $R_2$ when n=4;

and wherein the hydrophobic structural unit (a) contains (a1) a hydrophobic structural unit represented by the following formula (I):

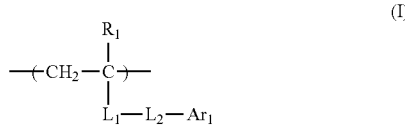

wherein $R_1$ in formula (I) represents a hydrogen atom, a methyl group or a halogen atom, $L_1$ represents —COO—, —OCO—, —CONR$_2$—, —O— or a substituted or unsubstituted phenylene group, $R^2$ represents a hydrogen atom or an alkyl group, $L_2$ represents a single bond or a divalent linking group, and $Ar_1$ represents a monovalent group derived from an aromatic ring.

2. The aqueous ink for inkjet recording as claimed in claim 1, wherein the hydrophobic structural unit (a) further contains (a2) a hydrophobic structural unit derived from an alkyl ester of acrylic or methacrylic acid.

3. The aqueous ink for inkjet recording as claimed in claim 1, wherein the hydrophobic structural unit (a) contains at least one structural unit selected from a structural unit derived from a phenoxyethyl (meth)acrylate and a structural unit derived from a benzyl (meth)acrylate in a ratio of, in terms of the total amount, 20 mass % or more based on the entire mass of the vinyl polymer, and the hydrophilic structural unit (b) contains at least one structural unit selected from structural units derived from an acrylic acid or a methacrylic acid in a ratio of, in terms of the total amount, 30 mass % or less based on the entire mass of the vinyl polymer.

4. The aqueous ink for inkjet recording as claimed in claim 1, wherein the hydrophobic structural unit (a) contains a structural unit derived from a phenoxyethyl (meth)acrylate in a ratio of, in terms of the total amount, 20 mass % or more based on the entire mass of the vinyl polymer.

5. The aqueous ink for inkjet recording as claimed in claim 1, wherein the azo pigment represented by formula (1) is represented by the following formula (2):

(2):

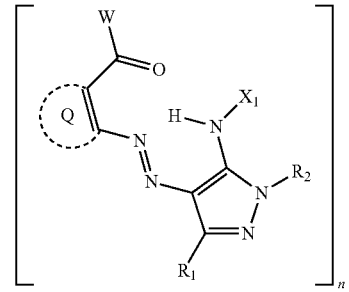

wherein Q, W, $X_1$, $R_1$, $R_2$ and n have the same meanings as in formula (1) in claim 1, respectively.

6. The aqueous ink for inkjet recording as claimed in claim 1, wherein in formula (1), Q forms a 5-membered nitrogen-containing heterocyclic ring together with the carbon atoms.

7. The aqueous ink for inkjet recording as claimed in claim 1, wherein in formula (1), n is 2.

8. The aqueous ink for inkjet recording as claimed in claim 5, wherein in formula (2), $X_1$ is a hydrogen atom.

9. The aqueous ink for inkjet recording as claimed in claim 1, wherein the azo pigment represented by formula (1) is represented by the following formula (3):

(3):

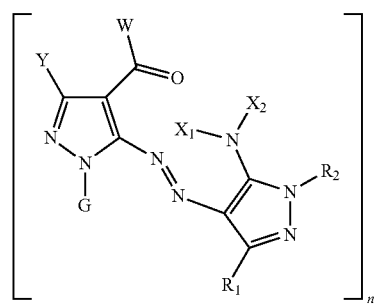

wherein Y represents a hydrogen atom or a substituent, G represents a hydrogen atom, an alkyl group, a cycloalkyl group, an aralkyl group, an alkenyl group, an alkynyl group, an aryl group or a heterocyclic group, and W, $X_1$, $X_2$, $R_1$, $R_2$ and n have the same meanings as in formula (1), respectively.

10. The aqueous ink for inkjet recording as claimed in claim 9, wherein the azo pigment represented by formula (3) is represented by the following formula (4):

(4):

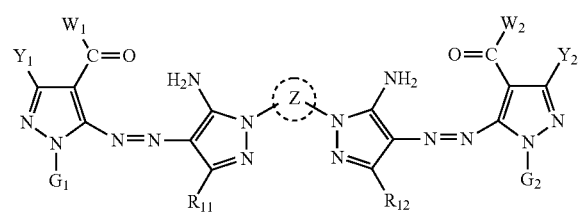

wherein Z represents a 5- to 8-membered nitrogen-containing heterocyclic ring, $Y_1$, $Y_2$, $R_{11}$ and $R_{12}$ each independently represents a hydrogen atom or a substituent, $G_1$ and $G_2$ each independently represents a hydrogen atom, an alkyl group, a cycloalkyl group, an aralkyl group, an alkenyl group, an alkynyl group, an aryl group or a heterocyclic group, and $W_1$ and $W_2$ each independently represents an alkoxy group, an amino group, an alkyl group or an aryl group.

11. The aqueous ink for inkjet recording as claimed in claim 1, wherein W is an alkoxy group having a total carbon number of 3 or less, an amino group, or an alkylamino group having a total carbon number of 3 or less.

12. The aqueous ink for inkjet recording as claimed in claim 9, wherein G is an alkyl group having a total carbon number of 3 or less.

13. The aqueous ink for inkjet recording as claimed in claim 10, wherein Z is a 6-membered nitrogen-containing heterocyclic ring.

* * * * *